(12) United States Patent
Hicks, III

(10) Patent No.: US 9,905,098 B2
(45) Date of Patent: Feb. 27, 2018

(54) METHODS, SYSTEMS, AND PRODUCTS FOR SECURITY SERVICES

(71) Applicant: AT&T Intellectual Property I, L.P., Atlanta, GA (US)

(72) Inventor: John Alson Hicks, III, Roswell, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/411,224

(22) Filed: Jan. 20, 2017

(65) Prior Publication Data

US 2017/0132890 A1 May 11, 2017

Related U.S. Application Data

(63) Continuation of application No. 14/833,098, filed on Aug. 23, 2015, now Pat. No. 9,582,986, which is a continuation of application No. 14/179,633, filed on Feb. 13, 2014, now Pat. No. 9,135,806, which is a continuation of application No. 13/293,221, filed on Nov. 10, 2011, now Pat. No. 8,692,665.

(51) Int. Cl.
| | |
|---|---|
| G08B 13/00 | (2006.01) |
| G08B 13/196 | (2006.01) |
| G08B 25/00 | (2006.01) |
| G08B 25/10 | (2006.01) |

(52) U.S. Cl.
CPC ..... G08B 13/19697 (2013.01); G08B 25/003 (2013.01); G08B 25/10 (2013.01)

(58) Field of Classification Search
CPC ... G08B 13/196; G08B 25/003; G08B 25/007
USPC .......................... 340/540, 541, 501, 531, 628
See application file for complete search history.

(56) References Cited

U.S. PATENT DOCUMENTS

| | | | |
|---|---|---|---|
| 4,259,548 A | 3/1981 | Fahey et al. | |
| 6,038,289 A | 3/2000 | Sands | |
| 6,067,346 A | 5/2000 | Akhteruzzaman et al. | |
| 6,271,752 B1 | 8/2001 | Vaios | |
| 6,356,058 B1 * | 3/2002 | Maio .................. | G01R 31/3651 320/132 |
| 6,400,265 B1 | 6/2002 | Saylor et al. | |
| 6,504,479 B1 | 1/2003 | Lemons | |

(Continued)

FOREIGN PATENT DOCUMENTS

| | | |
|---|---|---|
| JP | 2014216663 A | 11/2014 |
| KR | 20070105430 A | 10/2007 |

OTHER PUBLICATIONS

Aedo, Ignacio, et al., "Personalized Alert Notifications and Evacuation Routes in indoor Environments," *Sensors* 12.6 (2012): 7804-7827, 24 pages.

(Continued)

*Primary Examiner* — Tai T Nguyen
(74) *Attorney, Agent, or Firm* — Scott P. Zimmerman, PLLC

(57) ABSTRACT

Methods, systems, and products notify of alarms in security systems. Sensor data is received from an alarm sensor, and an alarm controller determines an alarm condition. Video data associated with the alarm sensor is retrieved. An alarm message may be sent over a wireless network connection, while the video data may be sent over a wireline broadband connection.

20 Claims, 53 Drawing Sheets

(56) References Cited

U.S. PATENT DOCUMENTS

| | | |
|---|---|---|
| 6,636,489 B1 | 10/2003 | Fingerhut |
| 6,658,091 B1 | 12/2003 | Naidoo et al. |
| 6,693,530 B1 | 2/2004 | Dowens et al. |
| 6,741,171 B2 | 5/2004 | Palka et al. |
| 6,829,478 B1 | 12/2004 | Layton et al. |
| 6,884,826 B2 | 4/2005 | Le-Khac et al. |
| 6,914,896 B1 | 7/2005 | Tomalewicz |
| 6,970,183 B1 | 11/2005 | Monroe |
| 6,975,220 B1 | 12/2005 | Foodman et al. |
| 6,977,585 B2 | 12/2005 | Falk et al. |
| 7,015,806 B2 | 3/2006 | Naidoo et al. |
| 7,020,796 B1 | 3/2006 | Ennis et al. |
| 7,035,650 B1 | 4/2006 | Moskowitz et al. |
| 7,113,090 B1 | 9/2006 | Saylor et al. |
| 7,239,689 B2 | 7/2007 | Diomelli |
| 7,248,161 B2 | 7/2007 | Spoltore et al. |
| 7,295,119 B2 | 11/2007 | Rappaport et al. |
| 7,323,980 B2 | 1/2008 | Faulkner et al. |
| 7,492,253 B2 | 2/2009 | Ollis et al. |
| 7,515,041 B2 | 4/2009 | Eisold et al. |
| 7,633,385 B2 | 12/2009 | Cohn et al. |
| 7,679,507 B2 | 3/2010 | Babich et al. |
| 7,688,203 B2 | 3/2010 | Rockefeller et al. |
| 7,724,131 B2 | 5/2010 | Chen |
| 7,768,414 B2 | 8/2010 | Abel et al. |
| 7,772,971 B1 | 8/2010 | Hillenburg et al. |
| 7,779,141 B2 | 8/2010 | Hashimoto et al. |
| 7,853,261 B1 | 12/2010 | Lewis et al. |
| 7,855,635 B2 | 12/2010 | Cohn et al. |
| 7,920,580 B2 | 4/2011 | Bedingfield, Sr. |
| 7,920,843 B2 | 4/2011 | Martin et al. |
| 7,952,609 B2 | 5/2011 | Simerly et al. |
| 8,284,254 B2 | 10/2012 | Romanowich et al. |
| 8,373,538 B1 | 2/2013 | Hildner et al. |
| 8,391,826 B2 | 3/2013 | McKenna et al. |
| 8,401,514 B2 | 3/2013 | Ebdon et al. |
| 8,405,499 B2 | 3/2013 | Hicks, III |
| 8,471,910 B2 | 6/2013 | Cleary et al. |
| 8,520,068 B2 | 8/2013 | Naidoo et al. |
| 8,581,991 B1 | 11/2013 | Clemente |
| 8,626,210 B2 | 1/2014 | Hicks, III |
| 8,649,758 B2 | 2/2014 | Sennett et al. |
| 8,674,823 B1 | 3/2014 | Contario et al. |
| 8,692,665 B2 | 4/2014 | Hicks, III |
| 8,780,199 B2 | 7/2014 | Mimar |
| 8,831,970 B2 | 9/2014 | Weik et al. |
| 8,847,749 B2 | 9/2014 | Hicks, III |
| 8,884,772 B1 | 11/2014 | Zhang |
| 8,902,740 B2 | 12/2014 | Hicks, III |
| 8,937,658 B2 | 1/2015 | Hicks, III |
| 8,970,365 B2 | 3/2015 | Wedig et al. |
| 9,060,116 B2 | 6/2015 | Kim |
| 9,135,806 B2 | 9/2015 | Hicks |
| 9,246,740 B2 | 1/2016 | Hicks |
| 9,318,005 B2 | 4/2016 | Hicks |
| 2002/0175995 A1 | 11/2002 | Sleeckx |
| 2002/0193107 A1 | 12/2002 | Nascimento |
| 2003/0025599 A1 | 2/2003 | Monroe |
| 2003/0062997 A1* | 4/2003 | Naidoo ............ G08B 13/19656 340/531 |
| 2003/0179712 A1 | 9/2003 | Kobayashi et al. |
| 2003/0227220 A1 | 12/2003 | Biskup et al. |
| 2004/0028391 A1 | 2/2004 | Black et al. |
| 2004/0086088 A1 | 5/2004 | Naidoo et al. |
| 2004/0086091 A1 | 5/2004 | Naidoo et al. |
| 2004/0086093 A1 | 5/2004 | Schranz |
| 2004/0113770 A1 | 6/2004 | Falk |
| 2004/0137959 A1 | 7/2004 | Salzhauer |
| 2004/0177136 A1 | 9/2004 | Chen et al. |
| 2004/0196833 A1 | 10/2004 | Dahan et al. |
| 2004/0233983 A1 | 11/2004 | Crawford et al. |
| 2005/0066033 A1 | 3/2005 | Cheston et al. |
| 2005/0068175 A1 | 3/2005 | Faulkner et al. |
| 2005/0174229 A1 | 8/2005 | Feldkamp |
| 2006/0002721 A1 | 1/2006 | Sasaki |
| 2006/0028488 A1 | 2/2006 | Gabay et al. |
| 2006/0055529 A1 | 3/2006 | Ratiu et al. |
| 2006/0064505 A1 | 3/2006 | Lee et al. |
| 2006/0067484 A1 | 3/2006 | Elliot et al. |
| 2006/0154642 A1 | 7/2006 | Scannell, Jr. |
| 2006/0170778 A1 | 8/2006 | Ely |
| 2006/0239250 A1 | 10/2006 | Elliot et al. |
| 2007/0049259 A1 | 3/2007 | Onishi et al. |
| 2007/0104218 A1 | 5/2007 | Hassan et al. |
| 2007/0115930 A1 | 5/2007 | Reynolds et al. |
| 2007/0124782 A1 | 5/2007 | Hiral et al. |
| 2007/0139192 A1 | 6/2007 | Wimberly et al. |
| 2007/0226344 A1 | 9/2007 | Sparrell et al. |
| 2007/0247187 A1 | 10/2007 | Webber et al. |
| 2007/0279214 A1 | 12/2007 | Buehler |
| 2007/0290830 A1 | 12/2007 | Gurley |
| 2008/0061923 A1 | 3/2008 | Simon et al. |
| 2008/0090546 A1 | 4/2008 | Dickenson et al. |
| 2008/0167068 A1 | 7/2008 | Mosleh et al. |
| 2008/0191857 A1 | 8/2008 | Mojaver |
| 2008/0225120 A1 | 9/2008 | Stuecker |
| 2008/0261515 A1 | 10/2008 | Cohn et al. |
| 2008/0279345 A1 | 11/2008 | Zellner et al. |
| 2008/0311878 A1 | 12/2008 | Martin et al. |
| 2008/0311879 A1 | 12/2008 | Martin et al. |
| 2009/0006525 A1 | 1/2009 | Moore |
| 2009/0017751 A1 | 1/2009 | Blum |
| 2009/0047016 A1 | 2/2009 | Bernard et al. |
| 2009/0058630 A1 | 3/2009 | Friar et al. |
| 2009/0060530 A1 | 3/2009 | Biegert et al. |
| 2009/0109898 A1 | 4/2009 | Adams et al. |
| 2009/0191858 A1 | 7/2009 | Calisti et al. |
| 2009/0267754 A1 | 10/2009 | Nguyen et al. |
| 2009/0274104 A1 | 11/2009 | Addy |
| 2009/0276713 A1 | 11/2009 | Eddy |
| 2009/0285369 A1 | 11/2009 | Kandala |
| 2009/0315699 A1 | 12/2009 | Satish et al. |
| 2009/0323904 A1 | 12/2009 | Shapiro et al. |
| 2010/0073856 A1 | 3/2010 | Huang et al. |
| 2010/0145161 A1 | 6/2010 | Niyato et al. |
| 2010/0279664 A1 | 11/2010 | Chalk |
| 2010/0281312 A1 | 11/2010 | Cohn et al. |
| 2010/0302025 A1 | 12/2010 | Script |
| 2010/0302938 A1 | 12/2010 | So |
| 2011/0003577 A1 | 1/2011 | Rogalski et al. |
| 2011/0032109 A1 | 2/2011 | Fox |
| 2011/0044210 A1 | 2/2011 | Yokota |
| 2011/0090334 A1 | 4/2011 | Hicks, III |
| 2011/0113142 A1 | 5/2011 | Rangegowda et al. |
| 2011/0183643 A1 | 7/2011 | Martin et al. |
| 2011/0197246 A1 | 8/2011 | Stancato et al. |
| 2011/0211440 A1 | 9/2011 | Arsenault et al. |
| 2011/0244854 A1 | 10/2011 | Hansson et al. |
| 2011/0317622 A1 | 12/2011 | Arsenault |
| 2012/0084857 A1 | 4/2012 | Hubner |
| 2012/0099253 A1 | 4/2012 | Tang |
| 2012/0163380 A1 | 6/2012 | Kolbe et al. |
| 2012/0190386 A1 | 7/2012 | Anderson |
| 2012/0314597 A1 | 12/2012 | Singh et al. |
| 2013/0099919 A1 | 4/2013 | Cai et al. |
| 2013/0103309 A1 | 4/2013 | Cai et al. |
| 2013/0120132 A1 | 5/2013 | Hicks, III |
| 2013/0120138 A1 | 5/2013 | Hicks, III |
| 2013/0121239 A1 | 5/2013 | Hicks, III |
| 2013/0135993 A1 | 5/2013 | Morrill et al. |
| 2013/0155245 A1 | 6/2013 | Slamka |
| 2013/0170489 A1 | 7/2013 | Hicks, III |
| 2013/0214925 A1 | 8/2013 | Weiss |
| 2013/0235209 A1 | 9/2013 | Lee et al. |
| 2013/0273875 A1 | 10/2013 | Martin et al. |
| 2014/0095164 A1 | 4/2014 | Sone et al. |
| 2014/0167969 A1 | 6/2014 | Wedig |
| 2014/0253326 A1 | 9/2014 | Cho et al. |
| 2015/0054645 A1 | 2/2015 | Hicks, III |
| 2015/0056946 A1 | 2/2015 | Leggett et al. |
| 2015/0085130 A1 | 3/2015 | Hicks, III |
| 2015/0097683 A1 | 4/2015 | Sloo et al. |
| 2015/0137967 A1 | 5/2015 | Wedig et al. |
| 2015/0364029 A1 | 12/2015 | Hicks, III |

(56) References Cited

U.S. PATENT DOCUMENTS

| | | |
|---|---|---|
| 2016/0196734 A1 | 7/2016 | Hicks, III |
| 2016/0225239 A1 | 8/2016 | Hicks, III |
| 2016/0284205 A1 | 9/2016 | Hicks, III |
| 2017/0076562 A1 | 3/2017 | Hicks, III |
| 2017/0132890 A1 | 5/2017 | Hicks, III |
| 2017/0140620 A1 | 5/2017 | Hicks, III |

OTHER PUBLICATIONS

Unpublished U.S. Appl. No. 14/833,098, Hicks, III, John Alson.
Unpublished U.S. Appl. No. 14/854,294, Hicks, III, John Alson.
Unpublished U.S. Appl. No. 14/939,212, Hicks, III, John Alson.

* cited by examiner

FIG. 36

Alarm Controller

- Installable in AT&T Digital Life Cabinet
- AT&T Application Execution Environment:
  - JVM/OSGi Services Framework
  - SDK for 3rd Party Application Development
- Gigabit Ethernet Switch and Ports
- Gigabit WAN Ethernet Interface*
- USB Ports
- 24 Hour Battery Backup
- HomePlug AV Based on CopperGate Technology with Diversity

- VoIP Functionality
- Two-Way Interactive Voice Communication with Central Monitoring Station Agent during an Alarm Condition
- IMS VoIP ATA Function (Future)
- TR-069 Remote Management
- Modules:
  - Standard
    - 3G Cellular Data (GPRS, EDGE, UMTS and HSPA + SMS) with Integrated Antenna
    - 433/900MHz Proprietary Transceiver
    - 24 Hour Battery Backup
    - DECT Base Station
  - Optional
    - Takeover Module (Interfaces for Wired Keypads, Wired Sirens and Wired Window/Door Contacts)
    - Hard Drive (Optional – Outside of Cabinet)
    - External 3G Antenna Cabinet and Alarm Controller may be deployed everywhere, including with ADSL, VDSL, GPON or Bring-Your-Own-Broadband, to support a wide range set of Digital Life Services Note: Assume that customer's existing 802.11 b/g access point will be used to support Wi-Fi Touch Pad and other Wi-Fi devices Security Cabinet - *Main Cabinet Door Open*

FIG. 39

Security Cabinet Door LEDs

| LED Label | Led Function | Normal State | Other State(s) | Comments |
|---|---|---|---|---|
| Power | AC Power | Green (HW) | Flash/Off | Flash while powering up, Off AC power outage |
| Battery | Battery | Green (SW) | Red/Off | Green is good, Red is replace battery, Off is dead or no battery |
| System | System | Green (SW) | Yellow/Red/Off | Green is good, Red is problem, Yellow is test mode |
| Signal | Signal | Green (SW) | Yellow/Red/Off | Green is good, Red no/or low 3G/4G signal, Yellow is problem with another radio subsystem |
| Broadband | Wireline WAN | Green (SW) | Off | Green is connection, Off is no connection |

Note: SW = Software Control, HW = Hardware Control

FIG. 40

| Device | Technology |
|---|---|
| Wireless Door/Window Contact | 433 MHz (One-Way) |
| Wireless Motion Sensor (PIR) | 433MHz (One-Way) |
| Wireless Smoke Detector | 433MHz (One-Way) |
| Wireless CO Detector | 433MHz (One-Way) |
| Wireless Glass Breakage Detector | 433MHz (One-Way) |
| Wireless Temperature/Flood Detector | 433MHz (One-Way) |
| Wireless Key Fob | 433MHz (One-Way) |
| Wireless 433MHz One-Way Repeater | 433 MHz (One-Way) |
| Wired/Wireless Keypad | Wired/900MHz (Two-Way) |
| Wireless Device Controller | 900MHz (Two-Way) |
| Wired/Wireless Voice Annunciator - Siren | Wired/900 MHz (Two-Way) |
| Wireless 900MHz Two-Way Repeater | 900MHz (Two-Way) |
| Fixed IP Indoor Ethernet Camera with HomePlug AV | HomePlug AV |
| Pan/Tilt IP Indoor Ethernet Camera with HomePlug AV | HomePlug AV |
| Fixed Outdoor IP Ethernet Camera with HomePlug AV | HomePlug AV |
| HomePlug AV to Ethernet Adapter | HomePlug AV |
| DECT Intercom Speakerphone Unit | DECT 6.0 |
| Hard Drive (Optional) | eSATA Interface |
| 3G Cellular Data Module External Antenna (Optional) | 3G Cellular Data |

FIG. 42

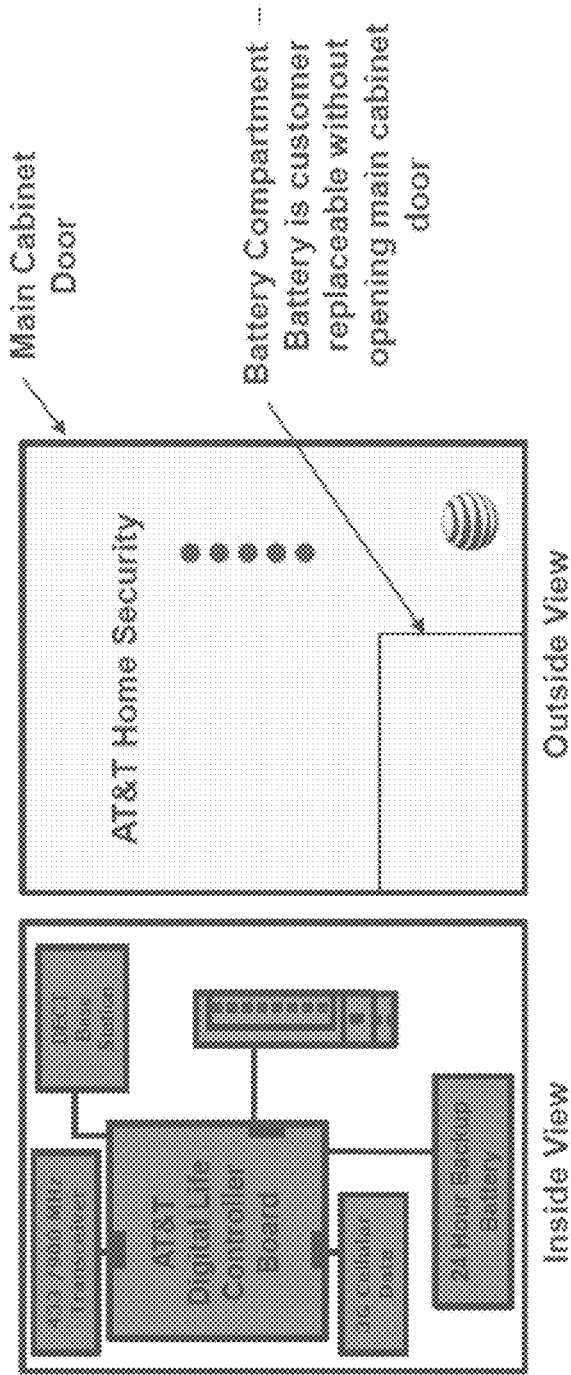

24 Hour Battery Backup (Standard)

- During local power failure, 24 Hour Battery Backup powers the AT&T Digital Life Controller Board, 433/900 MHz Transceiver Module and 3G Cellular Data Module, DECT Base Station Module and if present it powers the Takeover Module
- AT&T Digital Life Controller Board monitors the health of the battery and automatically reports a low battery condition to the Central Monitoring Station
- The AT&T Home Security Cabinet is equipped with a battery compartment that enables customer or technician to access and replace the battery without opening the main cabinet door
- During local power failure conditions the battery will power the AT&T Digital Life Controller Board and some sub-systems automatically may be shutdown to preserve battery life

FIG. 43

Hard Drive Module (Optional) – Local Archiving of Streaming Video From IP Cameras

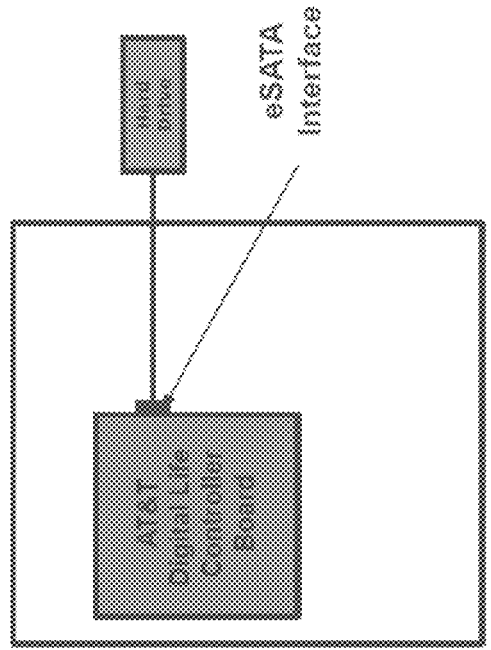

eSATA Interface

- Optional Hard Drive Module is used to archive streaming video from IP cameras in the home
- Hard Drive Module is connected to AT&T Services Gateway via a eSATA interface
- Hard Drive Module is powered down under local power failure conditions
- Customer is able to access and view stored video using a browser equipped device, such as a PC, Wi-Fi touch tablet or mobile device
- A search function is provided so that a user can easily locate stored video based on date, time of day and IP camera
- The storage includes an index of alarm reporting to the Central Monitoring Station, so that a user can easily locate pre- and post- alarm video associated with an alarm report to the Central Monitoring Station

FIG. 47

Communication Between Digital Life Controller and Network Platform

| Operating Mode | AT&T 3G/4G Cellular Data Service | Customer's Wireline Broadband Data Service | AT&T SMS Service |
|---|---|---|---|
| (Normal Operation) 3G/4G Cellular Data Service is Operating and Wireline Broadband Data Service is Operating | Life/Safety IP Alarm Reporting to AT&T Network Platform | Remaining IP Traffic to AT&T Network Platform | |
| 3G/4G Cellular Data Service is Not Operating and Wireline Broadband Data Service is Operating | | Life/Safety IP Alarm Reporting to AT&T Network Platform and Remaining IP Traffic to AT&T Network Platform | |
| 3G/4G Cellular Data Service is Operating and Wireline Broadband Data Service is Not Operating | Life/Safety IP Alarm Reporting to AT&T Network Platform and Remaining IP Traffic to AT&T Network Platform | | |
| 3G/4G Cellular Data Service is Not Operating and Wireline Broadband Data Service is Not Operating | | | Life/Safety IP Alarm Reporting to AT&T Network Platform |

AT&T Wireless Network Connection Between Digital Life Controller Network Platform

METHODS, SYSTEMS, AND PRODUCTS FOR SECURITY SERVICES

CROSS-REFERENCE TO RELATED APPLICATIONS

This application is a continuation of U.S. application Ser. No. 14/833,098 filed Feb. 13, 2014 and since issued as U.S. Pat. No. 9,582,986, which is a continuation of U.S. application Ser. No. 14/179,633 filed Feb. 13, 2014 and since issued as U.S. Pat. No. 9,135,806, which is a continuation of U.S. application Ser. No. 13/293,221 filed Nov. 10, 2011 and since issued as U.S. Pat. No. 8,692,665, with all applications incorporated herein by reference in their entireties.

BACKGROUND

Exemplary embodiments generally relate to communications and, more particularly, to alarm systems and to sensing conditions.

Security systems are common in homes and businesses. Security systems alert occupants to intrusions. Security systems, though, may also warn of fire, water, and harmful gases.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein:

FIGS. 35-36 are schematics further illustrating the alarm controller and the takeover module, according to exemplary embodiments;

FIGS. 37-40 are schematics further illustrating the alarm controller, according to exemplary embodiments;

FIGS. 41-43 are schematics further illustrating the alarm controller, according to exemplary embodiments;

FIGS. 44-49 are schematics further illustrating verification of alarms, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
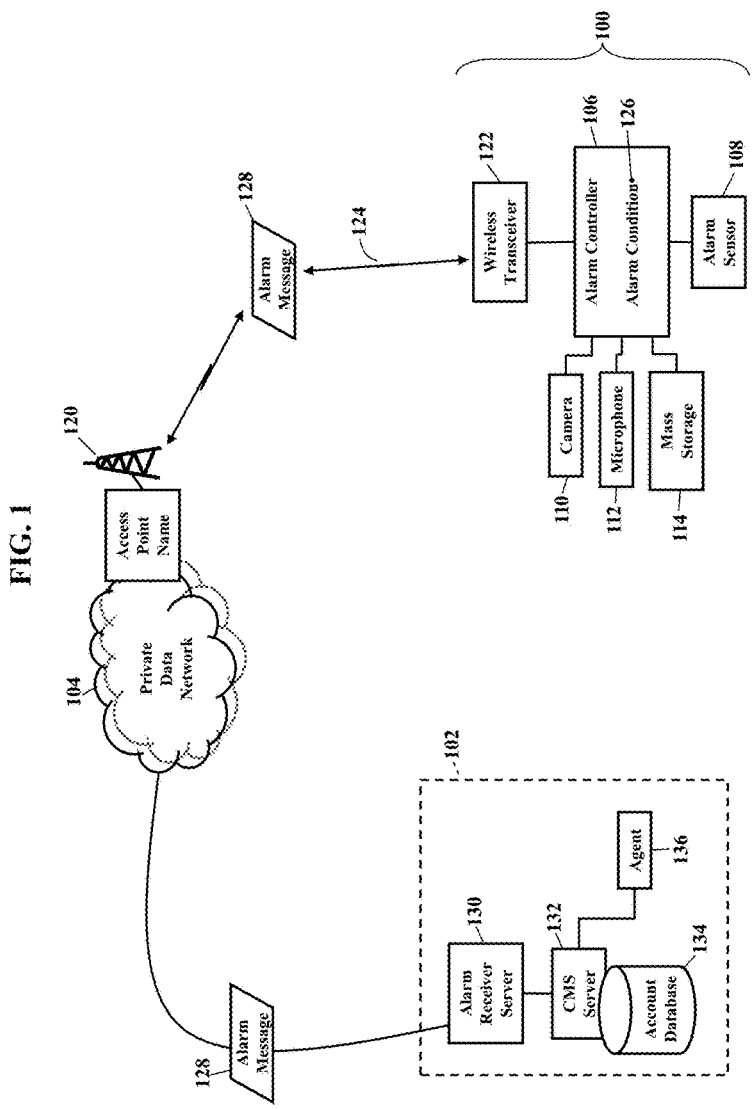
FIG. 1 is a simplified schematic illustrating an environment in which exemplary embodiments may be implemented.

FIG. 1 is a simplified schematic illustrating an environment in which exemplary embodiments may be implemented. A security system 100 communicates with a central monitoring station 102 using a private data network 104. The security system 100 has an alarm controller 106 that receives information from one or more alarm sensors 108. As those of ordinary skill in the art understand, the alarm sensors 108 monitor for heat, smoke, motion, gases, sound, or any other physical or logical parameter that may indicate a security event. The alarm controller 106 may also interface with one or more cameras 110 that capture video data and microphones 112 that capture audio data. The cameras 110 and microphones 112 may constantly capture video and audio that is automatically stored in a local mass storage device 114.

The security system 100 may wirelessly communicate with the private data network 104. The private data network 104, for example, may have an access point name (or "APN") 120 that identifies a wireless Internet protocol packet data network that will be used to establish a wireless cellular network connection 124 between the alarm controller 106 and the private data network 104. The security system 100 has a wireless transceiver 122 that uses the access point name 120 to communicate with the private data network 104. The security system 100, for example, may send and receive packets of data using a wireless carrier's 3G/LTE/4G cellular network. The security system 100 may connect using a general packet radio service (GPRS), enhanced data rates for global evolution (EDGE), a universal mobile telecommunications service (UMTS), and/or a high speed packet access (HSPA). The wireless transceiver 122, however, may additionally or alternatively utilize any portion of the electromagnetic spectrum and/or any communications standard or specification (such as WI-FI®, BLUETOOTH®, or WI-MAX®). The access point name 120 is a protocol that describes a configurable network identifier when connecting to the private data network 104. The access point name 120 determines what type of network connection should be created, what Internet protocol address(es) should be assigned to the security system 100 (e.g., the wireless transceiver 122), and what security methods should be used. The access point name 120 may identify the Internet protocol packet data network and the type of service that is provided by the wireless Internet protocol packet data network.

The security system 100 provides security services. The security system 100 monitors the inputs, status, or state of the alarm sensors 108, the cameras 110, and/or the microphones 112. When the security system 100 detects an alarm condition 126, the security system 100 generates an alarm message 128. The alarm message 128 is wirelessly sent to the access point name 120 and routed through the private data network 104 to the central monitoring station 102. The alarm message 128, for example, may be received at a centralized alarm receiver server 130 and routed to a central monitoring station ("CMS") server 132. The central monitoring station server 132 may query an account database 134 to discover detailed customer information (as later paragraphs will explain). The central monitoring station server 132 may then assign a human or computerized agent 136.

Figure 2:
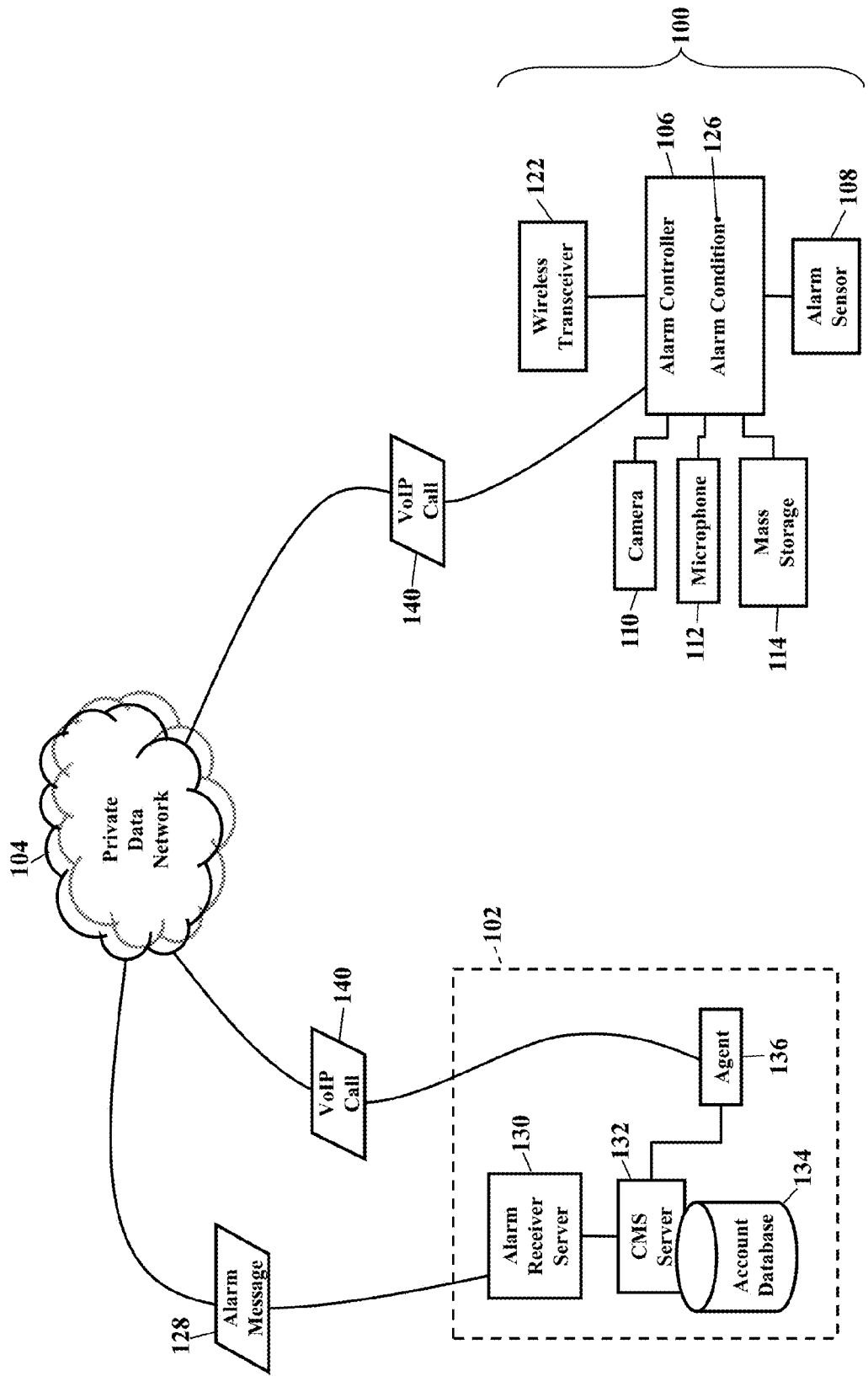
FIG. 2 is a schematic illustrating verification of alarms, according to exemplary embodiments.

FIG. 2 is a schematic illustrating verification of alarms, according to exemplary embodiments. When the agent 136 is notified of the alarm message 128, the agent 136 may first verify the alarm condition 126. As the reader may understand, a high percentage of alarms are "false." That is, alarms are often inadvertently triggered, such as when an owner of a home opens a door and accidentally triggers an alarm. If the central monitoring station ("CMS") server 132 were to immediately summon police or fire services, but the alarm is false, then local police and fire departments have wasted time and resources. Some municipalities may even impose fees for an unnecessary dispatch. One of the primary functions of the agent 136, then, is to first ascertain a true emergency before summoning emergency services.

The security system 100 may thus have two-way interactive voice capabilities. The agent 136, for example, may establish a Voice-over Internet protocol ("VoIP") call 140 with the security system 100. The agent 136, for example, may call a telephone number or other address assigned to the security system 100 and directly speak with an occupant of a home or business (as later paragraphs will explain). The Voice-over Internet protocol call 140 may also use the access point name 120 associated with the private, wireless cellular network connection 124 with the wireless transceiver 122. The Voice-over Internet protocol call 140 may alternatively route over a wireline broadband connection to the alarm controller 106. The agent 136 may additionally or alternatively call a designated number (such as a mobile phone) when alarms are detected. The agent 136 may also retrieve audio and/or video data from the camera 110 and/or the microphone 112 (again, as later paragraphs will explain). The audio and/or video data may be live, real-time data captured by the cameras 110 and/or the microphones 112, but archived audio/video data may also be retrieved. The agent may thus speak with an occupant, and view the audio and/or video data, to determine if the alarm condition 126 represents a true emergency. If the alarm is a legitimate security concern, then the agent 136 may notify local emergency services.

Figure 3:
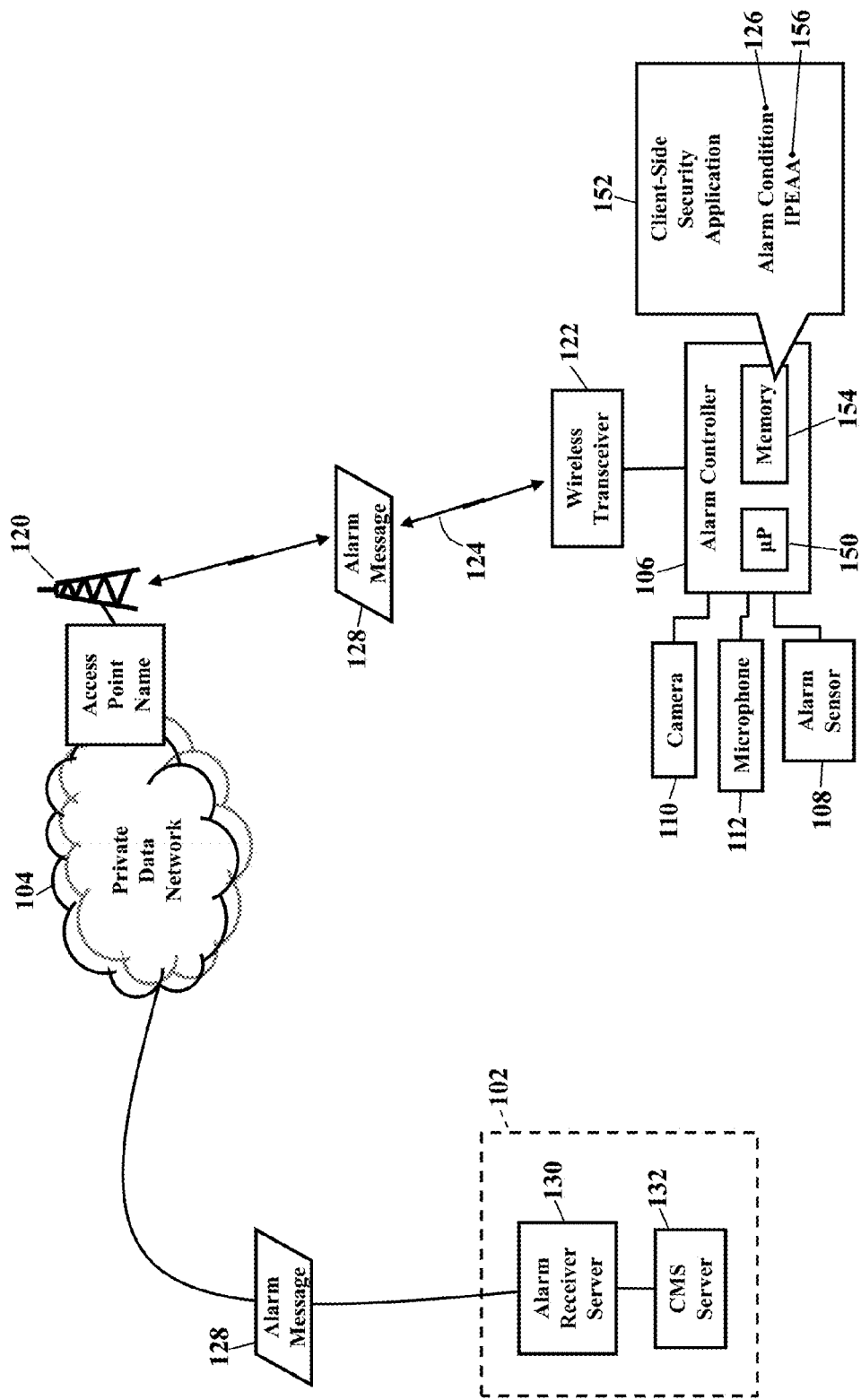
FIG. 3 is a more detailed schematic illustrating a security system, according to exemplary embodiments.

FIG. 3 is a more detailed schematic illustrating the security system 100, according to exemplary embodiments. The alarm controller 106 has a processor 150 (e.g., "μP"), application specific integrated circuit (ASIC), or other component that executes a client-side security application 152 stored in a memory 154. The client-side security application 152 monitors the inputs, status, or state of the alarm sensors 108, the cameras 110, and/or the microphones 112. The client-side security application 152 may instruct any of the cameras 110 and/or the microphones 112 to capture audio and/or video data. When the client-side security application 152 detects the alarm condition 126, the client-side security application 152 instructs the processor 150 to retrieve an IP emergency alarm address ("IPEAA") 156 from the memory 124. The IP emergency alarm address 156 is a network communications address at which the centralized alarm receiver server 130 receives packetized alarm messages from customers/subscribers of an alarm monitoring service. The IP emergency alarm address 156 may be preloaded into the memory 124, and the IP emergency alarm address 156 may be changed after a software update to the client-side security application 152.

The client-side security application 152 generates the alarm message 128. The alarm message 128 includes data that identifies a network address associated with the alarm controller 106. The alarm message 128 may also include data that describes the alarm condition 126, such as an alarm code associated with the sensor 108. The alarm message 128 may also include information describing the customer, such as a customer account code, physical street address, or other customer identifier. Whatever data is included in the alarm message 128, the data is packetized according to a packet protocol. The alarm message 128 may also be encrypted to ensure privacy. Once the alarm message 128 is formatted and ready, the processor 150 commands the wireless transceiver 122 to wirelessly send the alarm message 128.

The alarm message 128 routes through the private data network 104. The alarm message 128 is sent to the access point name 120 associated with the private, wireless cellular network connection 124 to the private data network 104. Packet headers are added or modified to route the alarm message 128 through the private data network 104 to the IP emergency alarm address 156 associated with the centralized alarm receiver server 130. Because the private data network 104 is controlled and/or operated by a single carrier, the alarm message 128 is secure and never encounters a publicly-available network segment.

The alarm message 128 may be encrypted and/or packetized using any packet protocol. As those of ordinary skill in the art understand, the alarm message 128 may be packetized (or "framed") for routing through the private data network 104. Information is grouped into packets according to a packet protocol. As those of ordinary skill in the art also understand, there are many packet protocols. Some of the more well-known packet protocols include TCP/IP, IPX/SPX, AppleTalk, and SNA. Some standards organizations, such as the I.E.E.E., issue standards for packetizing data. The private data network 104 may even utilize "mixed" protocols, where a translator determines the particular packet protocol and the appropriate destination for each packet. Because the basics of packetizing and packet protocols are well-known, this disclosure will not further explain the packetizing of the alarm message 128.

Figure 4:
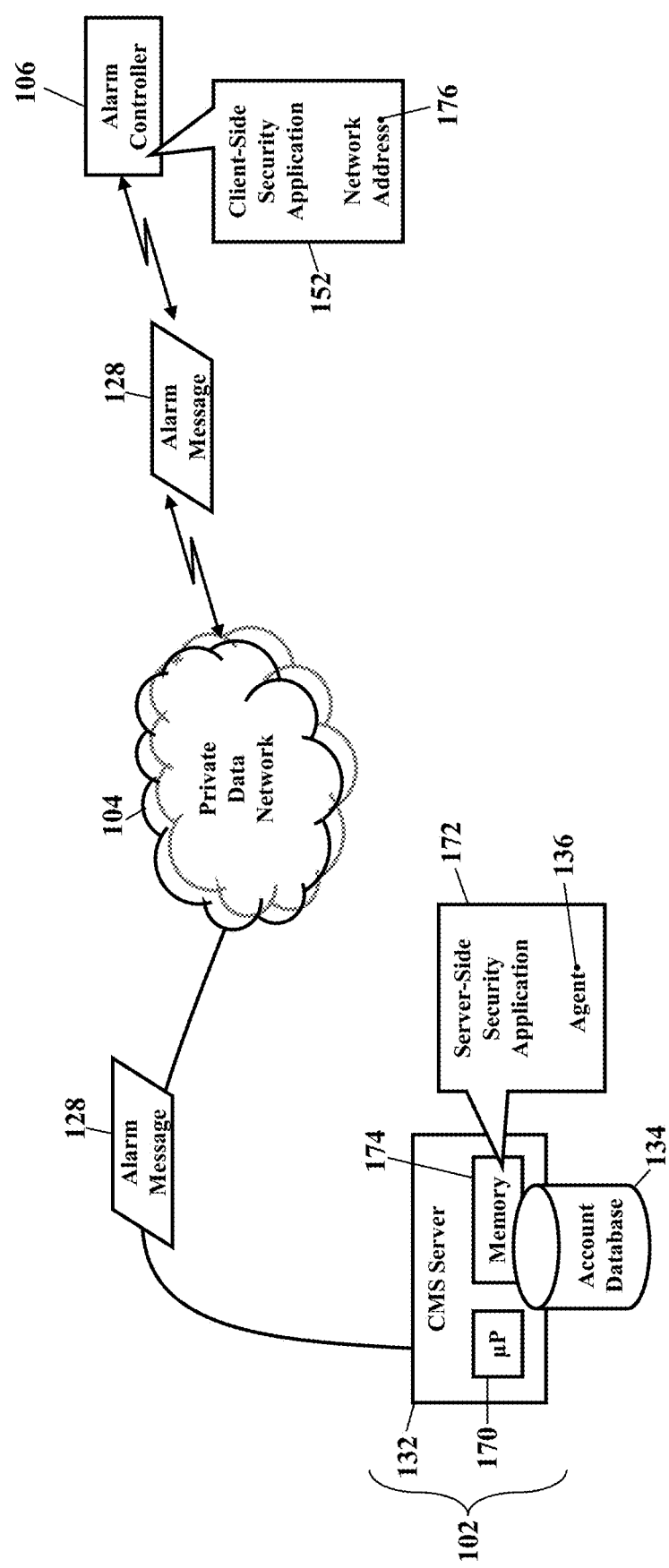
FIG. 4 is a more detailed schematic illustrating receipt of an alarm message, according to exemplary embodiments.

FIG. 4 is a more detailed schematic illustrating receipt of the alarm message 128, according to exemplary embodiments. As the above paragraphs explained, the alarm message 128 wirelessly routes from the alarm controller 106, through the private data network 104, and to the centralized alarm receiver server 130. The centralized alarm receiver server 130 may then route the alarm message 128 to the central monitoring station ("CMS") server 132. The central monitoring station server 132 has a processor 170 (e.g., "µP"), application specific integrated circuit (ASIC), or other component that executes a server-side security application 172 stored in a memory 174. The server-side security application 172 and the client-side security application 152 cooperate in a client-server environment to notify of alarms from the security system 100.

When the central monitoring station server 132 receives the alarm message 128, the server-side security application 172 obtains any data associated with the alarm message 128. The server-side security application 172, for example, may obtain the customer account code contained in the alarm message 128 to retrieve customer account information from the account database 134. The server-side security application 172 may then pass the alarm condition 126 and any account information on to the agent 136. The server-side security application 172 may also retrieve a static, dynamic, and/or private network address 176 associated with the alarm controller 106. The network address 176 uniquely identifies the alarm controller 106 that generated the alarm message 128. The network address 176 may be retrieved from the account database 134, or the network address 176 may be extracted from one or more header portions and/or payload portions of the packetized alarm message 128. However the network address 176 is obtained, the server-side security application 172 knows the identity of the alarm controller 106 detecting the alarm condition 126. The server-side security application 172 may then assign the human or computerized agent 136.

Figure 5:
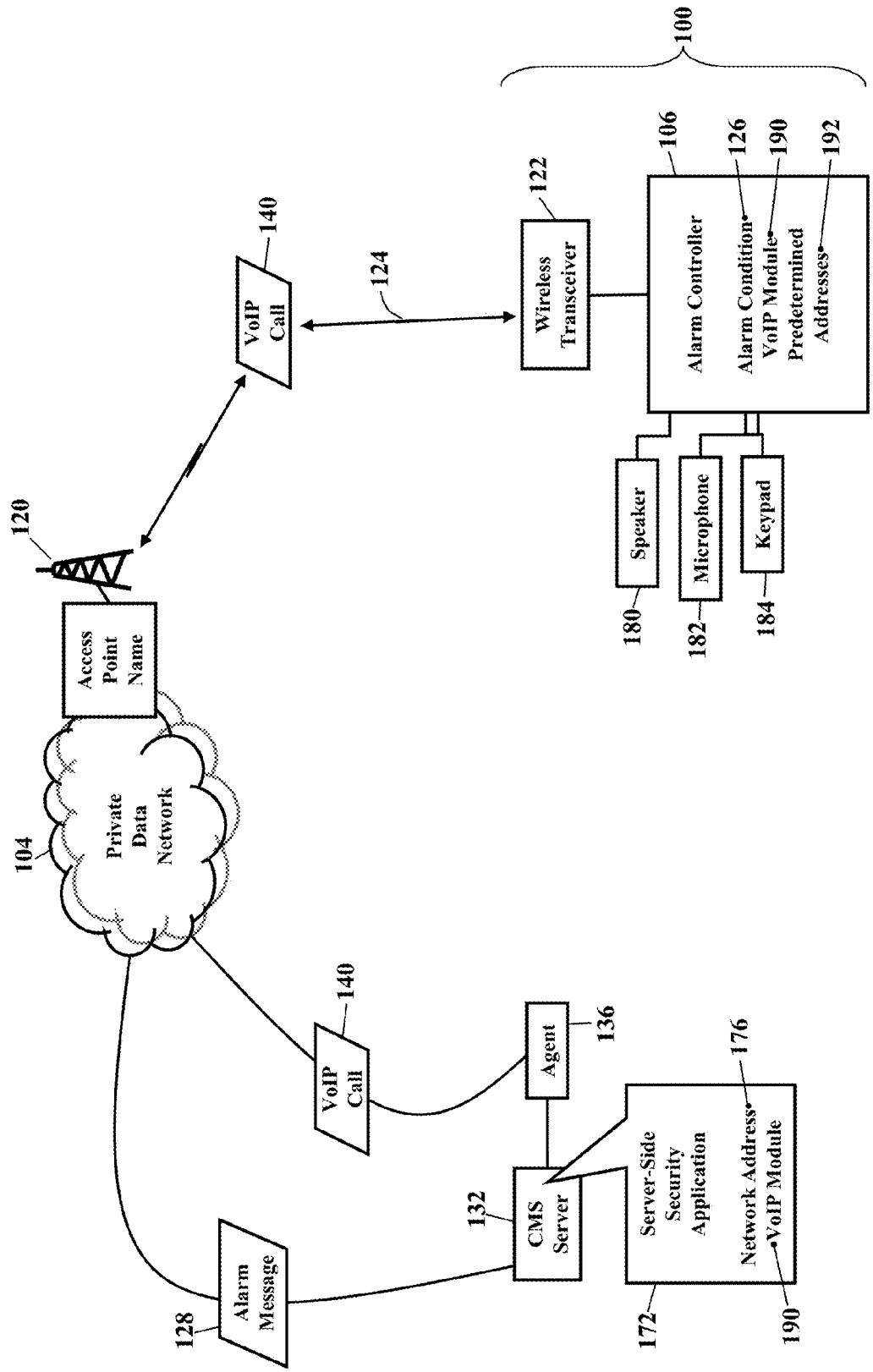
FIGS. 5-6 are detailed schematics illustrating a verification call, according to exemplary embodiments.
Figure 6:
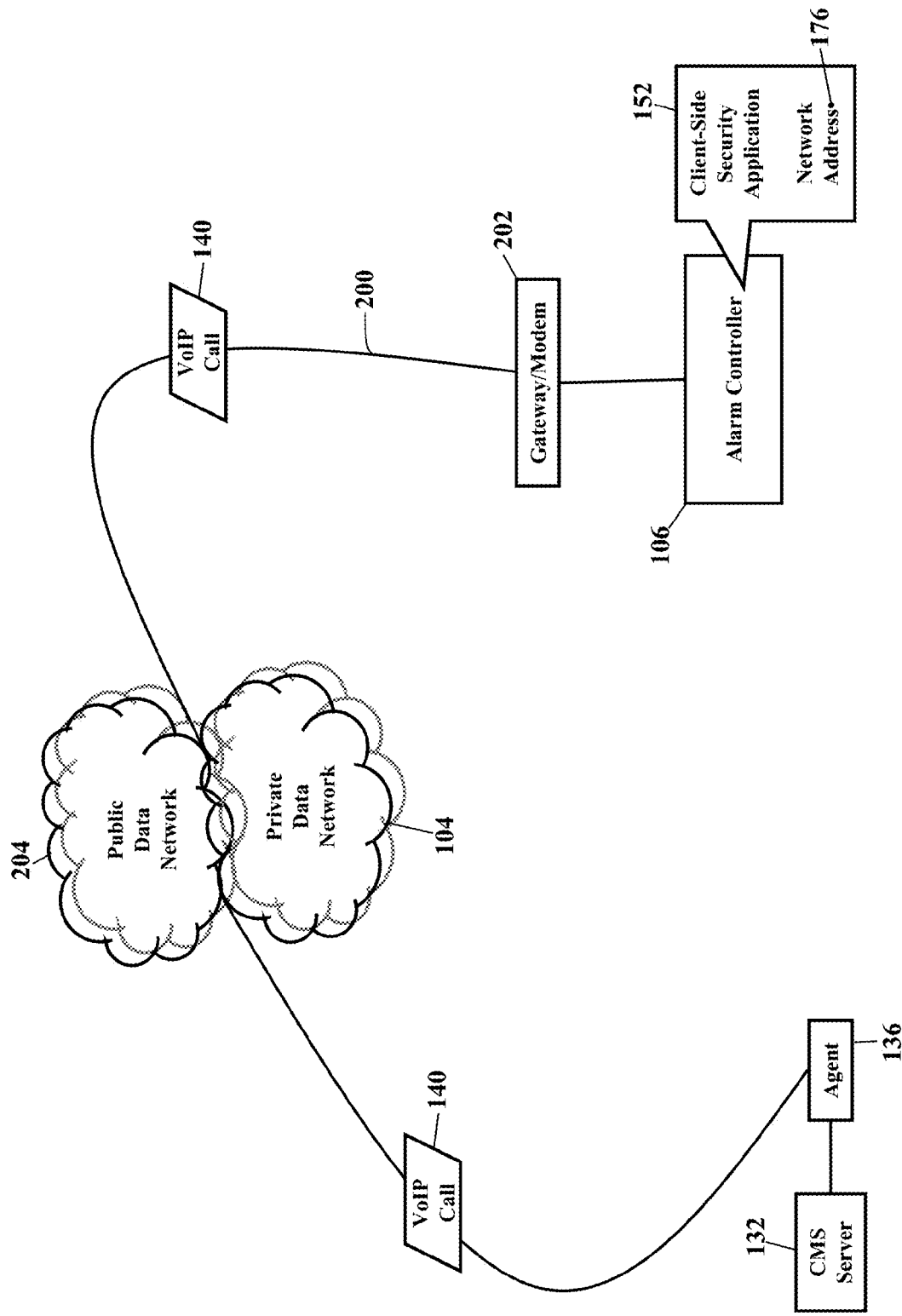

FIGS. 5-6 are detailed schematics illustrating a verification call, according to exemplary embodiments. Here the agent 136 directly calls the alarm controller 106 to verify the alarm. Because the unique network address 176 of the alarm controller 106 has been obtained, the agent 136 may establish communication directly with the alarm controller 106. The agent 136, for example, may establish the Voice-over Internet Protocol call 140 to the alarm controller 106. The alarm controller 106 may have a Man-Machine Interface, such as a speaker 180, a microphone 182, and/or a keypad 184. The server-side security application 172 may also have a VoIP module 190 for conducting two-way voice communication. The agent 136 may thus call the alarm controller 106 to verify the alarm condition 126. The agent's speech may be output from the speaker 180, and the occupant may speak into the microphone 182. The Voice-over Internet Protocol call 140 is thus enabled between the agent 136 and the occupant at the alarm controller 106. The agent 136 may require that the occupant authenticate himself/herself, such as by entering a code or password on the keypad 184. The occupant, however, may alternately speak a phrase to verify identity and/or the alarm condition 126. If the occupant verifies the alarm condition 126, then the agent 136 may summon emergency services.

The alarm controller 106 may only accept calls from predetermined addresses. Because the alarm controller 106 may receive calls, any person or party obtaining the unique network address 176 may call the alarm controller 106. The alarm controller 106 may thus be challenged by calls from pranksters, telemarketers, and even friends and family. The VoIP module 190 may thus be configured to only respond to calls from one or more predetermined addresses 192. The VoIP module 190, for example, may be configured to only accept calls from addresses associated with the central monitoring station 102, the central monitoring station ("CMS") server 132, and/or the agent 136. When the alarm controller 106 receives the Voice-over Internet Protocol call 140, the VoIP module 190 may first compare a calling address (such as a calling telephone number or a calling Internet Protocol address) to the predetermined addresses 192. If the VoIP module 190 matches the calling address to the predetermined addresses 192, then the VoIP module 190 may instruct the alarm controller 106 to accept the call. If the VoIP module 190 cannot obtain a match with the predetermined addresses 192, then the VoIP module 190 may instruct the alarm controller 106 to reject the call. The VoIP module 190 may thus be configured to only accept calls from one or more predetermined addresses 192.

FIGS. 5 and 6 also illustrate routing options for the Voice-over Internet Protocol call 140. FIG. 5 illustrates wireless routing over the wireless cellular network connection 124. The Voice-over Internet protocol call 140 may route to the wireless transceiver 122 using the access point name 120 associated with the private, wireless cellular network connection 124. When the agent 136 calls the unique network address 176 of the alarm controller 106, the Voice-over Internet Protocol call 140 may route through the private data network 104, over the wireless cellular network connection 124, and to the wireless transceiver 122.

FIG. 6 illustrates another routing option. The Voice-over Internet Protocol call 140 may route over a wireline broadband connection 200 to the alarm controller 106. If the security system 100 has access to a wireline broadband connection, then the alarm controller 106 may send and receive data using a digital subscriber line modem, cable modem, or other gateway/modem device 202. When the agent 136 calls the unique network address 176 of the alarm controller 106, the Voice-over Internet Protocol call 140 may thus route over the wireline broadband connection 200. FIG. 6 illustrates the Voice-over Internet Protocol call 140 routing over the private data network 104 to the gateway/modem device 202. FIG. 6, though, also illustrates that the Voice-over Internet Protocol call 140 may route at least partially over a public data network 204 (such as the Internet of other distributed computing network) to the gateway/modem device 202. Regardless, the gateway/modem device 202 then routes the Voice-over Internet Protocol call 140 to the alarm controller 106.

Figure 7:
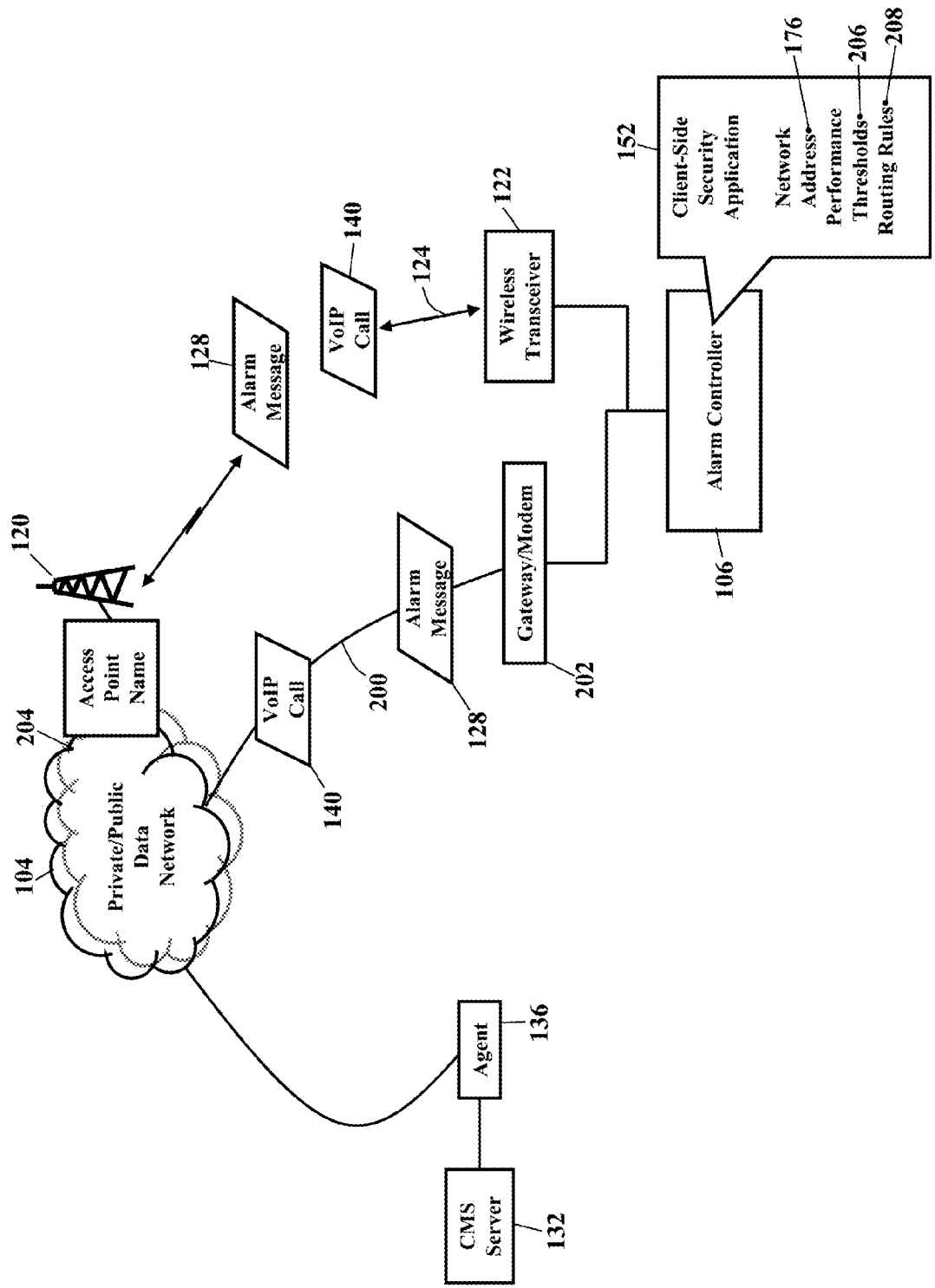
FIG. 7 is a schematic illustrating bandwidth verification, according to exemplary embodiments.

FIG. 7 is a schematic illustrating bandwidth verification, according to exemplary embodiments. Because the alarm controller 106 may have two simultaneous communications paths to the security server 130, the alarm controller 106 may select the best routing option. That is, at any time the alarm message 128 may be sent using either the wireless cellular network connection 124 and/or the wireline broadband connection 200. The alarm controller 106 may even receive the Voice-over Internet Protocol call 140 using either the wireless cellular network connection 124 and/or the wireline broadband connection 200. The client-side security application 152 may thus include one or more performance thresholds 206 and/or routing rules 208 that determine which routing path is preferred. The client-side security application 152, for example, may monitor and track or log bandwidth available from the wireless cellular network connection 124 and the wireline broadband connection 200. The client-side security application 152 may then compare bandwidth measurements to the performance thresholds 206 and select the communications path having the greatest bandwidth. If the wireless cellular network connection 124 has a larger bandwidth value, then the routing rules 208 may require the wireless cellular network connection 124 to send the alarm message 128 and/or to establish the Voice-over Internet Protocol call 140. If the wireline broadband connection 200 has the larger bandwidth value, then the routing rules 208 may cause the client-side security application 152 to select the wireline broadband connection 200. This selection process may be repeated for each communication to or from the alarm controller 106. This selection process, in other words, may be repeated for the Voice-over Internet Protocol call 140, for remote notification, for polling messages, and for connectivity messages (as later explained).

The performance thresholds 206 and/or routing rules 208, however, may be more complex. While bandwidth is a useful and simple measure of network performance, other factors may also be collected and compared. Network parameters measuring latency (delay), packet loss, and congestion may be collected to determine the best routing decision. Even urgency may be considered, such that the alarm message 128 has an urgent priority of transmission. The video data 230, too, may be urgent, and the bandwidth measurements may determine the fastest delivery route. Other messages, though, may be less urgent and even routine (such as polling responses or connectivity messages, explained later), so these messages may be sent over a slower, but less expensive, communications path. Cost may thus be an important factor, for the wireless cellular network connection 124 and the wireline broadband connection 200 may have different billing rates, access charges, and other incurred costs. The client-side security application 152 may thus evaluate network performance parameters to the performance thresholds 206 and select the preferred communications path.

Figure 8:
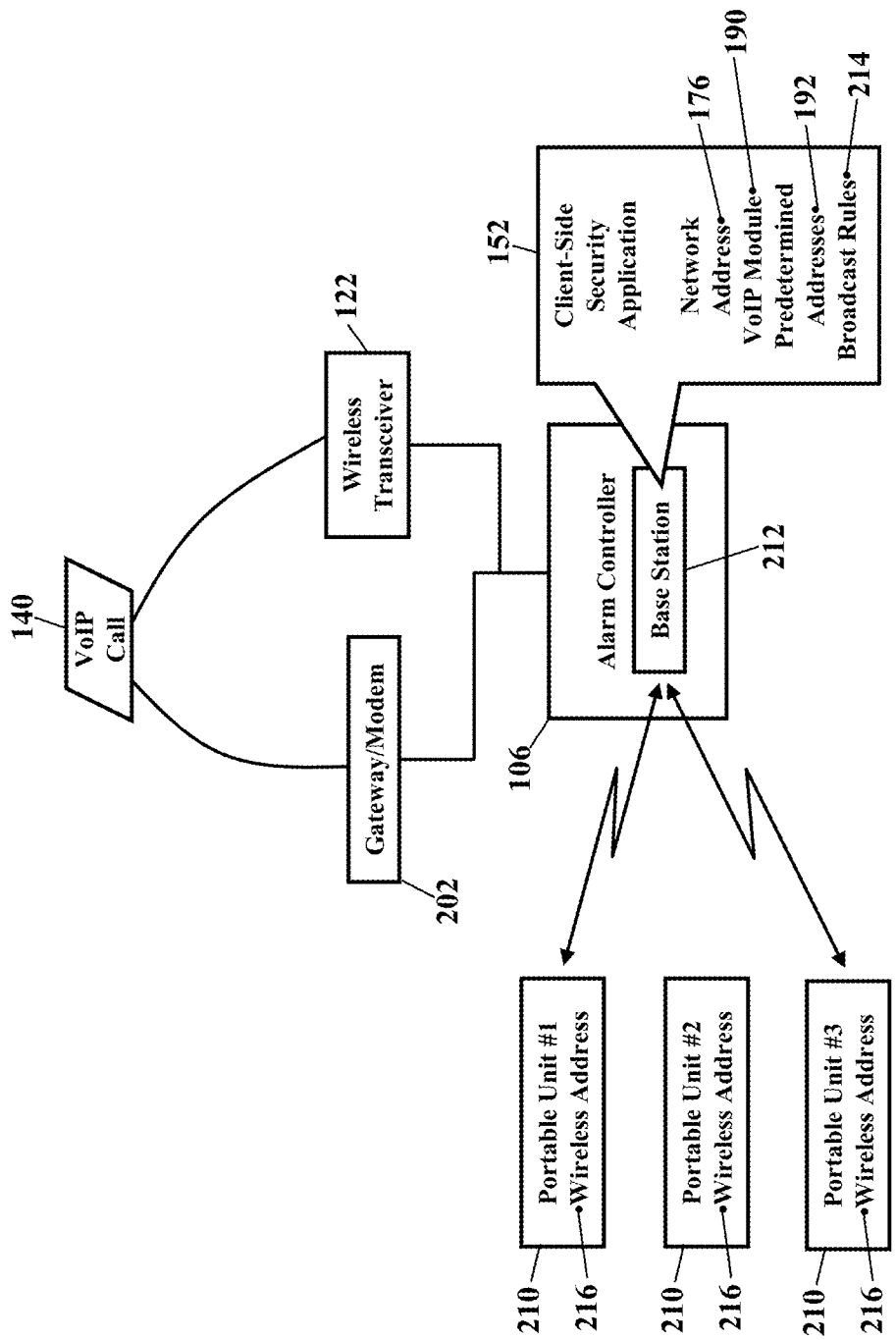
FIGS. 8 and 9 are schematics illustrating cordless voice and telephony capabilities, according to exemplary embodiments.
Figure 9:
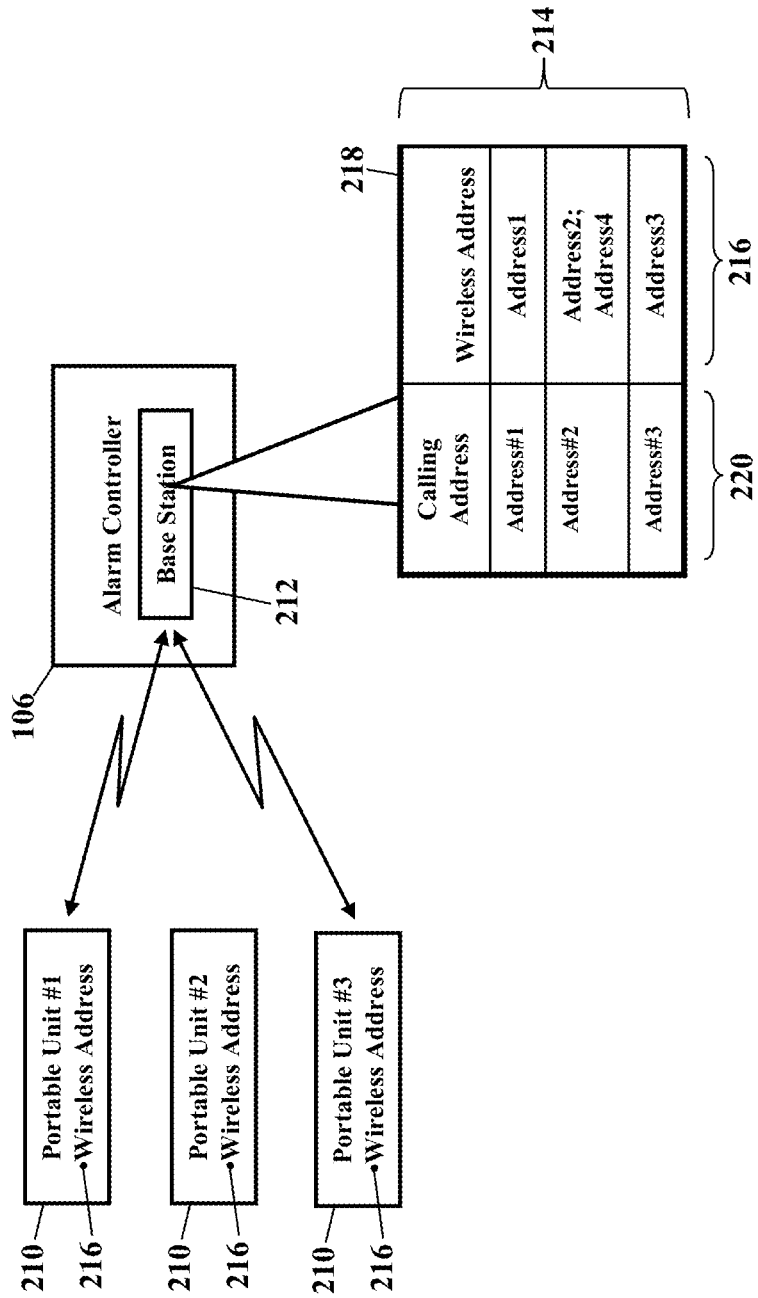

FIGS. 8 and 9 are schematics illustrating cordless voice and telephony capabilities, according to exemplary embodiments. Here, when the agent 136 calls the alarm controller 106 to verify the alarm condition 126, the call may route over the wireless cellular network connection 124 and/or the wireline broadband connection 200 (as the above paragraphs explained). Regardless, when the alarm controller 106 accepts the call, the call may be broadcast to one or more portable units 210 (such as cordless telephony handsets). The alarm controller 106 may thus have cordless voice and telephone capability to remotely communicate with the portable unit 210. As FIG. 8 illustrates, the alarm controller 106 may interface with a base station 212 that wirelessly communicates with each portable unit 210. Each portable unit 210, for example, may be a telephony speakerphone handset that is installed throughout the home or business. The client-side security application 152 may further have code, programming, or instructions that cause the alarm controller 106 to establish wireless telephony communication with the portable unit 210. The base station 212 and the portable units 210, for example, may communicate according to the Digital Enhanced Cordless Telecommunications (or "DECT") standard for cordless telephony and voice monitors. When the agent 126 calls the alarm controller 106, the VoIP module 190 may cause the alarm controller 106 to enter an off-hook mode of operation and automatically answer the Voice-over Internet Protocol call 140. The base station 212 may thus broadcast the Voice-over Internet Protocol call 140 to the one or more portable units 210 (i.e., speakerphone handsets) to provide two-way interactive voice communication. An occupant and the agent 126 may conduct a two-way voice conversation to access the emergency. Because the base station 212 may automatically answer the Voice-over Internet Protocol call 140, any occupants need not find the portable unit 210 and physically answer the call. The occupant need only speak to verify the emergency. The automatic answering feature also enables the agent to listen to what is occurring in the residence. If an occupant fails to speak and verify, the agent 126 may simply listen to ambient sounds for verification. The base station 212 and the portable units 210, however, may also communicate using any of the IEEE 802 family of standards (such as BLUETOOTH® or WI-FI®).

The base station 212 may execute broadcast rules 214. Because the alarm controller 106 may only accept calls from the predetermined addresses 192, the broadcast rules 214 may define how the base station 212 transmits calls to the one or more portable units 210. The base station 212, in other words, may selectively transmit calls based on the predetermined addresses 192 and/or the broadcast rules 214. When the alarm controller 106 receives the Voice-over Internet Protocol call 140, the VoIP module 190 may first compare the calling address (e.g., the calling telephone number or the calling Internet Protocol address) to the predetermined addresses 192 (as earlier paragraphs explained). If the calling address is matched to the predetermined addresses 192, then the VoIP module 190 may also retrieve the broadcast rule 214 that is associated with the calling address. Different broadcast rules 214 may be stored in the memory of the alarm controller 106, and each broadcast rule 214 determines how the base station 212 broadcasts the Voice-over Internet Protocol call 140.

FIG. 9 illustrates the broadcast rules 214. The broadcast rules 214 may define to which portable unit 210 the call is transmitted. Because there may be multiple portable units 210 installed throughout the home or business, each portable unit 210 may have a unique wireless address 216. Each portable unit 210, in other words, may be uniquely addressed using the corresponding wireless address 216 assigned to each portable unit 210. FIG. 9 illustrates the broadcast rules 214 as a table 218 that maps, relates, or calling addresses 220 to wireless addresses 216. The broadcast rules 214, however, may have any logical expression or structure that determines how calls are processed to the portable units 210. Regardless, the client-side security application 152 queries for the wireless address(es) 220 associated with the calling address 220. The client-side security application 152 retrieves the wireless address(es) 220 and instructs the base station 212 to send the Voice-over Internet Protocol call 140 to those wireless address(es) 220. Exemplary embodiments thus permit the Voice-over Internet Protocol call 140 to be broadcast to a single portable unit 210, or to multiple portable units 210, per the broadcast rules 214. Because each portable unit 210 is addressable, the Voice-over Internet Protocol call 140 may not be transmitted to a particular portable unit 210, per the broadcast rules 214. Calls from the agent 136, for example may be transmitted to all the portable units 210 to ensure the occupant answers the call 140 using any of the portable units 210. If the call is from a family member, then perhaps the call is only transmitted to some of the portable units 210. The broadcast rules 214 may thus be defined as best suits the occupant.

The base station 212 and the portable units 210 aid in verification of alarms. During the alarm condition 126, the agent 136 at the central monitoring station 102 calls the alarm controller 106 to verify the alarm. The VoIP module 190 may use session initiation protocol (SIP) and instruct the base station 212 to auto-answer the incoming Voice-over Internet Protocol call 140 and to command one, or more, portable units 210 to go off-hook. Then agent 136 begins speaking through the portable units 210 with an occupant to verify the alarm.

The base station 212 and the portable units 210 also provide an intercom feature. Because the base station 212 wirelessly communicates with the portable units 210, these components also provide two-way intercommunications throughout the home or business. During non-alarm conditions the portable units 210 may be used as intercom speakerphone units to communicate with an occupant at the base station 212 and/or alarm controller 106.

Figure 10:
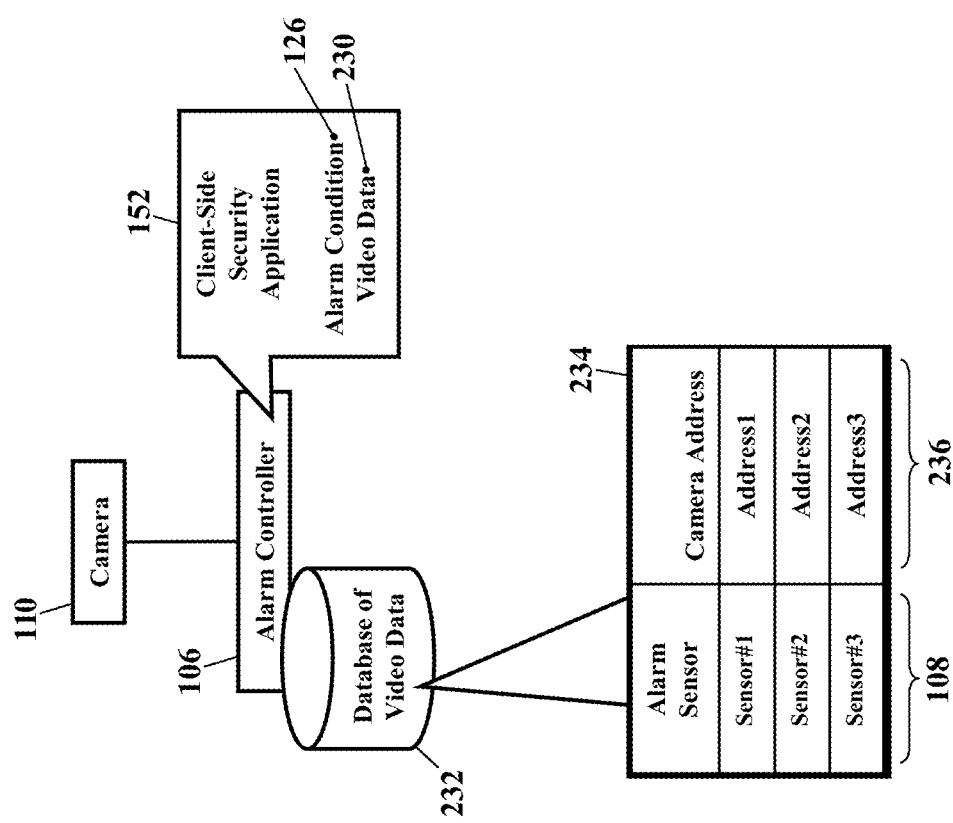
FIGS. 10-12 are schematics illustrating video data, according to exemplary embodiments.
Figure 11:
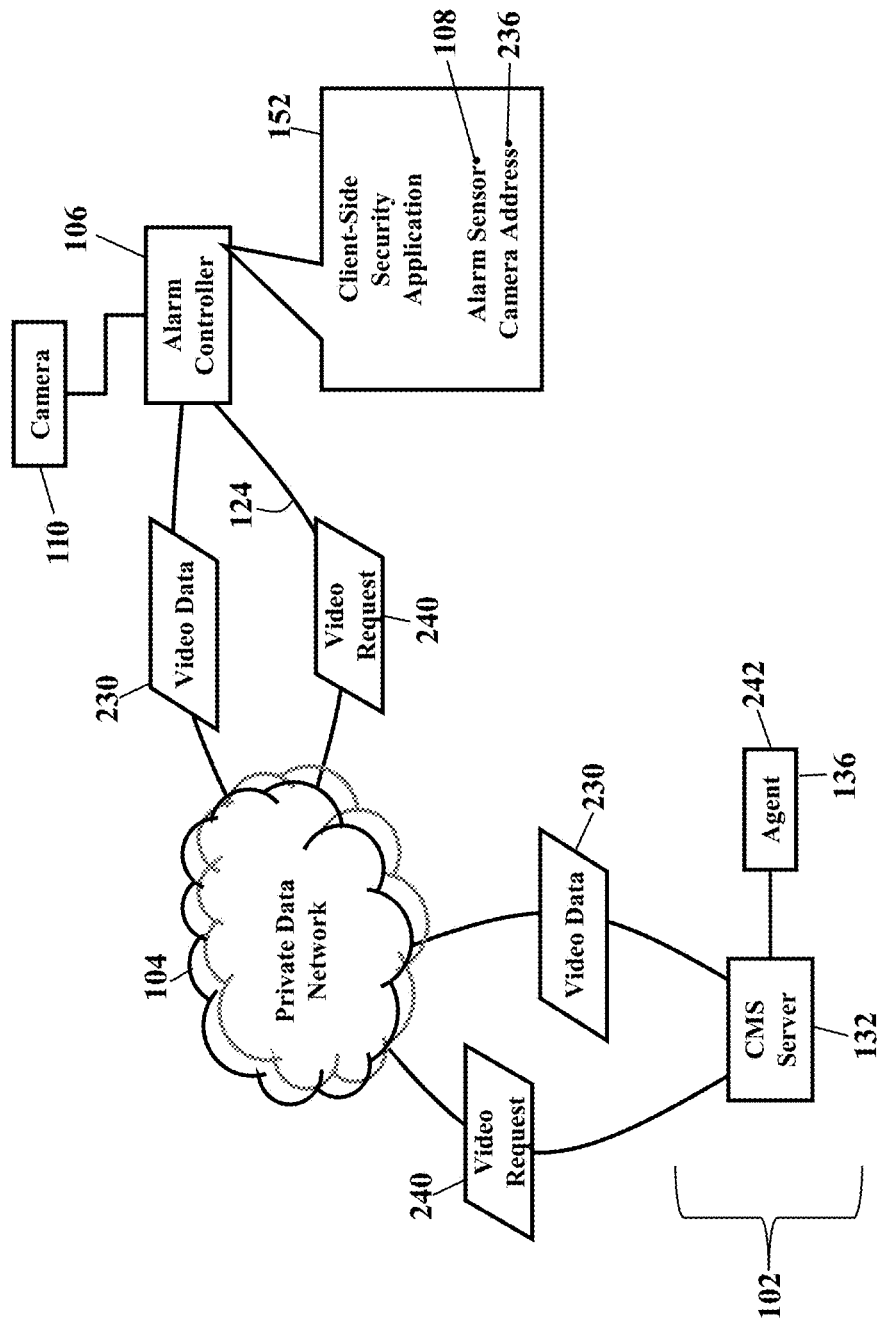
Figure 12:
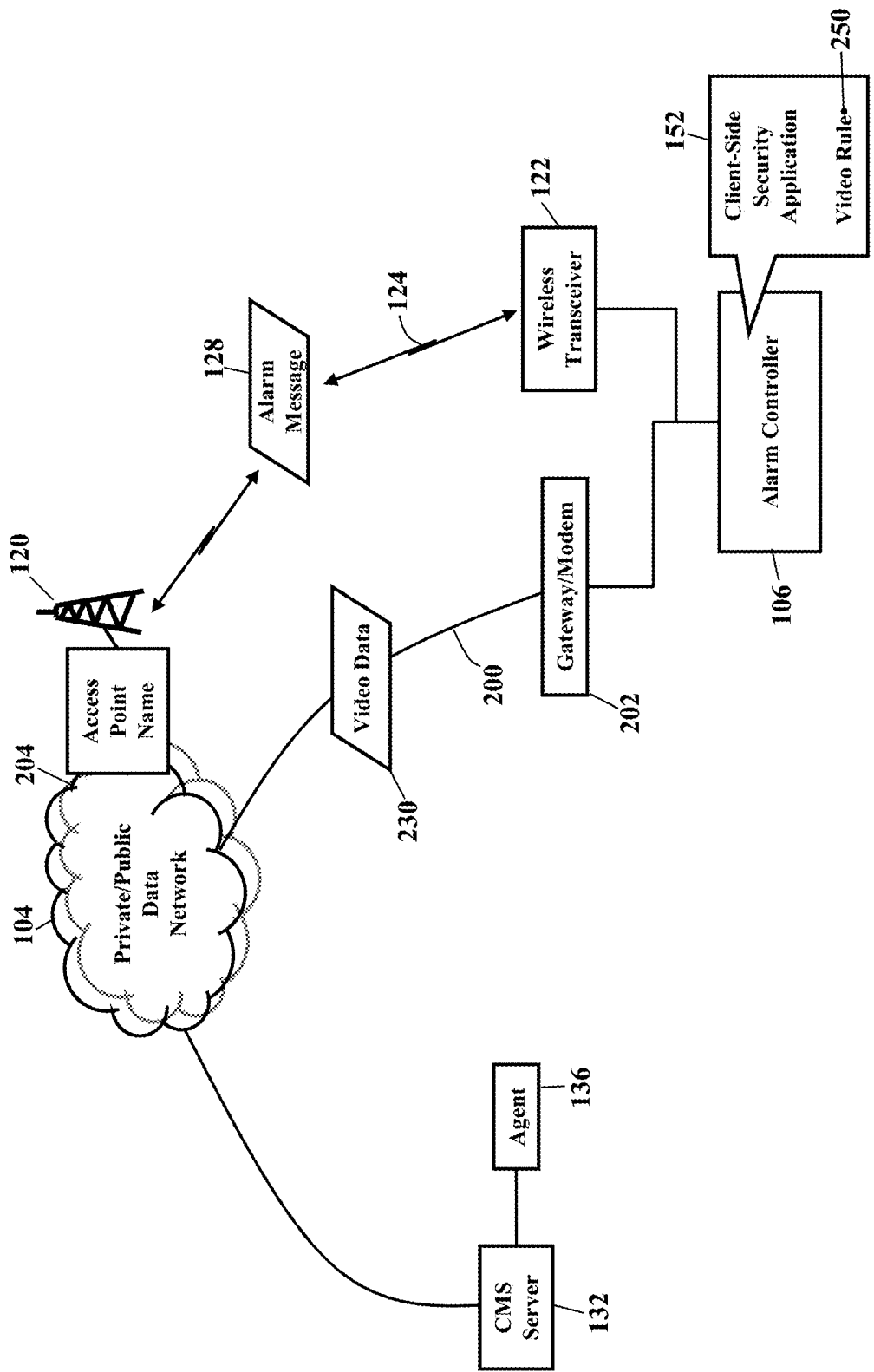

FIGS. 10-12 are schematics illustrating video data 230, according to exemplary embodiments. When the alarm controller 106 detects the alarm condition 126, exemplary embodiments may also capture and/or retrieve video data 230 of the possible intrusion, fire, or other emergency. As FIG. 10 illustrates, the client-side security application 152 may query a database 232 of video data. The database 232 of video data stores the video data 230 captured from the cameras 110 in the home or business. The video data 230 may be real-time or archived. Because there may be multiple cameras 110 in the home or business, exemplary embodiments may select the camera 110 that best provides video of the possible emergency. Camera #1, for example, may be trained or aimed on the kitchen door, while camera #2 captures a front entry door. Cameras may be installed throughout the home or business to provide views of many windows, doors, and other locations. If a camera is motorized to pan and/or to zoom, then the camera 110 may also have multiple orientations for multiple views. FIG. 10 illustrates the database 232 of video data as a table 234 that maps, relates, or associates alarm sensors 108 to camera addresses 236. The database 232 of video data may thus store relationships that best capture the video data 230 of an area associated with the alarm sensor 108. When the client-side security application 152 queries the database 232 of video data for the alarm sensor 108, the client-side security application 152 may also retrieve the corresponding camera address 236. Because there may be multiple cameras throughout a home or business, each camera may be uniquely identified by the camera address 236 (such as a public or private Internet Protocol address). Once the camera address 236 is known, exemplary embodiments may obtain the corresponding video data 230 to further verify the intrusion.

FIG. 11 illustrates the video data 230. The agent 136 at the central monitoring station 102 may send a video request 240 instructing the alarm controller 106 to retrieve and send the video data 230 captured by the camera 110 associated with the alarm sensor 108. When the alarm controller 106 receives the video request 240, the client-side security application 152 retrieves the live and/or archived video data 230 associated with the corresponding camera address 236. The alarm controller 106 sends the relevant video data 230 to some network address (such as the agent's computer terminal 242). The agent 136 may thus view the video data 230 to help verify the intrusion.

The video data 230, however, may be automatically sent. When the alarm controller 106 detects the alarm condition 126, the client-side security application 152 may be programmed or configured to automatically sent the video data 230. This automatic response may be desired when bandwidth is not a concern, such as holidays or hours when the data network 104 is uncongested. The client-side security application 152 may thus automatically retrieve and send the video data 230 whenever the alarm condition 126 is detected. When the alarm condition 126 is detected, the client-side security application 152 may automatically query for the camera address 236 associated with the alarm sensor 108. The client-side security application 152 retrieves the video data 230 from the camera 110 at the camera address 236. The client-side security application 152 may then send the video data 230 to accompany the alarm message 128.

The amount of the video data 230, however, may be limited. If a large amount of the video data 230 is automatically retrieved and sent, chances are high that delivery will be delayed or even fail. The video data 230 may be bandwidth intensive, so the wireless cellular network connection 124 may congest and delay or fail. Exemplary embodiments may thus only send, or stream, a specified amount or duration of the video data 230 (such as ten seconds). This video data 230 may be automatically buffered (perhaps on a first in, and first out basis) in the memory of the alarm controller 106 and/or in the mass storage device 114 (as FIG. 1 illustrated). If the home or business has multiple cameras, then the video data 230 from each camera 110 may be stored. During the alarm condition 126 the alarm controller 106 streams a snippet of the video data 230 (perhaps via fttp) to the central monitoring station ("CMS") server 132. The agent 136 is notified that the video data 230 is available for verification. Because the video data 230 may be buffered on a continuous basis, the alarm controller 106 may retrieve and stream pre-alarm and post-alarm video data. That is, five seconds of video data 230 captured before the alarm condition 126 may be sent, along with five seconds captured after the alarm condition 126 is detected. The agent 136 may even have permission to access live video data.

The agent 136 (perhaps at the agent's computer terminal 242) may request video from any camera 110. As the agent 136 attempts to verify the alarm, the agent may select any of the cameras 110 in the home or business and receive streaming video data 230. The agent's computer terminal 242 may even display information indicating the camera, camera zone, and/or the alarm condition 126. The agent's computer terminal 242 may also display a graphical user interface that permits the agent 136 to access the live video data 230 from any camera 110 in the home or business. Under most circumstances the agent 136 will receive and view the live video data 230 from one camera 110 at a time. If bandwidth permits, though, the agent may select and view live video data 230 from multiple cameras 110 at one time. The live video data 230 will not create congestion in the private data network 104, so the only congestion may occur in the customer's access network (e.g., the wireless cellular network connection 124 and/or the wireline broadband connection 200). For example, if a customer has a wireline broadband ADSL service with 1.5 Mbps downstream and 256 Kbps upstream, the upstream bandwidth could be limiting.

The agent 136 may search the video data 230. The alarm controller 106 may interface with the mass storage device 114 (as FIG. 1 illustrated). The alarm controller 106 may thus locally archive streaming video data 230 from the cameras 110 in the home or business. The agent 136 may thus access search functions that permit locating the video data 230 output by a particular camera 110.

FIG. 12 illustrates a dedicated communications path for the video data 230. As this disclosure earlier explained, the alarm controller 106 may have two communications paths to the security server 130. The alarm controller 106 may send and receive data over the wireless cellular network connection 124. The alarm controller 106, however, may also send and receive data over the wireline broadband connection 200. Exemplary embodiments may thus be configured to always prefer one or the other communications path. Exemplary embodiments, for example, may prefer the wireless cellular network connection 124 for the alarm message 128, but the wireline broadband connection 200 is preferred when sending the video data 230. Even though the alarm controller 106 may always send the alarm message 128 over the wireless cellular network connection 124, the alarm controller 106 may decline the wireless cellular network connection 124 for the video data 230. The video data 230 may burden the wireless cellular network connection 124, thus denying the agent 136 high-quality video data for security purposes. Indeed, the video data 230 may cause congestion in a wireless network, and delivery may even timeout or fail. When the video data 230 is sent from the alarm controller 106, the client-side security application 152 may retrieve and execute a video rule 250. The video rule 250 instructs or forces the alarm controller 106 to automatically route the video data 230 over the wireline broadband connection 200 to avoid congesting the wireless access point 120.

Figure 13:
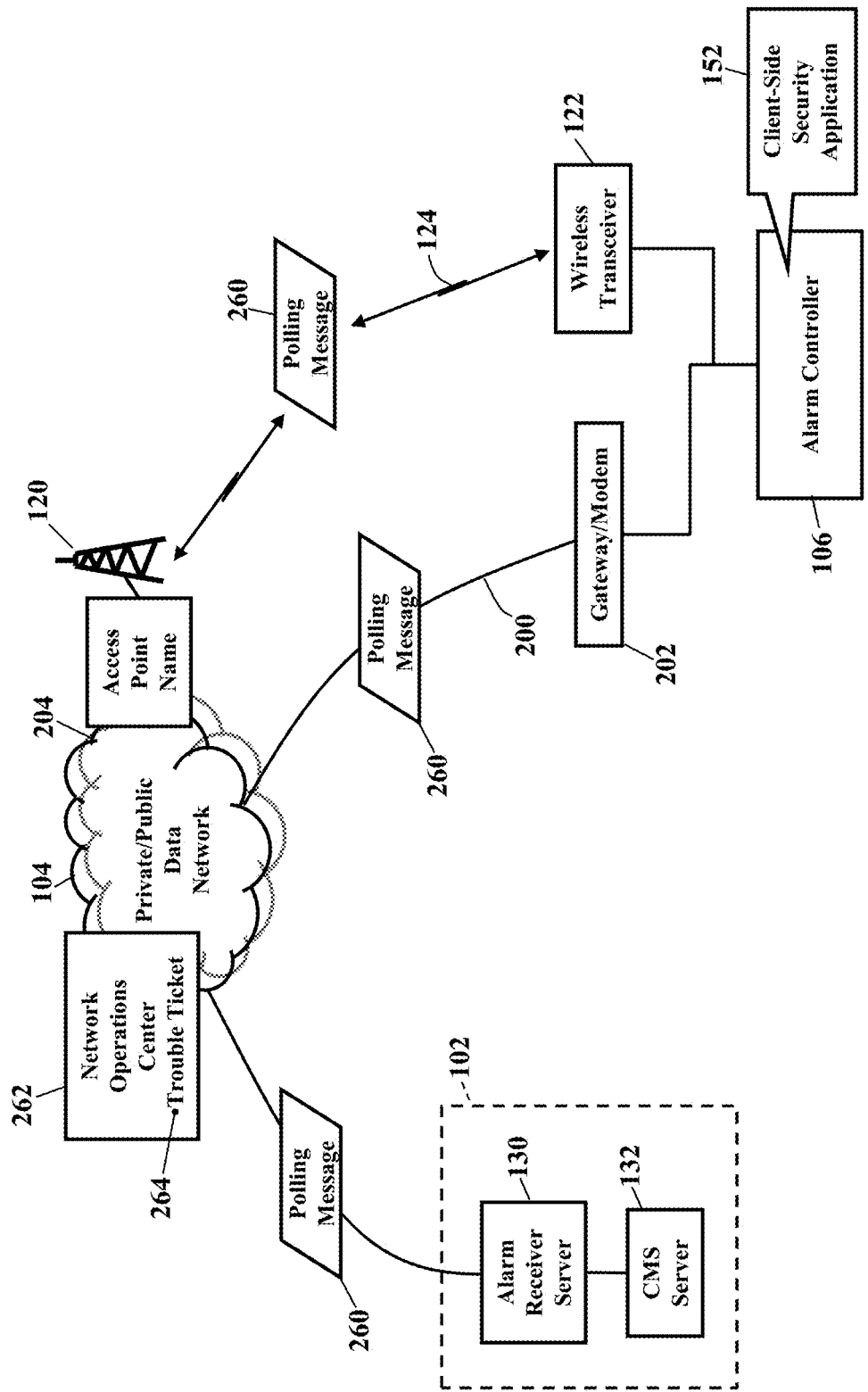
FIGS. 13-15 are schematics illustrating data connectivity, according to exemplary embodiments.
Figure 14:
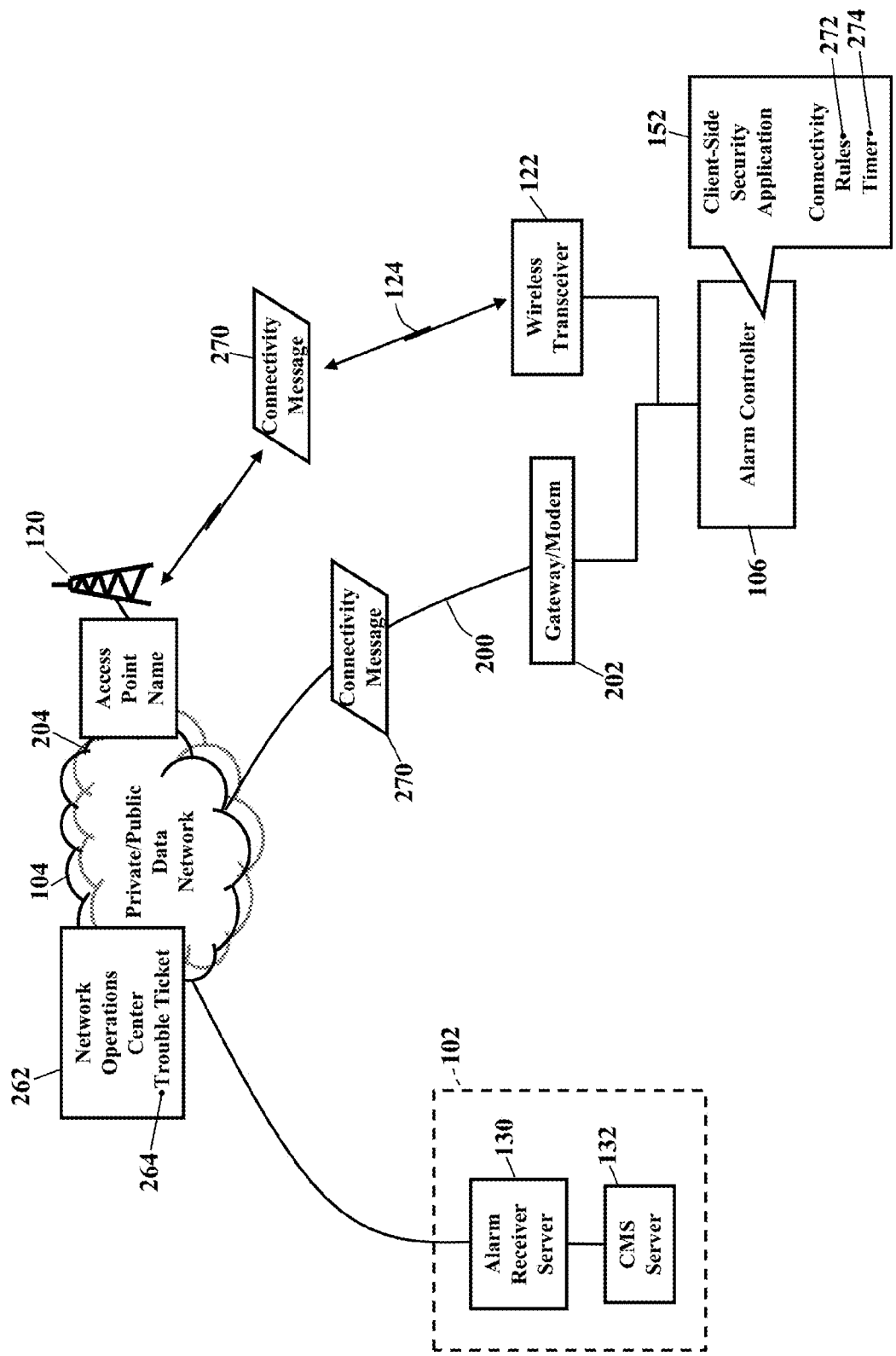
Figure 15:
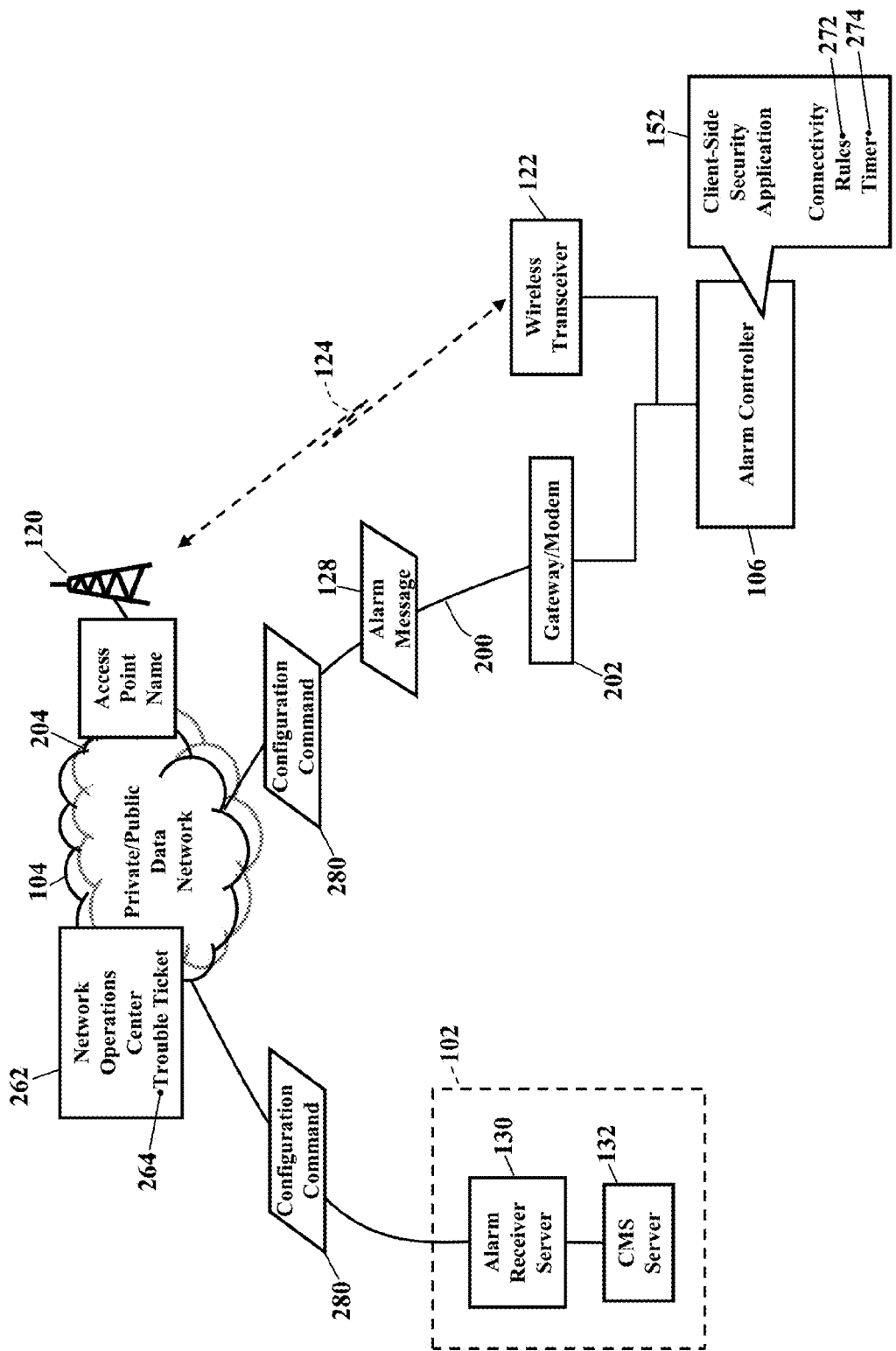

FIGS. 13-15 are schematics illustrating data connectivity, according to exemplary embodiments. Here the central monitoring station 102 may continuously monitor data connectivity to the alarm controller 106. If the central monitoring station 102 cannot communicate with the alarm controller 106, the essential security functions have failed. The central monitoring station 102 may thus monitor data connectivity to ensure either the wireless cellular network connection 124 or the wireline broadband connection 200 is always available.

FIG. 13 illustrates polling messages 260 that are sent from the central monitoring station 102. The central monitoring station 102 (e.g., the centralized alarm receiver server 130 and/or the central monitoring station ("CMS") server 132) may continuously or periodically send a polling message 260 (or "ping") to the alarm controller 106. Each polling message 260 allows the central monitoring station 102 to randomly or periodically determine the status of the wireless cellular network connection 124 and the wireline broadband network connection 200. If the alarm controller 106 responds, then connectivity is successful. Exemplary embodiments may thus poll for the availability of each simultaneous network connection 124 and 200. If a "ping" is unsuccessful, then a trouble condition may be automatically reported to a network operations center 262. Personnel in the network operations center 262 will then identify and isolate the trouble. A trouble ticket 264 may be automatically generated to restore service.

Each polling message 260 may specifying routing. When the polling message 260 is sent, the polling message 260 may specify the communications path to be used. That is, the headers and/or payload of a packet may require routing over either the wireless cellular network connection 124 or over the wireline broadband network connection 200. If a response is received from the alarm controller 106, then the security server 130 knows the respective communications path is functioning.

FIG. 14 illustrates a self-reporting feature. Here the alarm controller 106 may self-report its connectivity to the central monitoring station 102. That is, the client-side security application 152 causes the alarm controller 106 to automatically send a connectivity message 270 to the centralized alarm receiver server 130 and/or the central monitoring station ("CMS") server 132). A first connectivity message 270, for example, is sent over the wireless cellular network connection 124, while a second connectivity message 270 is sent over the wireline broadband network connection 200. If the central monitoring station 102 receives either connectivity message 270, then the security server 130 knows the respective communications path is functioning.

The self-reporting feature illustrated in FIG. 14 reduces traffic. If the polling message 260 is sent, the alarm controller 106 sends responses. This poll-and-response technique thus adds significant traffic to the data network 104, and responses from many security subscribers may congest the data network 104. The self-reporting feature of FIG. 14, though, reduces traffic by half. Because each alarm controller 106 may self-report the connectivity message 270, the security server 130 need not respond. That is, as long as the central monitoring station 102 receives each connectivity message 270, the central monitoring station 102 knows the respective communications path is functioning. No response need be sent, so the self-reporting feature of FIG. 14 reduces traffic by half.

FIG. 14 also illustrates connectivity rules 272. Here the connectivity rules 272 may define how often the alarm controller 106 self-reports itself to the central monitoring station 102. As the client-side security application 152 executes the connectivity rules 272, the connectivity rules 272 cause the client-side security application 152 to send the connectivity messages 270. The connectivity rules 272 cause the connectivity messages 270 to be sent over both the wireless cellular network connection 124 and over the wireline broadband network connection 200. Each connectivity message 270 identifies either the wireless cellular network connection 124 or the wireline broadband network connection 200, thus identifying the communications path over which the connectivity message 270 is routed. A header or payload of a packet, for example, may identify either the wireless cellular network connection 124 or the wireline broadband network connection 200. The connectivity rules 272 may thus define how often the connectivity messages 270 are sent from the alarm controller 106.

The connectivity rules 272 may be defined or configured. Business customers, for example, may have higher liability and security concerns, so the connectivity rules 272 may require more frequent connectivity messages 270 than residential customers. A timer 274 may thus be initialized that defines the frequency of each connectivity message 270. When the timer 274 counts down to a final value, another connectivity message 270 is sent. The connectivity rules 272 and/or the timer 274 may be defined or configured to specify how frequently the connectivity messages 270 are sent, and over which communications path (e.g., the wireless cellular network connection 124 and/or the wireline broadband network connection 200) is used. As an example, commercial/business customers may require confirmation of connectivity at least every 200 seconds to verify a single communications connection, but the dual-path route (e.g., the wireless cellular network connection 124 and/or the wireline broadband network connection 200) may only require confirmation every 300 seconds. Residential customers may be content with confirmation of connectivity at least once per month, once per day, or even hourly. If the central monitoring station 102 fails to receive a connectivity message 270, the central monitoring station 102 may then send the polling message 260 (as FIG. 13 illustrated) as a back-up verification process. If no response is received, then a trouble condition may be automatically reported to the network operations center 262.

FIG. 15 illustrates more verification procedures. If the central monitoring station 102 determines one of the communications paths is down, procedures may be implemented to require the other communications path. For example, if the wireless cellular network connection 124 is unavailable, the central monitoring station 102 will not receive a response to the polling message 260 sent over the wireless cellular network connection 124. The central monitoring station 102 may thus send a configuration command 280 to the alarm controller 106. Because the wireless cellular network connection 124 is unavailable, the central monitoring station 102 routes the configuration command 280 over the wireline broadband network connection 200. The configuration command 280 changes the configuration parameters in the client-side security application 152 to always utilize the available wireline broadband network connection 200 until further instructed. That is, the client-side security application 152 is instructed to route future alarm messages 128 over the available wireline broadband network connection 200. Conversely, if wireline broadband network connection 200 is unavailable, the configuration command 280 instructs the client-side security application 152 to send the video data (illustrated as reference numeral 230 in FIG. 12) over the wireless cellular network connection 124 until further instructed. If the video data 230 causes too much congestion, though, the alarm controller 106 may be instructed to disregard the video request (illustrated as reference numeral 240 in FIG. 11) and/or to decline to send the video data 230. When service is restored, another configuration command 280 may be sent to restore the configuration parameters in the client-side security application 152.

Figure 16:
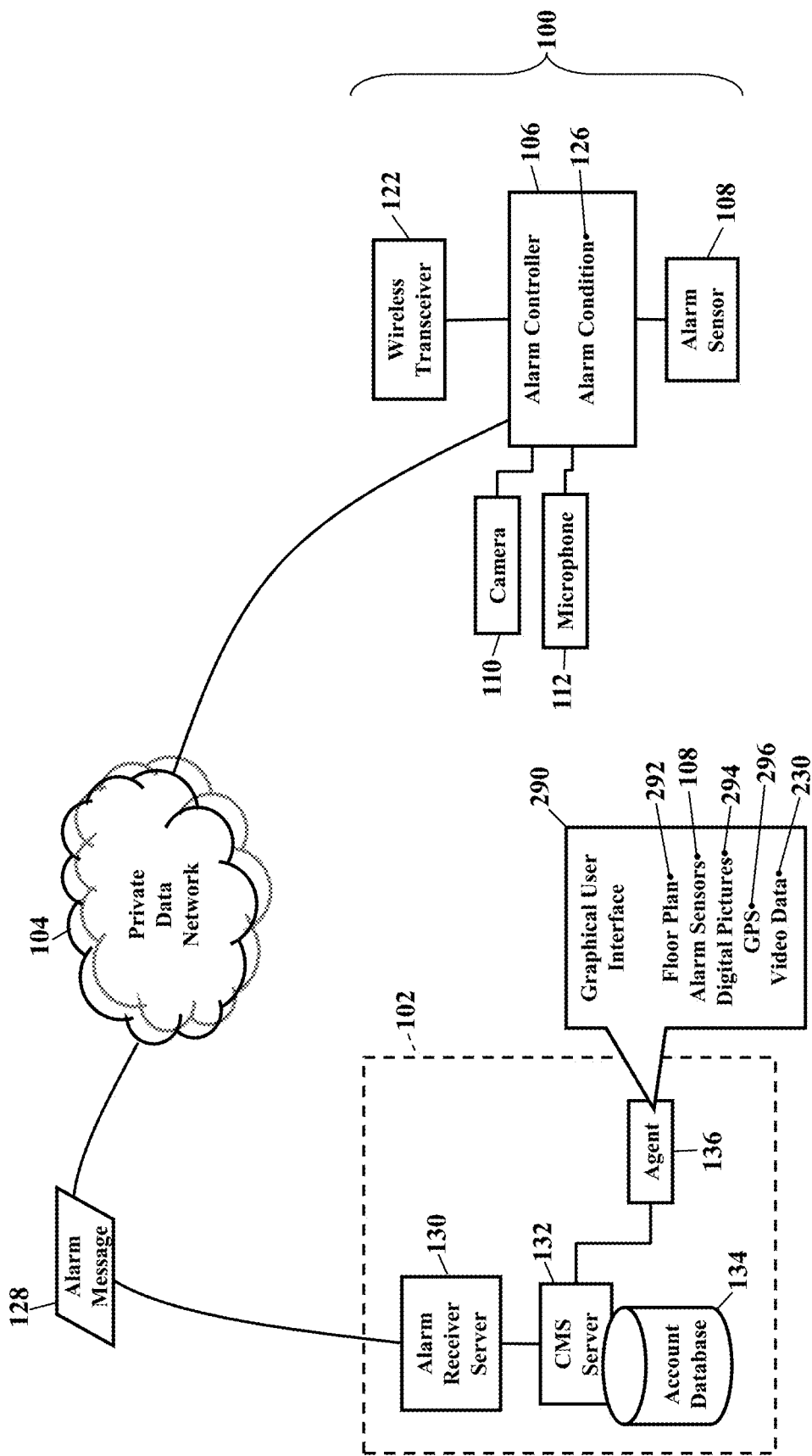
FIG. 16 is a schematic illustrating a graphical user interface, according to exemplary embodiments.

FIG. 16 is a schematic illustrating a graphical user interface 290, according to exemplary embodiments. The graphical user interface 290 may be produced on the agent's computer terminal 242 to help verify alarms. When an alarm is detected, the customer's security system 100 sends the alarm message 128 to the centralized alarm receiver server 130. The alarm message 128 routes to the central monitoring station ("CMS") server 132 and the agent 136 is selected to verify the alarm before summoning emergency services. As FIG. 16 illustrates, the graphical user interface 290 may help the agent 136 verify the alarm. The graphical user interface 290 is displayed by a display device and visually presents verification information. The graphical user interface 290, for example, may display a floor plan 292 of the customer's residence or business, along with an overlay of the alarm sensors 108. That is, the graphical user interface 290 may map a location of each alarm sensor 108 onto the floor plan 292. Digital pictures 294 of the home or business may be included, along with pictures of the occupants. Global Positioning System (GPS) coordinates 296 may also be displayed for the alarm sensors 108 and/or other physical features. The video data 230 may also be presented to further aid the agent 136.

Figure 17:
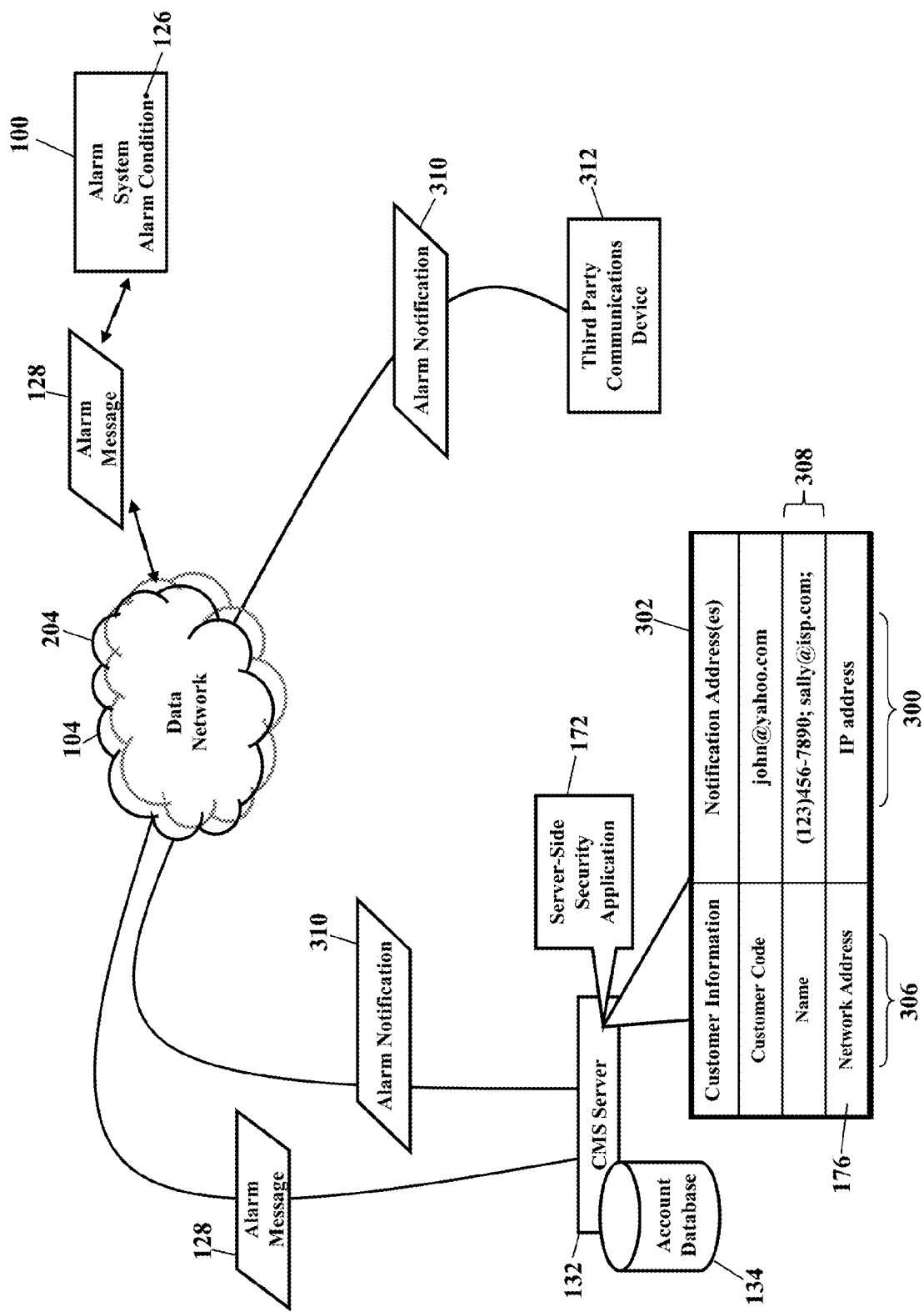
FIG. 17 is a schematic illustrating remote verification, according to exemplary embodiments.

FIG. 17 is a schematic illustrating remote verification, according to exemplary embodiments. If the Voice-over Internet Protocol call 140 to the alarm controller 106 is unanswered, remote verification may be authorized. The server-side security application 172 may thus attempt to notify one or more other addresses when the alarm condition 126 is detected. As FIG. 17 illustrates, the server-side security application 172 may query for one or more notification addresses 300. Each notification address 300 is any communications address which is notified of alarms detected by the alarm controller 106. The server-side security application 172 may query a notification table 302 for the notification address(es) 300. FIG. 17 illustrates the notification table 302 stored in the central monitoring station ("CMS") server 132, but the notification table 302 may be remotely located and accessed from any location or device in the data network 104 and/or in the public data network 204. The notification table 302 associates some customer information 306 to the notification addresses 300. The customer information 306 may be any information that uniquely identifies the customer, such as a customer code, physical address, name, or even the network address 176 assigned to the alarm controller 106. Once the customer information 306 is obtained from the account database 134, the server-side security application 172 queries the notification table 302 for the customer information 306. The notification table 302 returns the notification address(es) 300 approved for remote notification. Each notification address 300 may be a telephone number, email address, other Internet Protocol address, or any other communications address to which notifications are sent. Indeed, multiple notification addresses 300 may be associated to the network address 176 of the alarm controller 106. Exemplary embodiments may thus retrieve a list 308 of notification addresses. Each entry in the list 308 of notification addresses may be a telephone number, Internet Protocol address, email address, and/or any other communications address.

An alarm notification 310 is then sent. The server-side security application 172 causes the central monitoring station ("CMS") server 132 to format the alarm notification 310 and to send the alarm notification 310 to each entry in the list 308 of notification addresses. The alarm notification 310 may be an electronic message, such as a text message or email message. The alarm notification 310, however, may also be an analog telephone call or a Voice-over Internet Protocol call. Regardless, the alarm notification 310 may include information describing the alarm condition 126 (such as the alarm sensor 108, the customer information 306, a physical street address of the alarm controller 106, and/or any other information). The alarm notification 310 routes through the data network 104 and/or the public data network 204 to a third party communications device 312 associated with one of the notification addresses 300. If the alarm notification 310 involves analog telephony, the alarm notification 310 may also route along some portion of a public-switched telephony network. The server-side security application 172 may thus notify friends, neighbors, a spouse, children, and any communications addresses in the list 308 of notification addresses.

Figure 18:
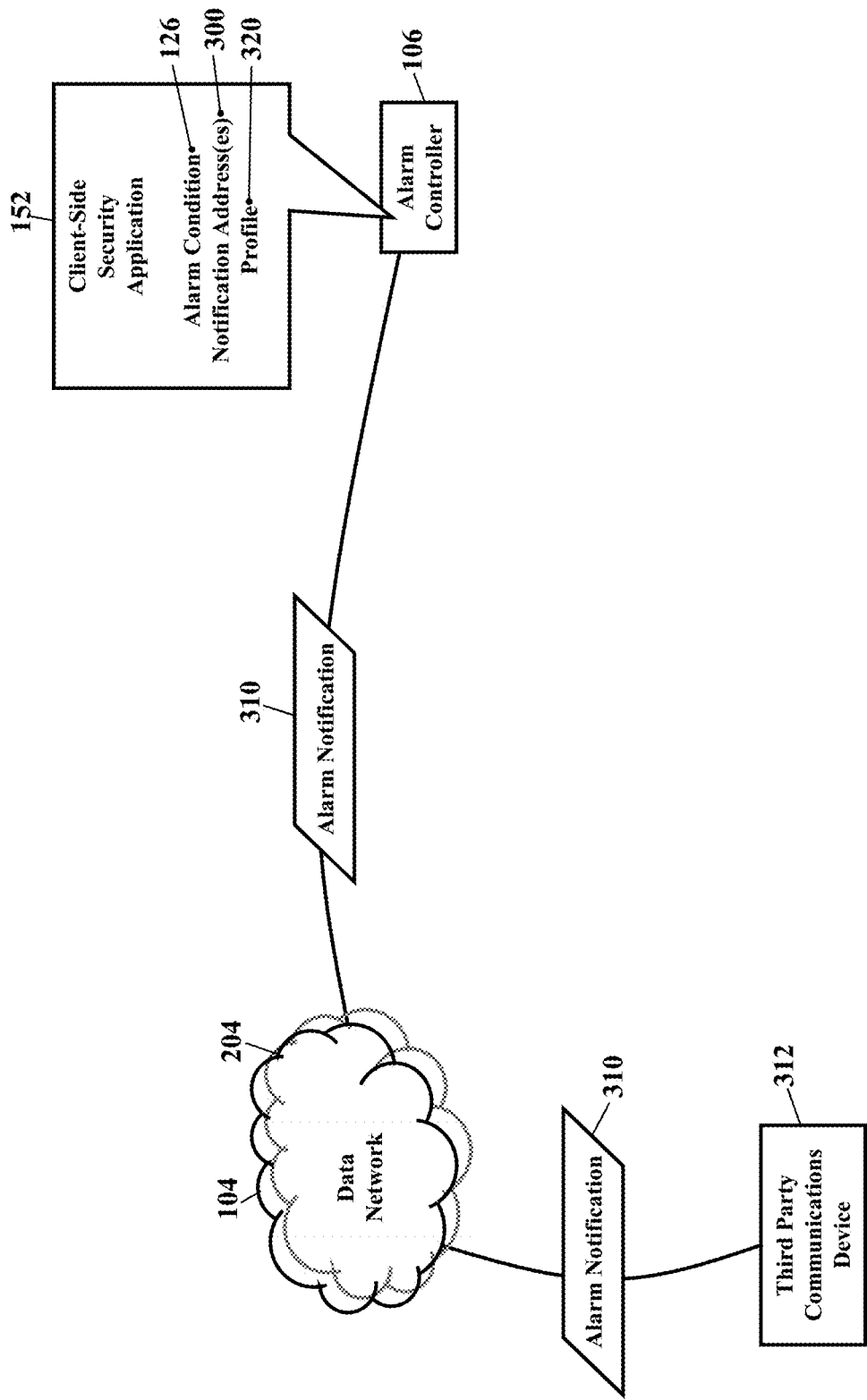
FIG. 18 is another schematic illustrating remote verification, according to exemplary embodiments.

FIG. 18 is another schematic illustrating remote verification, according to exemplary embodiments. Here the alarm controller 106 itself may notify others when alarms are detected. When the alarm controller 106 detects the alarm condition 126, the client-side security application 152 may access the notification address 300 that is approved for remote notification. FIG. 18 illustrates the notification address 300 as being locally stored in the alarm controller 106, perhaps associated with a profile 320 of the occupant or home/business. If multiple notification addresses 300 are approved for remote notification, then the list of notification addresses (illustrated as reference numeral 308 in FIG. 17) may be retrieved. The client-side security application 152 formats the alarm notification 310 and sends the alarm notification 310 to each notification address 300 approved for remote notification. The alarm notification 310 may again include any information (such as the alarm sensor 108, the customer information 306, and/or the physical street address of the alarm controller 106). FIG. 18 illustrates the alarm notification 310 routing to the recipient at the third party communication device 312.

Figure 19:
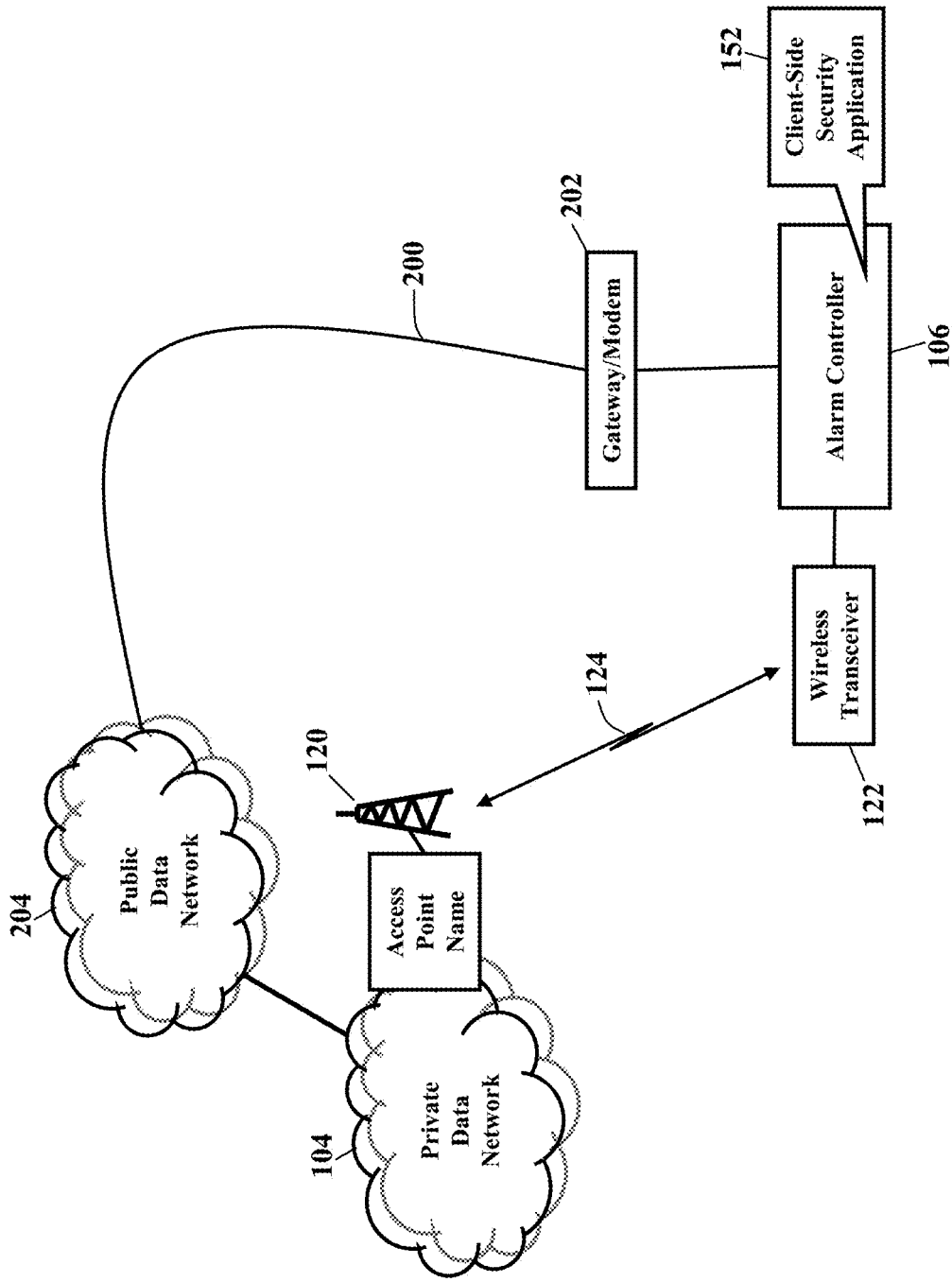
FIGS. 19-20 are schematics further illustrating the security system, according to exemplary embodiments.
Figure 20:
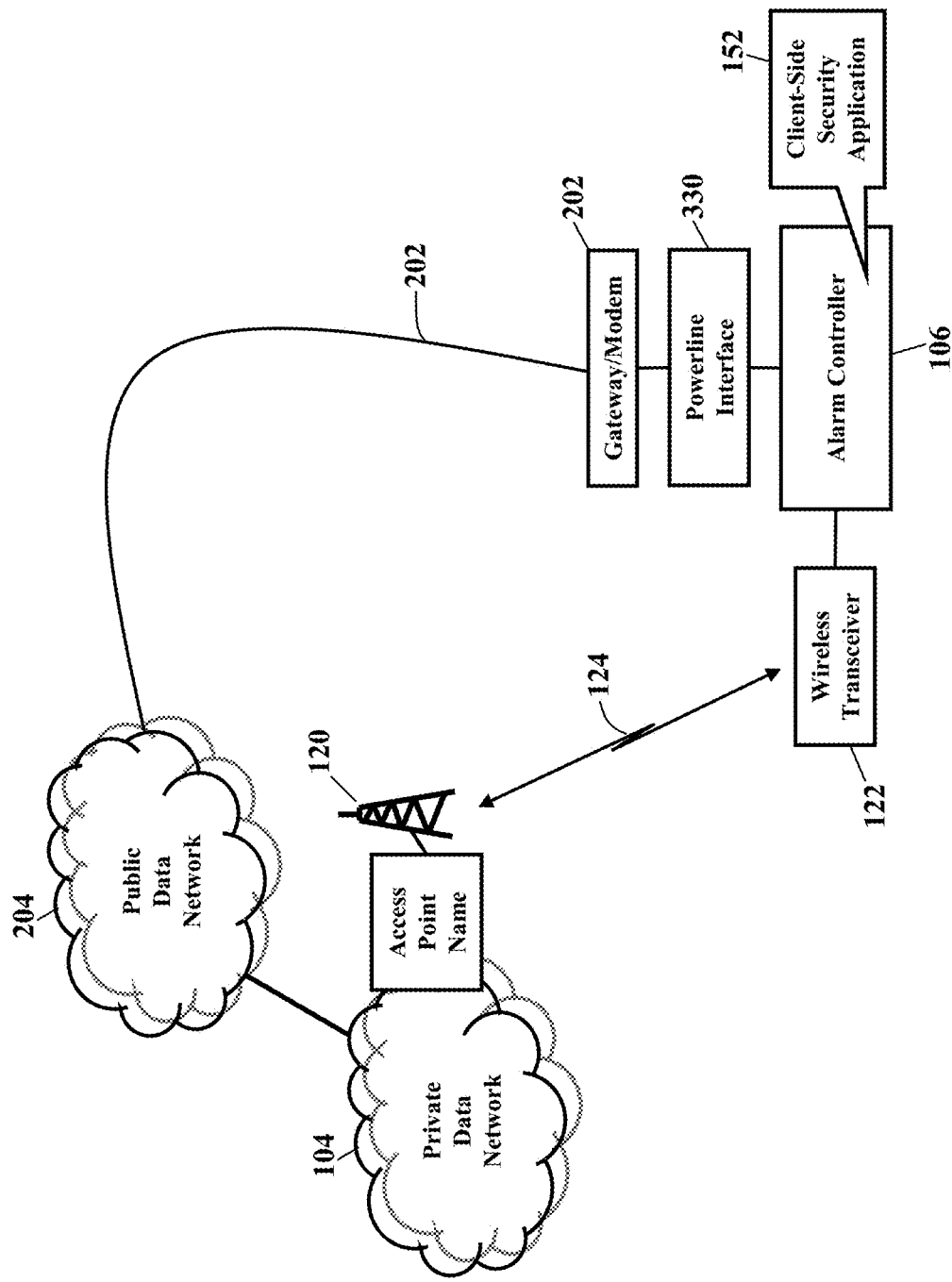

FIGS. 19-20 are schematics further illustrating the security system 100, according to exemplary embodiments. Here the residential or business security system 100 need not include a broadband modem. That is, the alarm controller 106 may simply plug-in, or interface to, the existing cable, digital subscriber line (DSL), or other gateway/modem device 202. FIG. 19, for example, illustrates a cable (e.g., CAT 5, 6, or 7) interconnecting a port of the occupant's existing gateway/modem device 202 to the alarm controller 106. FIG. 20 illustrates an alternative powerline interface 330 (such as HOMEPLUG®) that allows the occupant's existing gateway/modem device 202 to interface with the alarm controller 106. Exemplary embodiments thus allow the alarm controller 106 to be deployed in any home or business, regardless of the gateway/modem device 202 (e.g., ADSL, VDSL, GPON, and bring-your-own broadband).

FIGS. 21-24 are schematics illustrating the alarm sensor 108, according to exemplary embodiments. Here each alarm sensor 108 may have a wireless interface 360 to the alarm controller 106. Conventional security systems use wired sensors to detect security events. Wired sensors, though, are difficult to install, often requiring specialized installations and routings of wires. Exemplary embodiments may thus utilize the wireless interface 360 for easier and cheaper installations.

Figure 21:
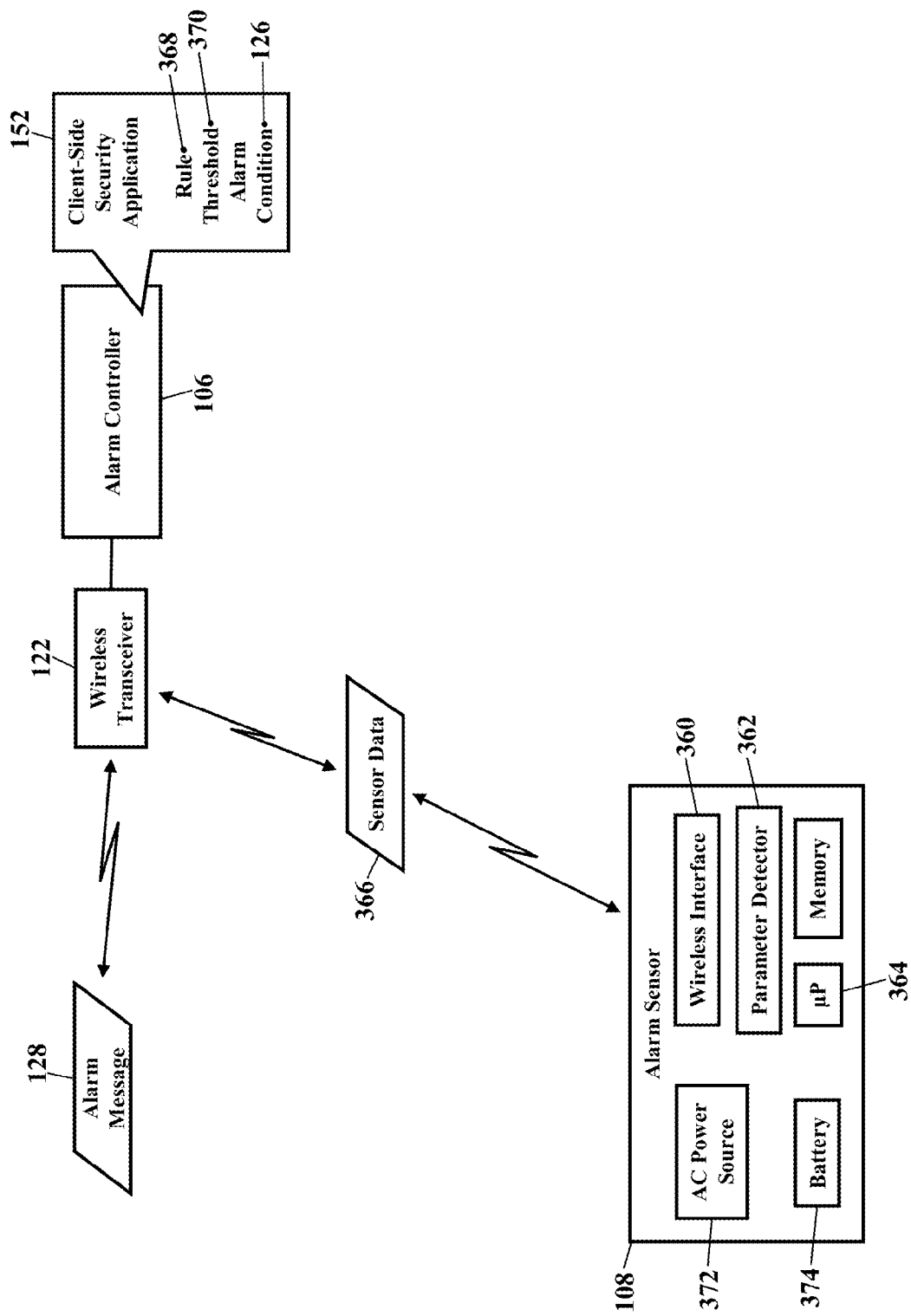
FIGS. 21-24 are schematics illustrating an alarm sensor, according to exemplary embodiments.

FIG. 21 is a block diagram of the alarm sensor 108. The alarm sensor 108 has a parameter detector 362 that detects or senses some physical or logical parameter (such as temperature, smoke, motion, or sound). A sensor processor 364 commands the wireless interface 360 to wirelessly send or broadcast sensor data 366. The sensor data 366 is wirelessly received by the alarm controller 106. The wireless transceiver 122 in the alarm controller 106, for example, may wirelessly receive the sensor data 366 sent from the alarm sensor 108. The client-side security application 152 obtains the sensor data 366 and compares the sensor data to one or more rules 368 and threshold values 370 stored in the alarm controller 106. If the sensor data 366 indicates a security event, the alarm condition 126 is determined and the alarm message 128 is sent to the central monitoring station 102 (as earlier paragraphs explained). While the alarm sensor 108 may have an alternating current (AC) power source 372, a battery 374 may be included.

Figure 22:
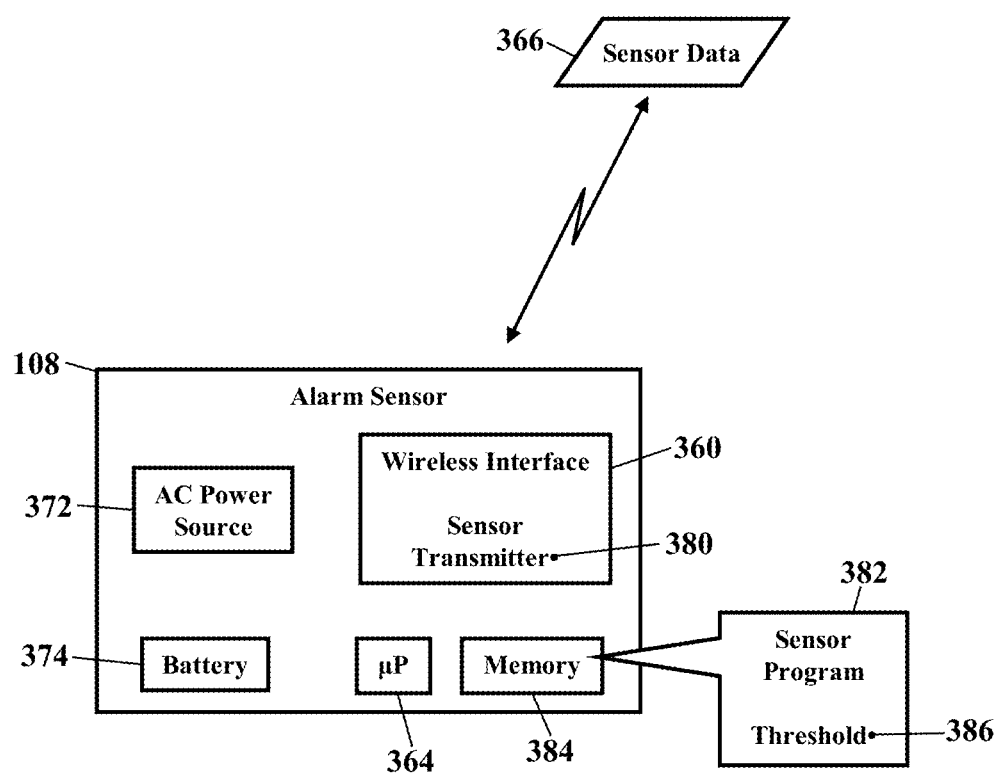

FIG. 22 further illustrates the wireless interface 360. Here the wireless interface 360 may only have one-way transmission capability to preserve battery life. That is, the alarm sensor 108 may only send the sensor data 366 to the alarm controller 106. A sensor transmitter 380 may thus lack capability to receive data or information to conserve the life of the battery 374. Because the alarm sensor 108 may only transmit the sensor data 366, electrical power from the battery 374 is not consumed for wireless reception. Even though the sensor transmitter 380 may utilize any portion of the electromagnetic spectrum, exemplary embodiments may utilize a proprietary portion (such as 433 MHz) of the electromagnetic spectrum. The sensor processor 364 executes a sensor program 382 stored in memory 384 of the alarm sensor 108. The sensor program 382 causes the sensor processor 364 to only broadcast the sensor data 366 during an alarm. Even though the alarm sensor 108 may continuously, periodically, or randomly monitor or measure the sensor data 366, the alarm sensor 108 may only transmit the sensor data 366 that equals or exceeds some threshold value 386. The sensor transmitter 380 may thus only consume electrical power from the battery 374 when the sensor data 366 necessitates.

Figure 23:
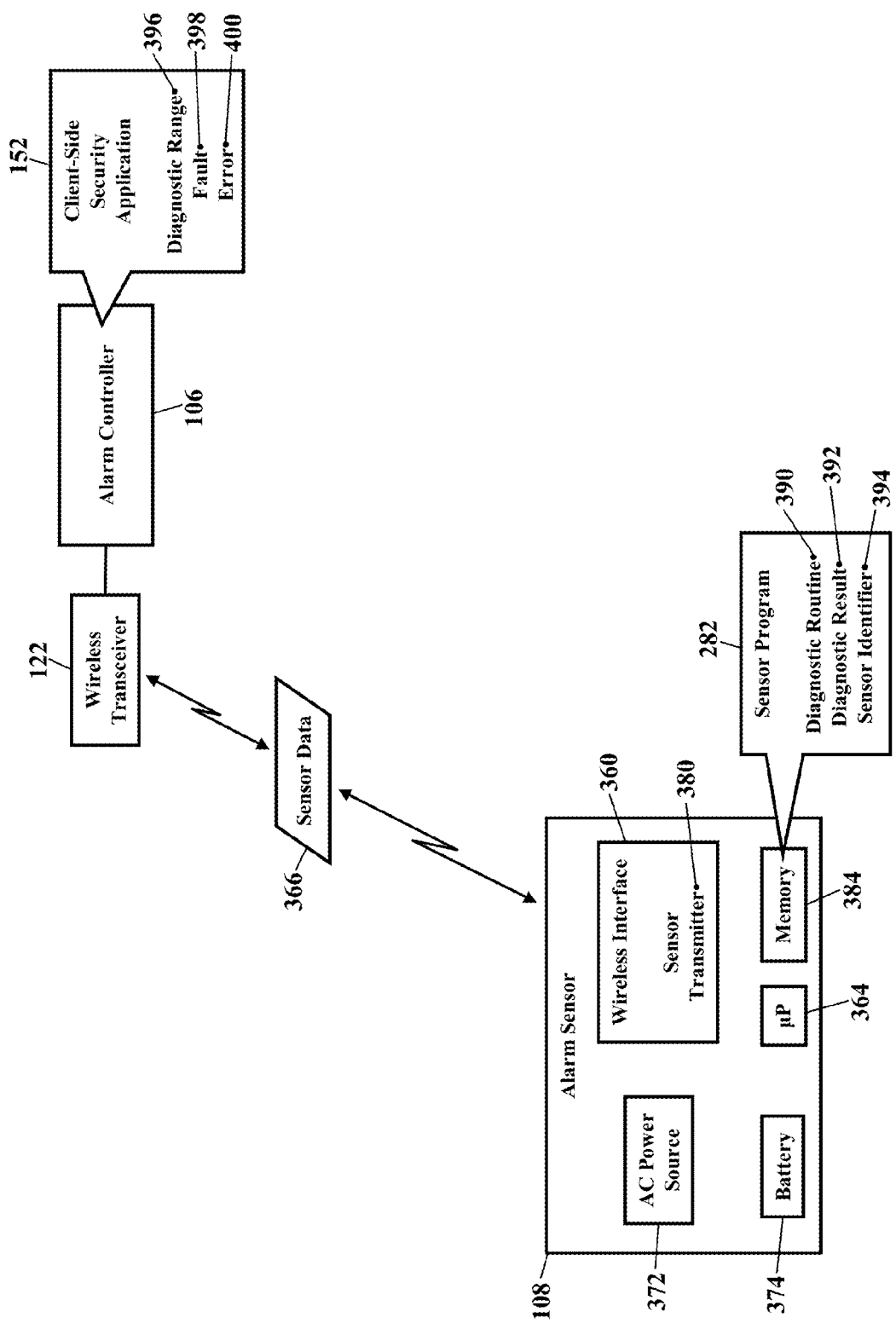

FIG. 23 further illustrates the wireless interface 360. Here the alarm sensor 108 may broadcast its health and identity. That is, the sensor program 382 may randomly or periodically execute a diagnostic routine 390, such as every seventy (70) minutes. The sensor transmitter 380 may then wirelessly send a diagnostic result 392, along with a sensor identifier 394 associated with the alarm sensor 108. The sensor identifier 394 may be any alphanumeric combination that uniquely identifies the alarm sensor 108 from other alarm sensors. When the alarm controller 106 receives the diagnostic result 392 and the sensor identifier 394, the client-side security application 152 may compare the diagnostic result 392 to a diagnostic range 396 of values. If the diagnostic result 392 satisfies the diagnostic range 396 of values, then the alarm sensor 108 is assumed to be properly functioning. If the diagnostic result 392 fails to satisfy the diagnostic range 396 of values, then a fault 398 may be assumed and the alarm controller 106 may flag and/or display an error 400 associated with the sensor identifier 394.

The one-way wireless interface 360 may be best suited to magnetic sensors. As those of ordinary skill in the art have known, many security systems utilize magnetic sensors for doors and windows. When a door or window opens, a magnet (not shown) pulls away from a metal strip or contact. As the magnet pulls away, the magnet electromagnetically decouples, thus opening like a switch in a circuit. The alarm sensor 108 thus simply detects low or no current, voltage, or continuity as the door or window opens. The sensor program 382 may thus cause the sensor processor 364 and the sensor transmitter 380 to broadcast the sensor data 366 (e.g., low or no current, voltage, or continuity) only when the magnet pulls away from the door or window. The one-way transmission capability of the wireless interface 360 may thus be effectively used for windows and doors, where the life of the battery 374 may be extended three to five years.

Figure 24:
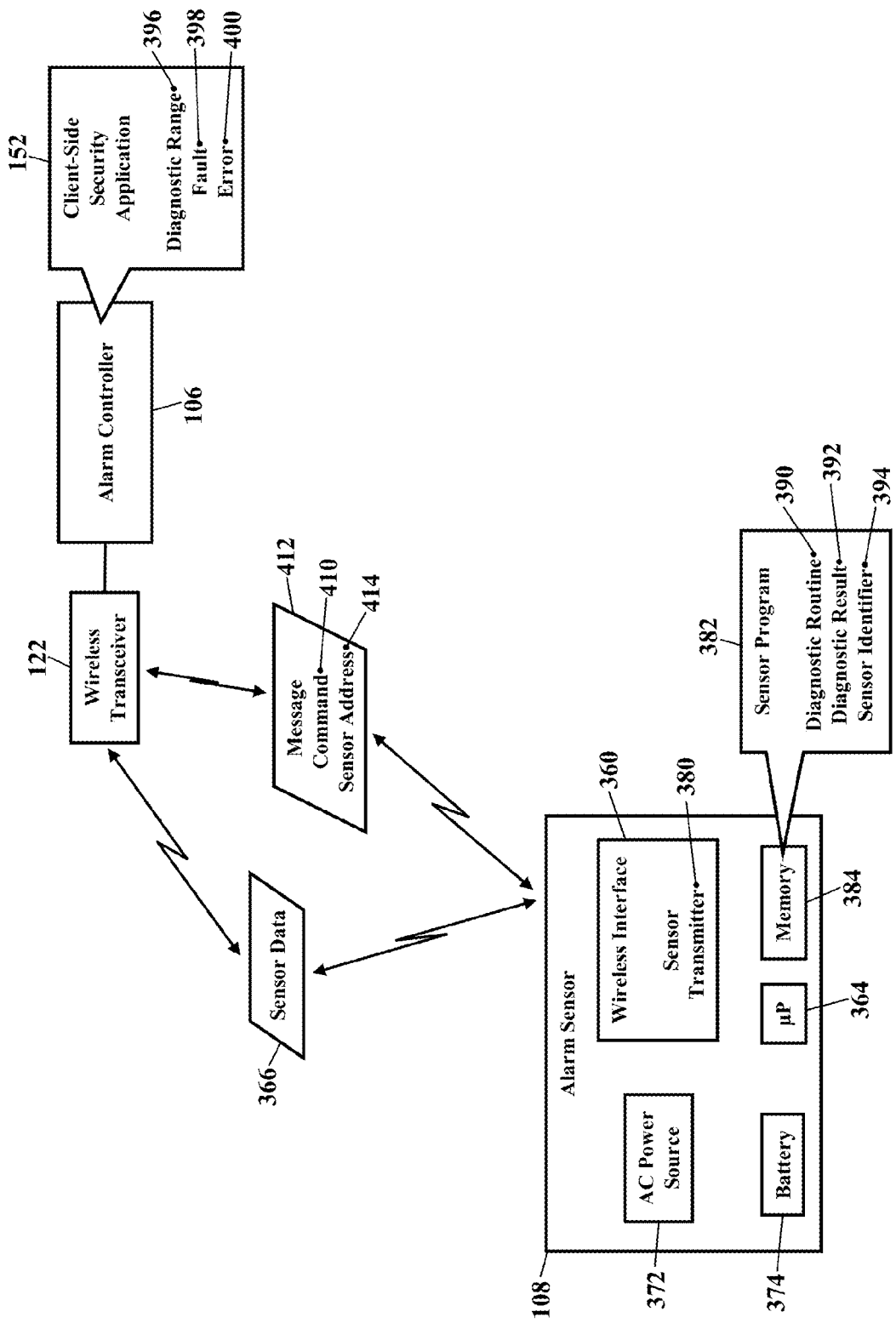

FIG. 24 illustrates two-way capability. Here the wireless interface 360 may both send and receive, thus bi-directionally communicating with the alarm controller 106. FIG. 24, for example, illustrates an initialization of the alarm sensor 108. The alarm sensor 108 may response to a command 410 sent in a message 412 from the alarm controller 106. The command 410 may instruct the alarm sensor 108 to turn on, to awaken, or to respond. The message 412 may also include a sensor address 414, thus permitting different alarm sensors 108 to be individually addressed and activated/deactivated. When the alarm sensor 108 receives the message 412, the alarm sensor 108 executes the command 410, as instructed by the alarm controller 106. The alarm sensor 108 may respond by sending the sensor data 366 to the alarm controller 106. The alarm sensor 108 may also broadcast its diagnostic result 392 and the sensor identifier 394 to indicate its health and identity (as the above paragraph explained). When the alarm sensor 108 has two-way capability, the sensor transmitter 380 may again utilize any portion of the electromagnetic spectrum, such as the 900 MHz spectrum. This two-way capability consumes more electrical power from the battery 374, so the two-way capability may be reserved for keypads and for sensors that are easily accessed for battery replacement.

Figure 25:
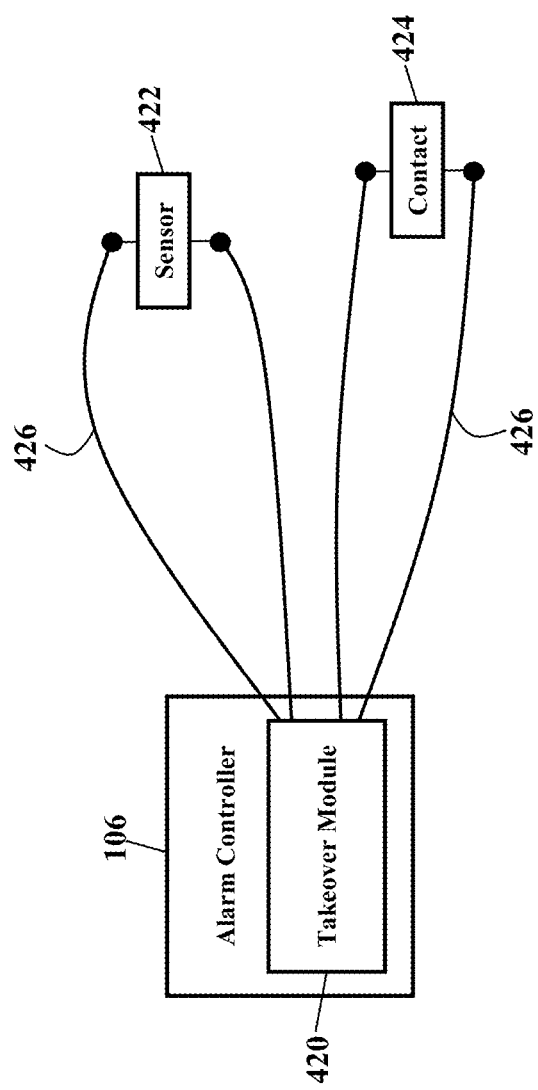
FIGS. 25-28 are schematics illustrating a takeover module, according to exemplary embodiments.
Figure 26:
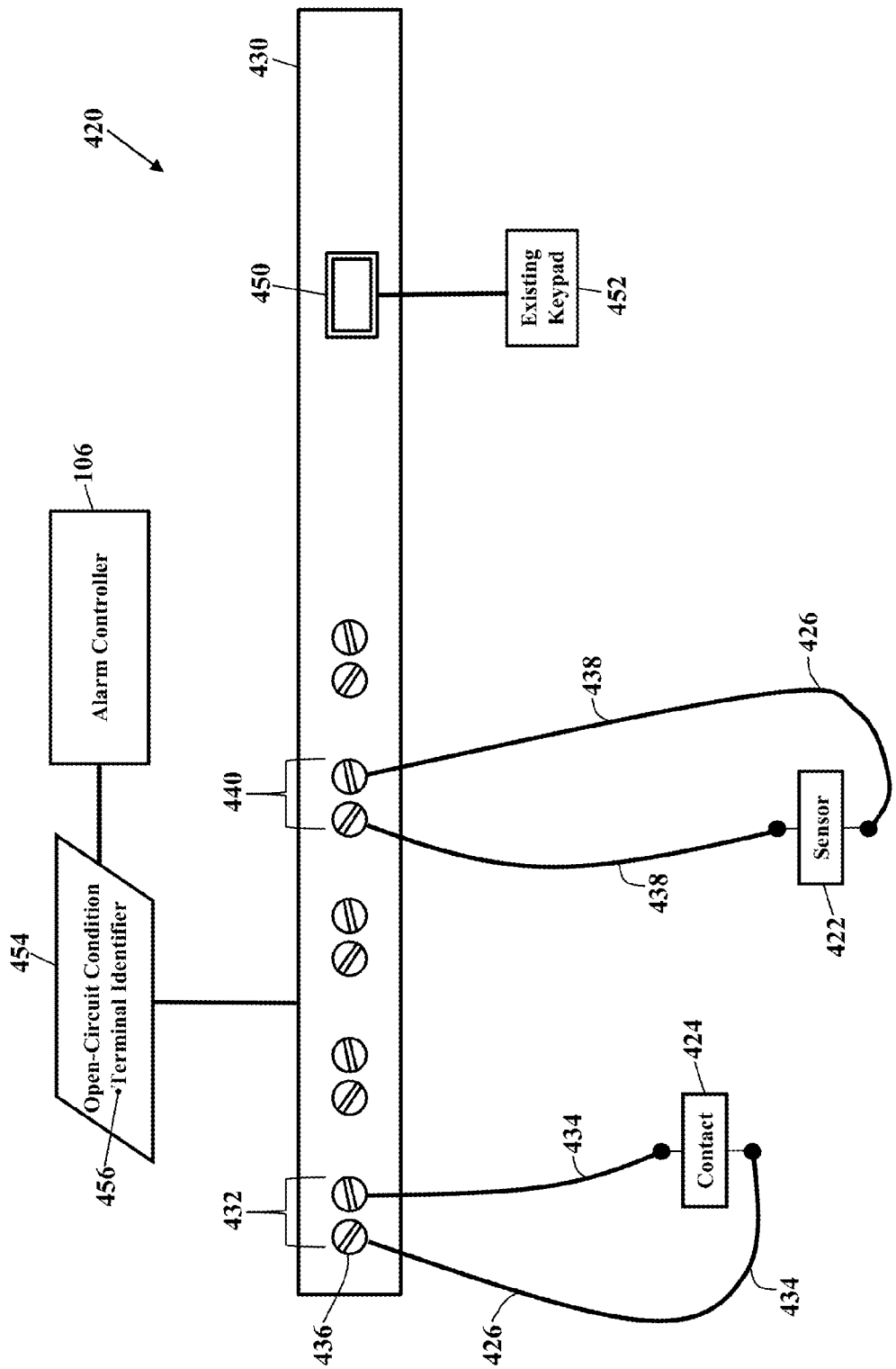
Figure 27:
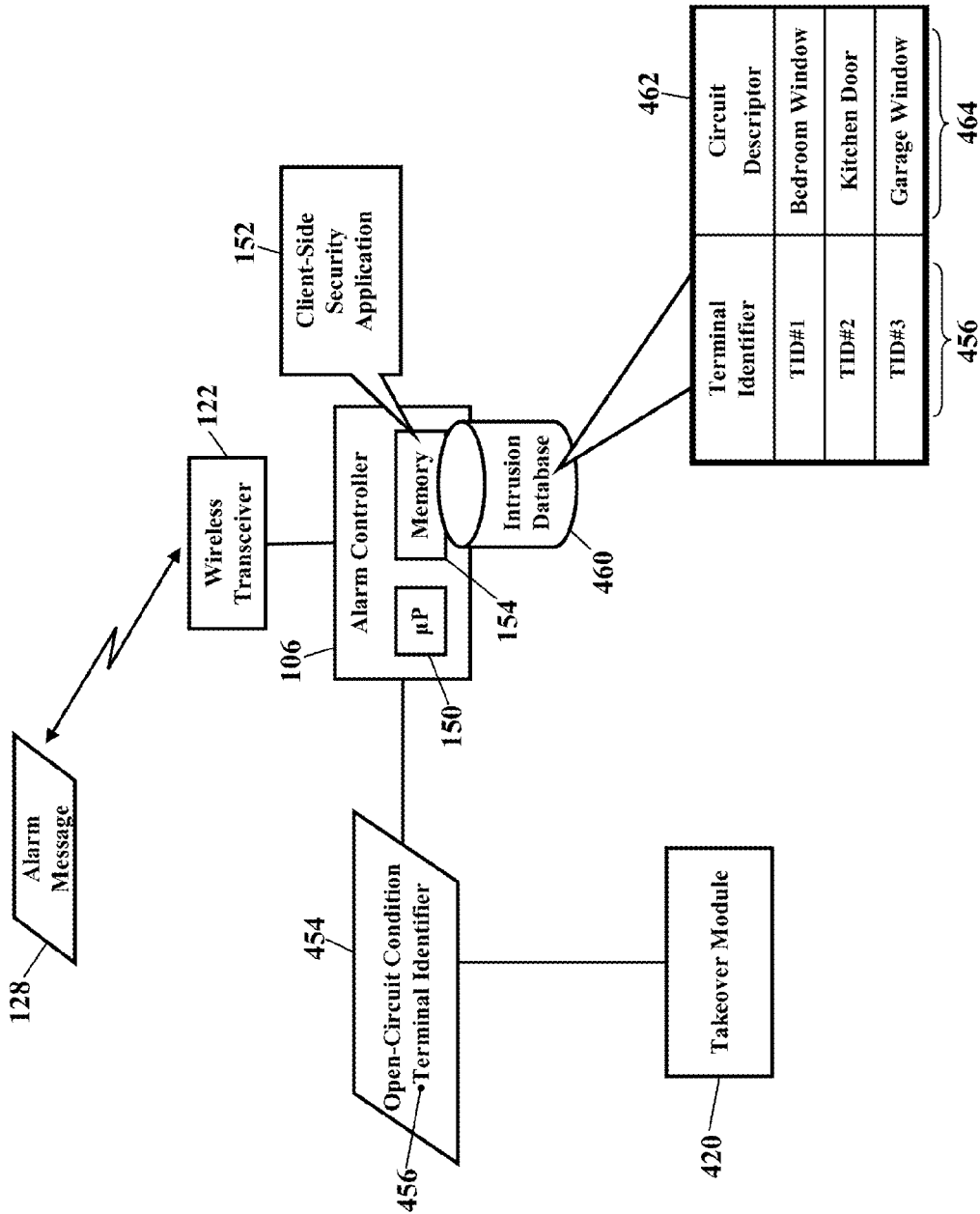

FIGS. 25-27 are schematics illustrating a takeover module 420, according to exemplary embodiments. The takeover module 420 allows exemplary embodiments to be retrofitted to one or more existing wired sensors 422 and/or wired contacts 424. As earlier paragraphs explained, conventional security systems have long used the wired contacts 322 and sensors 324 to detect security events. Because these existing wired sensors 422 and contacts 424 may still adequately function for basic security services, some customers may not want to incur added costs to tear-out aged, but functioning, components. The takeover module 420 thus allows the alarm controller 106 to interface with existing wired keypads, sirens, and sensors in older installations. An existing controller may be removed, and the existing alarm zones, or circuits 426, may be interfaced to the alarm controller 106. The takeover module 420 thus permits older security systems to be up-fitted without incurring substantial installation costs.

As FIG. 26 illustrates, the takeover module 420 has one or more terminal strips 430 of pairs 432 of terminals. An existing pair 434 of wires from the existing window contact 424 is connected to a first pair 436 of terminals in the takeover module 420. A second existing pair 438 of wires from the existing sensor 422 is connected to a second pair 440 of terminals. If multiple circuits serve multiple existing security components, then each corresponding pair of wires is connected to a different pair 432 of terminals in the takeover module 420. A different pair 432 of terminals, in other words, is connected to each two-wire pair in a security circuit 426. The takeover module 420 may also have a socket 450 for connection to an existing keypad 452. The takeover module 420 applies an electrical current to each pair 432 of terminals. The electrical current flows through the existing circuits 426 and returns back to each respective pair 432 of terminals in the takeover module 420. As earlier paragraphs explained, when a window or door is opened, the corresponding wired component (e.g., the existing sensor 422 or the existing window contact 424) creates an open-circuit condition. When the circuit 426 opens, the takeover module 420 detects no current between the corresponding pair 432 of terminals. The takeover module 420 thus reports an open-circuit condition 454 to the alarm controller 106, along with a terminal identifier 456 associated with the open circuit.

As FIG. 27 illustrates, exemplary embodiments may thus detect intrusion events. When an open circuit is detected, the alarm controller 106 receives the open-circuit condition 454 and the terminal identifier 456. The client-side security application 152 may then query an intrusion database 460. FIG. 27 illustrates the intrusion database 460 stored in the memory 154 of the alarm controller 106, but the intrusion database 460 may be stored in the takeover module 420 or remotely accessed from the data network (illustrated as reference numeral 104 in FIG. 1). Regardless, the intrusion database 460 is illustrated as a table 462 that maps, relates, or associates terminal identifiers 456 to circuit descriptors 464. Each circuit descriptor 464 may be a textual description of an existing sensor circuit (illustrated as reference numeral 426 in FIGS. 25 & 26). The intrusion database 460 thus provides a simple description of a possible intrusion event, such as "master bedroom window open" or "garage door open." The client-side security application 152 queries the intrusion database 460 for the terminal identifier 456 in the open-circuit condition 454 detected by the takeover module 420. The client-side security application 152 retrieves the corresponding circuit descriptor 464 and sends the alarm message 128 to the central monitoring station 102 (as earlier paragraphs explained). The alarm message 128 may thus include a textual description of the security event (such as "glass breakage in garage" or "kitchen door open"). Should the central monitoring station ("CMS") server 132 send the alarm notification (illustrated as reference numeral 310 in FIGS. 17-18) for remote notification, the alarm notification 310 may, likewise, include the textual description of the security event.

Figure 28:
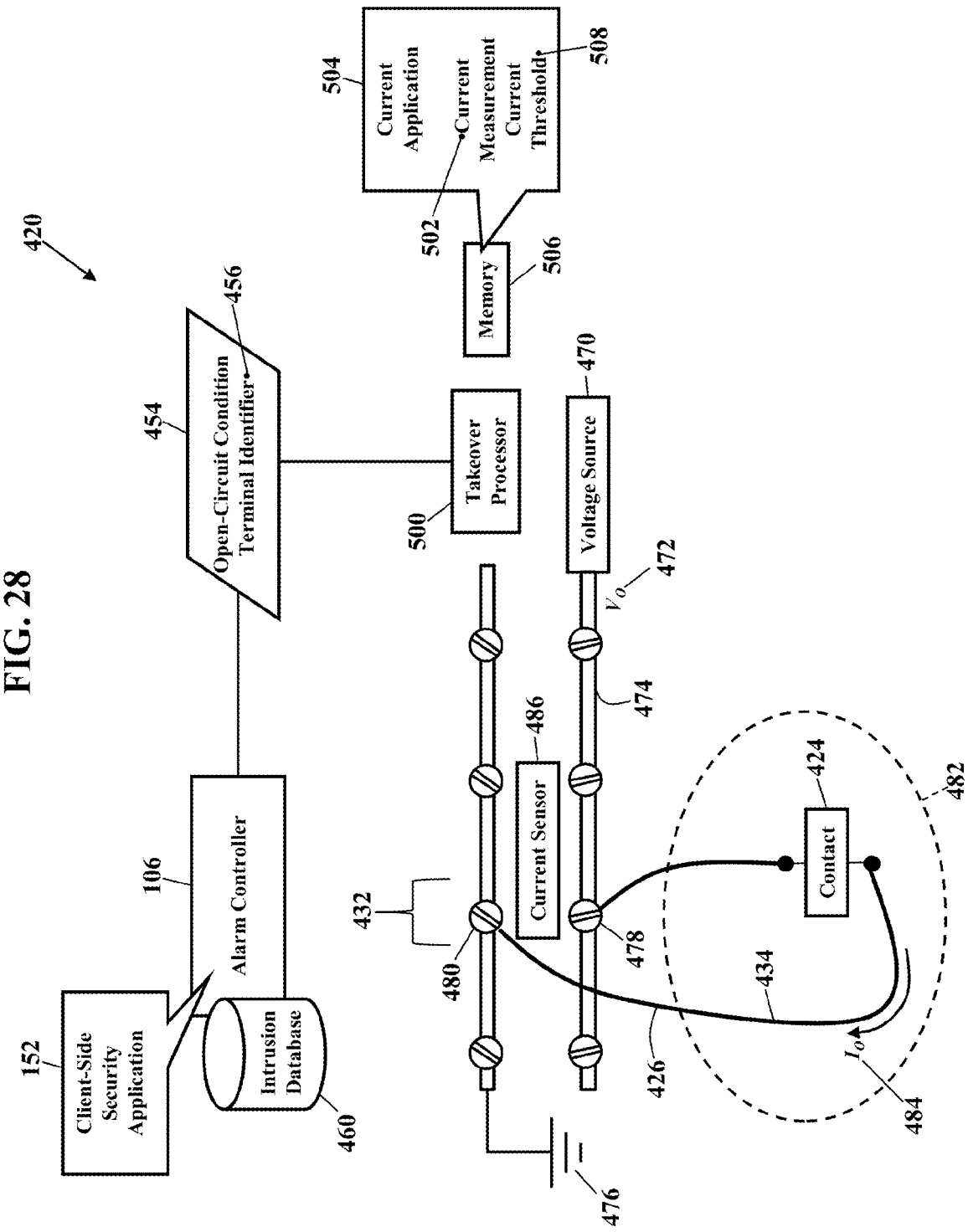

FIG. 28 is a block diagram of the takeover module 420, according to exemplary embodiments. The takeover module 420 has a voltage source 470 that applies a voltage $V_O$ (illustrated as reference numeral 472) to a voltage strip 474. Each pair 432 of terminals in the takeover module 420 has one terminal electrically connected to the voltage strip 474 and a second terminal electrically connected to electrical ground 476. The voltage $V_O$, for example, is applied to a first terminal 478 in the pair 432 of terminals, while a second terminal 480 is connected to electrical ground 476. Because the existing wires 434 and the existing wired contact 424 electrically resemble a resistance 482 (as may the existing wires 438 and sensor 422 illustrated in FIG. 16), electrical current $I_O$ (illustrated as reference numeral 484) flows from the first terminal 478 (to which the voltage $V_O$ is applied), through the existing wires 434 and the existing contact 424, and to the second terminal 480 connected to electrical ground 476. Each pair 432 of terminals in the takeover module 420 may have a current sensor 486 that measures the electrical current $I_O$ flowing from the first terminal 478 to the second terminal 480.

The takeover module 420 may be processor controlled. A takeover processor 500 may receive a current measurement 502 from each current sensor 486. The takeover processor 500 may execute a current application 504 stored in memory 506. The current application 504 is software code or instructions that cause the takeover processor 500 to evaluate or to compare the current measurement 502 in each circuit 426 to a threshold current value 508. When the current measurement 502 across any pair 432 of terminals drops below the threshold current value 508, the takeover processor 500 detects a possible intrusion event. The takeover processor 500 flags the open-circuit condition 454 and obtains the terminal identifier 456 of the open circuit from the corresponding current sensor 486. The takeover processor 500 sends the open-circuit condition 454 to the alarm controller 106 (perhaps as a message), along with the terminal identifier 456 of the open circuit. When the alarm controller 106 receives the open-circuit condition 454, the client-side security application 152 may query the intrusion database 460 for the terminal identifier 456 of the open circuit. The client-side security application 152 may then send the alarm message 128 to the central monitoring station 102 (as earlier paragraphs explained).

Figure 29:
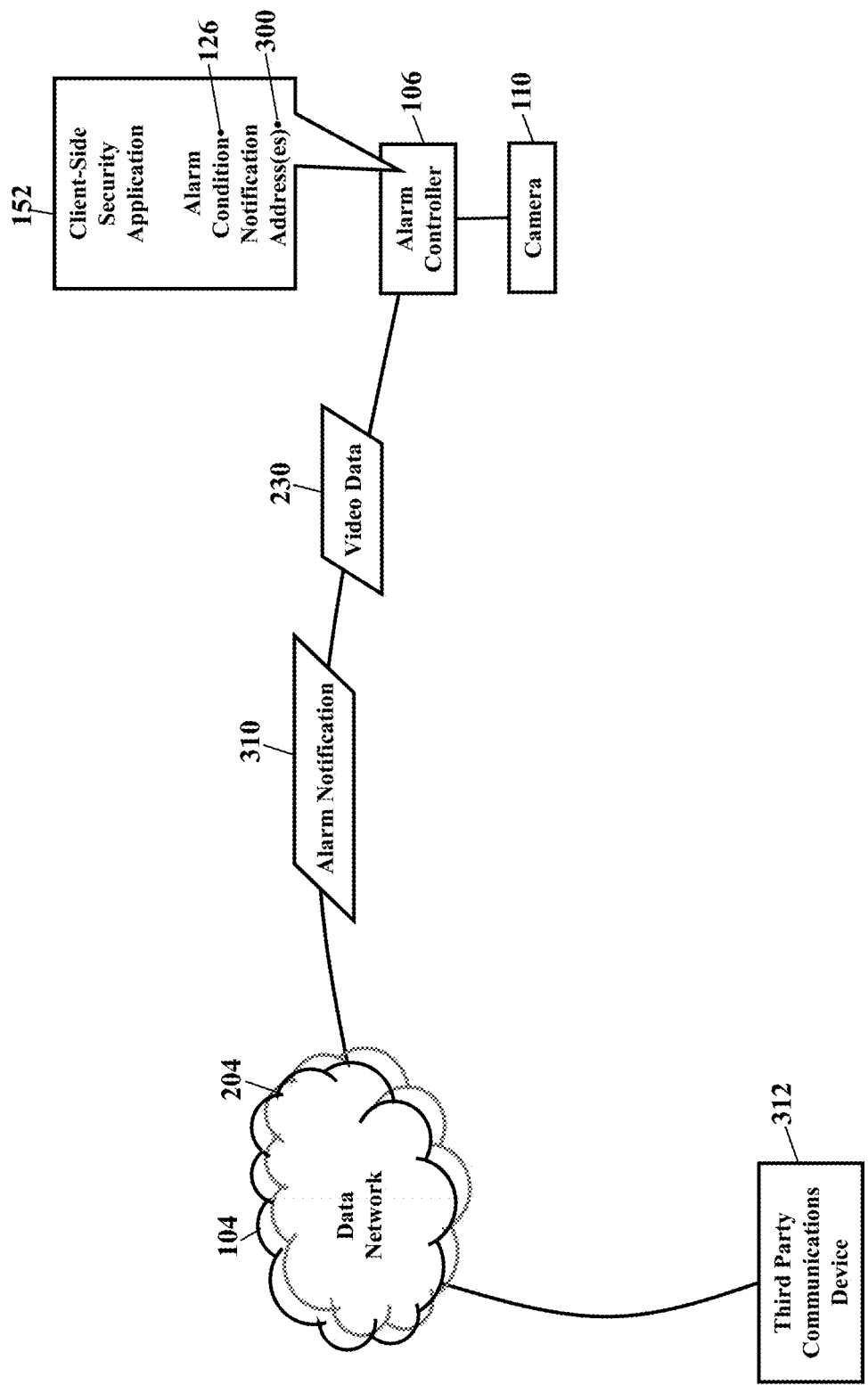
FIG. 29 is a schematic illustrating remote notification of the video data, according to exemplary embodiments.

FIG. 29 is a schematic illustrating remote notification of the video data 230, according to exemplary embodiments. Earlier paragraphs explained how the alarm notification 310 may remotely notify friends, family members, or others of security events detected by the alarm controller 106. When the alarm notification 310 is sent to one or more of the notification addresses 300, the alarm notification 310 may include, or be sent along with, at least a portion of the video data 230. When the alarm notification 310 is received, the recipient (at the third party communications device 312) may immediately read the textual description of the open circuit ("basement window open") and view the video data 230 captured by the camera 110. The recipient may thus immediately verify the intrusion event. If bandwidth, packet delay, or other network factor is a concern, the alarm notification 310 may only include still images or a few seconds of the video data 230.

Again, the amount of the video data 230 may be limited. If a large amount of the video data 230 is automatically retrieved and sent to the third party communications device 312, chances are high that delivery will be delayed or even fail. Exemplary embodiments may thus only send, or stream, a specified amount or duration of the video data 230 (such as ten seconds). The alarm controller 106 may thus stream only a snippet that permits quick verification of the alarm condition 126. As earlier paragraphs explained, the alarm controller 106 may retrieve and stream pre-alarm and post-alarm video data 230. That is, five seconds of video data 230 captured before the alarm condition 126 may be sent, along with five seconds captured after the alarm condition 126 is detected. The recipient (at the third party communications device 312) may thus quickly verify the alarm condition 126.

Figure 30:
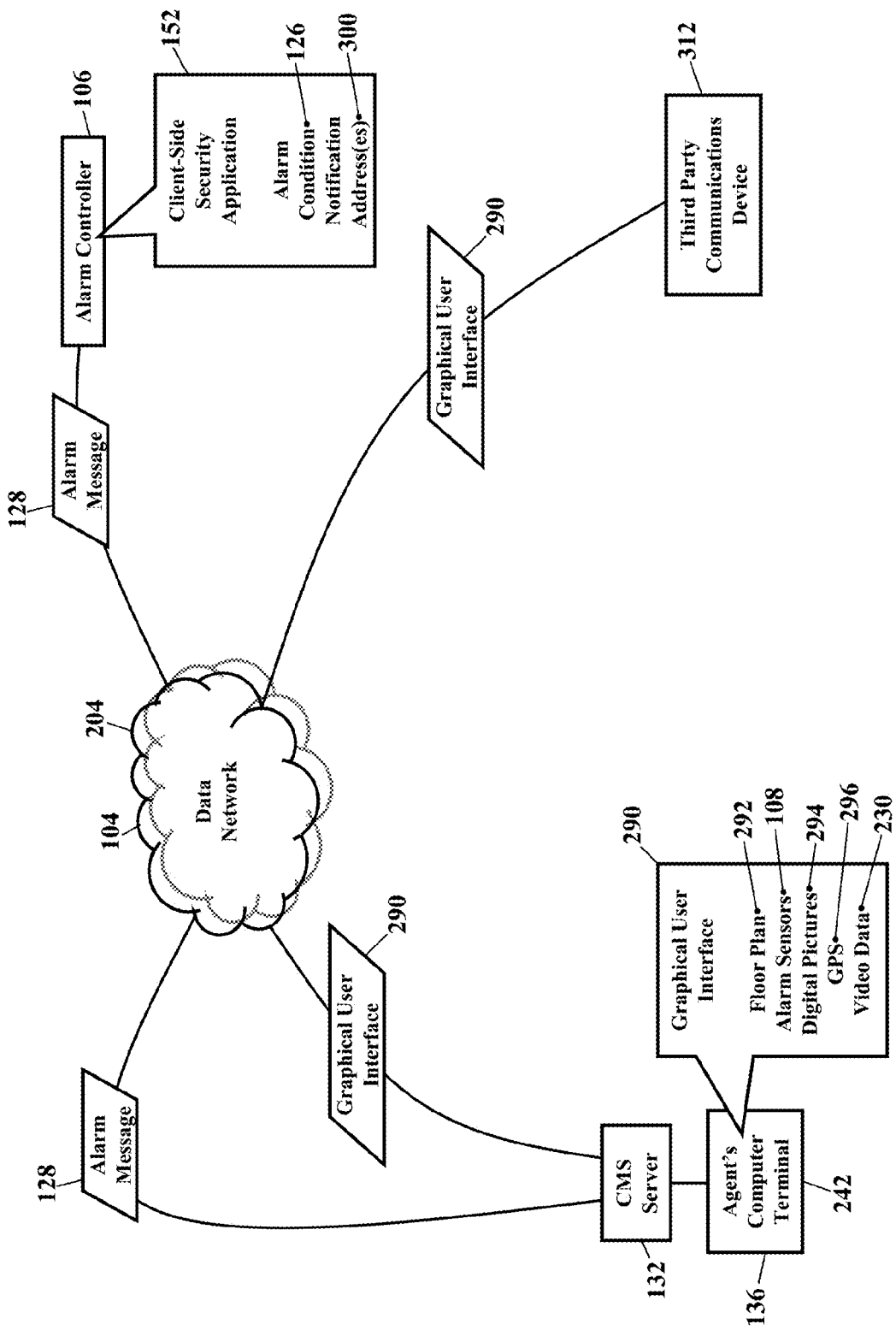
FIGS. 30 and 31 are schematics further illustrating remote notification, according to exemplary embodiments.
Figure 31:
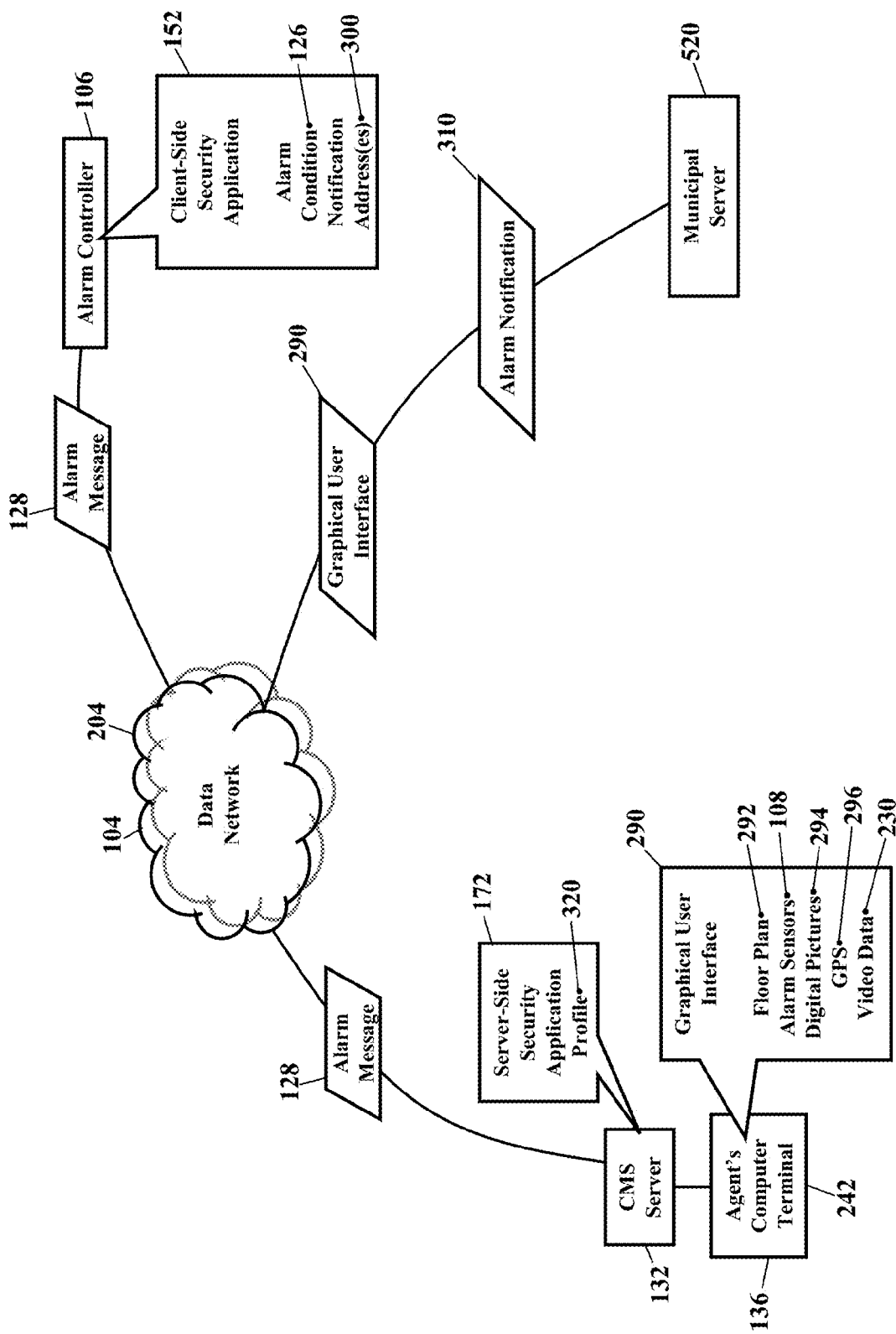

FIGS. 30 and 31 are schematics further illustrating remote notification, according to exemplary embodiments. Here the central monitoring station ("CMS") server 132 may send the graphical user interface 290 to any recipient at the third party communications device 312. As this disclosure explained with reference to FIG. 16, exemplary embodiments may construct the graphical user interface 290 to help verify alarms. When an alarm is detected, the alarm controller 106 sends the alarm message 128, which routes to the central monitoring station ("CMS") server 132. The central monitoring station server 132 generates the graphical user interface 290 to help the agent 136 verify the alarm. When remote verification is needed, the central monitoring station server 132 may also send the graphical user interface 290 to the recipient at the third party communications device 312. The graphical user interface 290 is displayed by the third party communications device 312, thus allowing the recipient to view the floor plan 292 of the customer's residence or business and the location of each alarm sensor 108 in the floor plan 292. The recipient may also view the digital pictures 294 of the home or business and of the possible occupants. The live and/or archived video data 230 may also help verify the alarm condition 126.

The graphical user interface 290 may be sent to emergency responders. Because the graphical user interface 290 may display the global positioning system coordinates 296, the graphical user interface 290 may greatly help emergency responders locate the business or residence. The digital pictures 294 further help location efforts, along with identifying exterior doors, windows, and other escape routes. The floor plan 292 and the location of each alarm sensor 108 helps emergency responders navigate halls and rooms, and the digital pictures 294 further help locate potential occupants. The graphical user interface 290 may thus be sent to mobile devices (e.g., any third party communications device 312) to help save life and property. Indeed, the notification addresses 300 may thus include emergency responders who are authorized to receive the graphical user interface 290. Some individual police or fire members may be trusted to view very private video data 230 and/or the digital pictures 294. The notification addresses 300 may thus include phone numbers and/or IP addresses of trusted emergency responders. Exemplary embodiments may not broadcast the video data 230 and/or the digital pictures 294 to all emergency responders. Exemplary embodiments may thus establish separate or limited notification addresses 300 for the video data 230 and/or the digital pictures 294, while more addresses are approved for the alarm notification 310.

FIG. 31 illustrates municipal notification, according to exemplary embodiments. Here the security server 130 may electronically notify local police, fire, and other municipal entities of emergencies. When an alarm is detected, the alarm controller 106 sends the alarm message 128, which routes to the central monitoring station ("CMS") server 132. If the agent 136 verifies the alarm condition 126, the agent 136 summons local police, fire, and other municipal entities. For example, the agent 136 may instruct the central monitoring station server 132 to send the alarm notification 310 to a municipal server 520. As previous paragraphs have explained, the alarm notification 310 may include information describing the alarm condition 126 (such as the alarm sensor 108, a physical street address of the alarm controller 106, and/or any other information). The alarm notification 310 routes to some municipal network address associated with the municipal server 520. Here the municipal server 520 collects the alarm notification 310 for emergency dispatch. The central monitoring station server 132 may additionally or alternatively send the graphical user interface 20 to help the emergency responders locate the emergency and identify the occupants.

Permissions may be required. As the above paragraphs briefly explained, some customers may not want their video data 230 shared with the local fire and police. For whatever reasons, some security customers may decline to share their video data 230. Indeed, some customers may object to sharing the digital pictures 294. Exemplary embodiments, then, may first query the profile 320 of the occupant or home/business for permissions. The profile 320 may be configured to permit, or to deny, sharing of the video data 230 and/or the digital pictures 294. If the customer permits sharing, the customer may establish separate lists of the notification addresses 300 for the video data 230 and for the alarm notification 310. Again, some individual emergency responders may be more trusted to receive and view very private video data 230 and/or the digital pictures 294. Only these trusted individuals (e.g., their corresponding phone numbers and/or IP addresses) may receive the video data 230 and/or the digital pictures 294. The less-private alarm notification 310, however, may be sent to a central dispatch or even entire departments.

Figure 32:
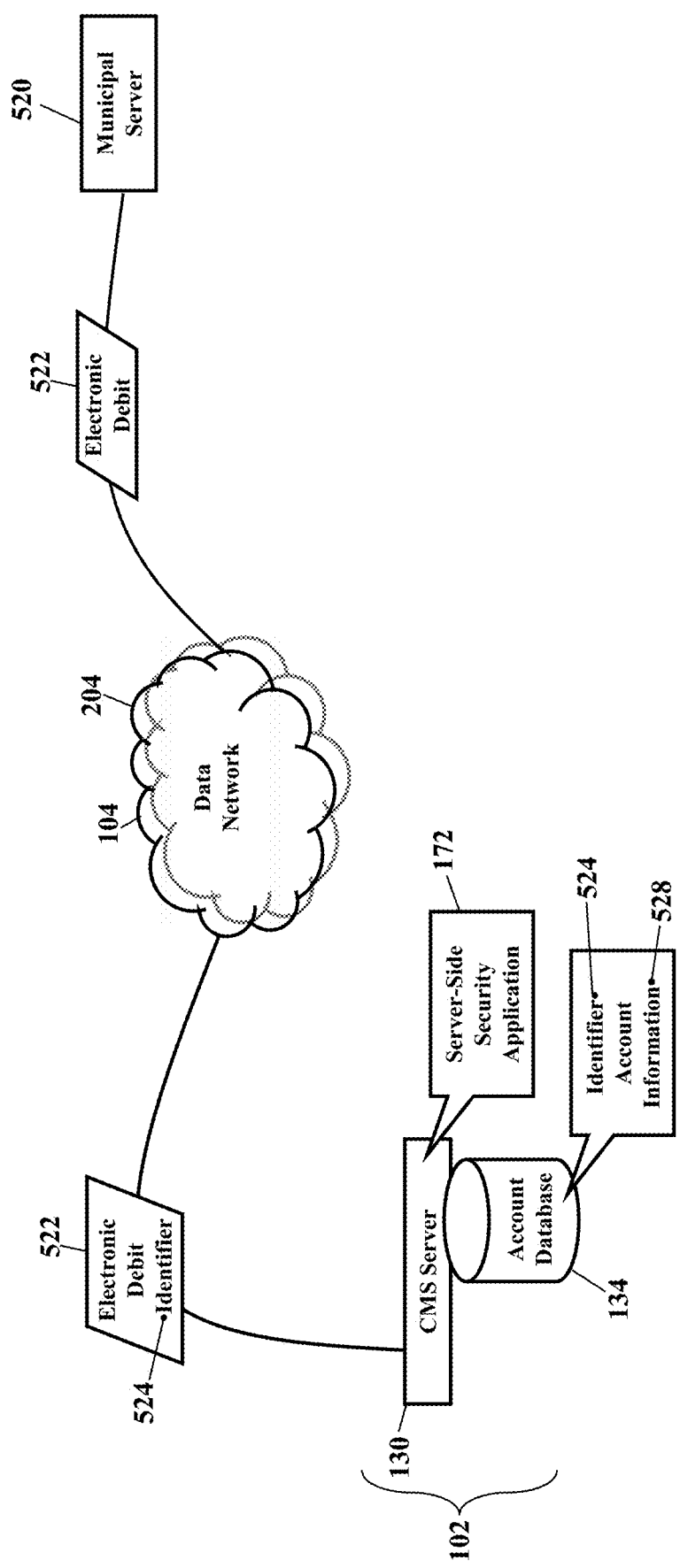
FIG. 32 is a schematic illustrating payment for emergency summons, according to exemplary embodiments.

FIG. 32 is a schematic illustrating payment for emergency summons, according to exemplary embodiments. As this disclosure has explained, one of the primary functions of the agent (illustrated as reference numeral 136 in FIGS. 30-31) is to verify alarms truly are emergency situations. Because most alarms are inadvertently triggered, local police and fire departments waste time and resources responding to false alarms. Some municipalities impose fees for each unnecessary dispatch. The agent 136, then, first tries to ascertain a true emergency exists before summoning emergency services. The agent 136 may call the alarm controller 106 to speak with an occupant, and the central monitoring station ("CMS") server 132 may send the alarm notification 310 to friends, family members, and any other authorized network address 220 (as earlier paragraphs explained).

Sometimes, though, verification is unsuccessful. The agent 136 may call the alarm controller 106, but no occupant answers. Even though the alarm notification 310 is sent to friends and family, no response may be received. In these situations, then, the agent 136 may immediately summons emergency services. If the alarm turns out to be a true emergency, then the customer has benefitted from the emergency service. If, however, the alarm is false, then emergency personnel have been unnecessarily summoned and financial charges may be imposed.

FIG. 32 thus illustrates a payment scheme. When the alarm is false, an electronic debit 522 is sent. FIG. 32 illustrates a municipality server 520 sending the electronic debit 522 to the central monitoring station server 132 in the central monitoring station 102. The electronic debit 522, though, may optionally be generated by the central monitoring station server 132. The electronic debit 522 may thus be imposed by a municipal government and/or by the server-side security application 172. Regardless, the electronic debit 522 may include a name, address, and/or other identifier 524 associated with a subscriber to emergency services. The server-side security application 172 queries the account database 134 for the identifier 524 of the subscriber, and the account database 134 returns account information 528 associated with the identifier 524 of the subscriber. The account information 528 may be an account number of a savings or checking account. The account information 528 may additionally or alternatively be a credit card number. Regardless, when the alarm is false, the subscriber has pre-approved debits from, or charges to, the account information 528 for fees imposed for false summons.

Figure 33:
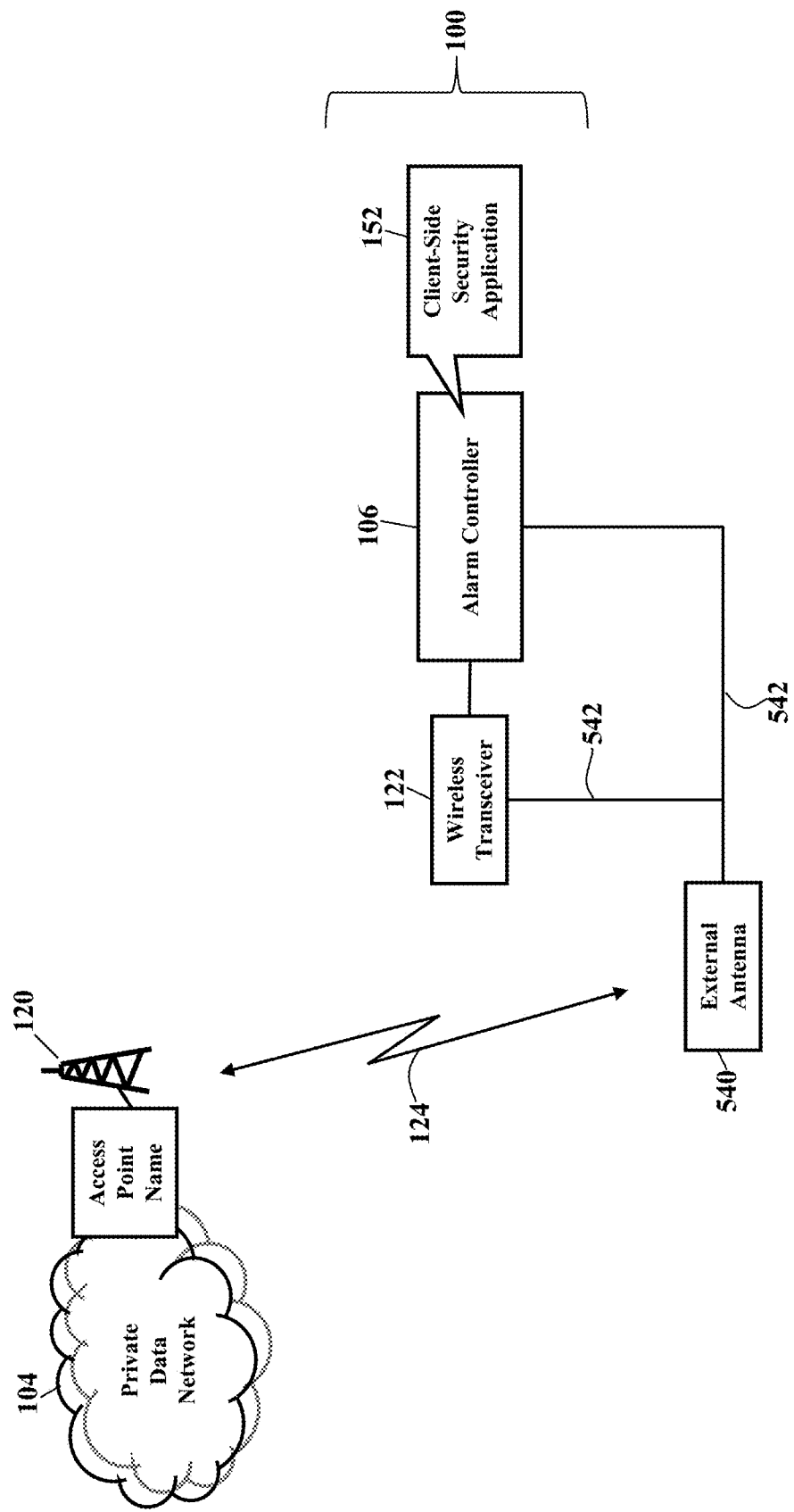
FIG. 33 is a schematic illustrating an external antenna, according to exemplary embodiments.

FIG. 33 is a schematic illustrating an external antenna 540, according to exemplary embodiments. As earlier paragraphs explained, the home or business security system 100 sends and receives using the access point name 120 associated with the private, wireless cellular network connection 124 to the private data network 104. The wireless transceiver 122 preferably connects to the private data network 104 using the 3G/LTE/4G wireless cellular network connection 124, but any protocol or standard may be used. Sometimes, though, the alarm controller 106 is installed, mounted, or located in an area of the home or business that lacks adequate wireless reception or coverage. A basement or closet, for example, may have inadequate signal strength to reliably communicate. The security system 100, then, may interface with the external antenna 540. The external antenna 540 may be mounted in an attic or on a roof to improve wireless reception with the wireless access point 120 of the private data network 104. A coaxial cable 542 may connect the external antenna 540 to the wireless transceiver 122 and/or the alarm controller 106.

Figure 34:
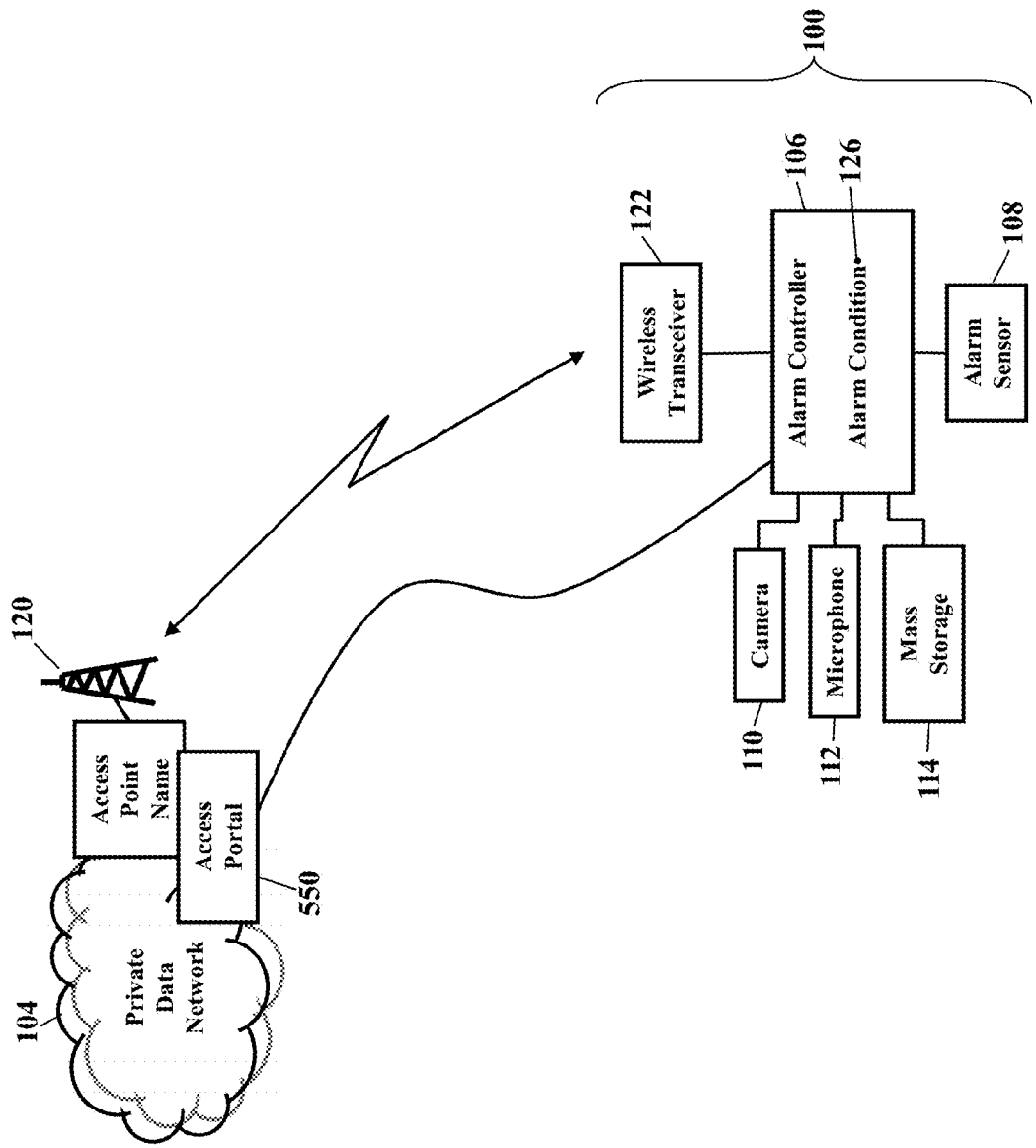
FIG. 34 is a schematic illustrating an access portal, according to exemplary embodiments.

FIG. 34 is a schematic illustrating an access portal 550, according to exemplary embodiments. All communication with the alarm controller 106 may require authentication in the access portal 550. Authentication may be accomplished by providing a valid user name and password. All communication towards the security system 100 may pass through the access portal 550 and then communicate over a secure socket layer (SSL) connection to a customer's home or business. When the customer is away and wishes to access the video data 230 (from any cameras 110), the customer may first authenticate to the access portal 550. If the customer successfully authenticates, the customer's request flows over the secure socket layer (SSL) connection. Likewise, when an agent in the central monitoring center 102 wants to access the camera 110 in the home, the agent may first be authenticated by the access portal 550. The access portal 550 may thus provide a much higher level of security compared to having authentication occur in the alarm controller 106.

Figure 35:
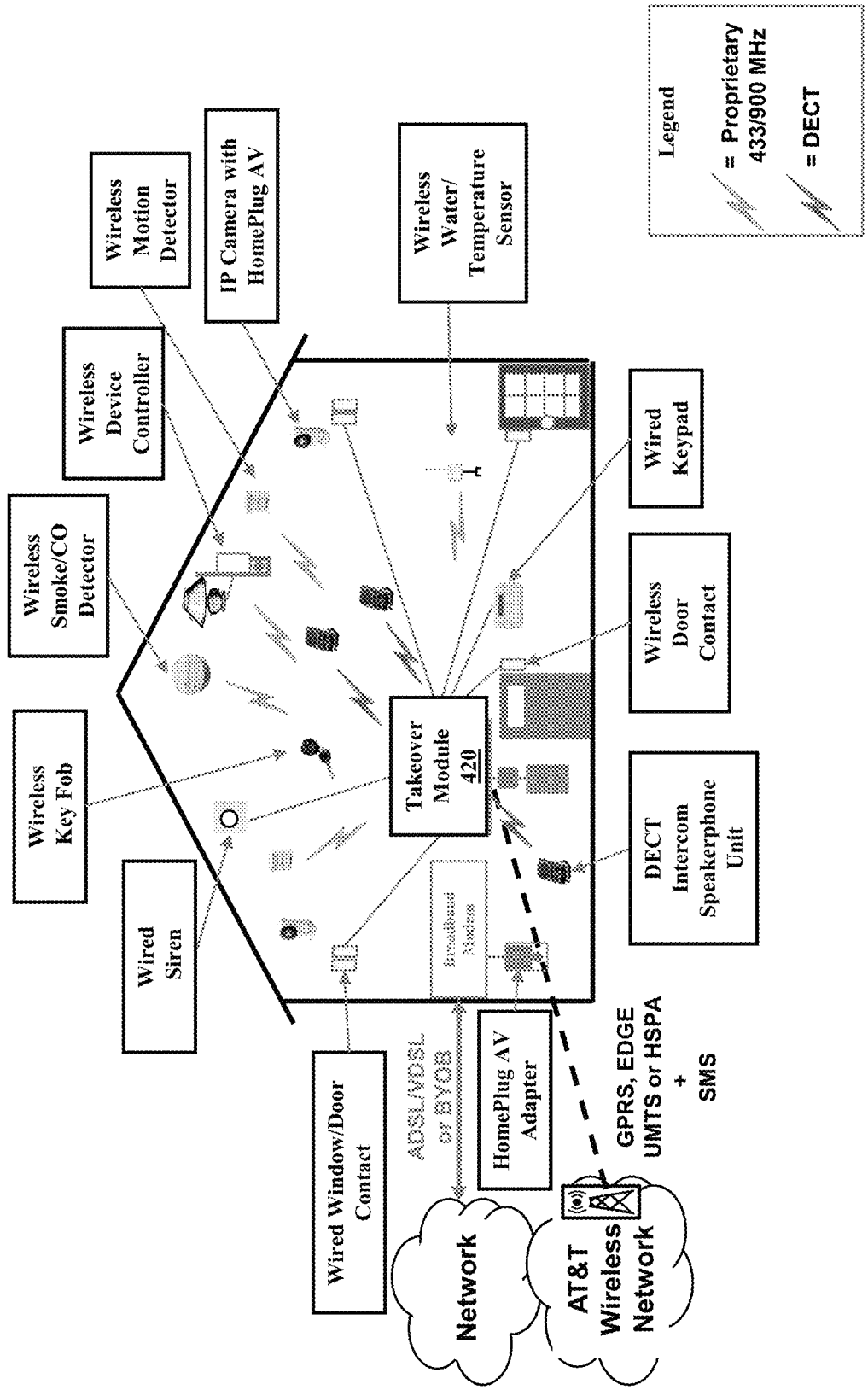

FIGS. 35-36 are schematics further illustrating the alarm controller 106 and the takeover module 420, according to exemplary embodiments. The takeover module 420 allows exemplary embodiments to be retrofitted to one or more existing wired sensors and/or wire contacts. As earlier paragraphs explained, conventional security systems have long used wired contacts and sensors to detect security events. Because these existing wired components may still adequately function for basic security services, the takeover module 420 provides an interface to existing wired keypads, sirens, and sensors in older installations. An existing controller may be removed, and the existing circuits may be interfaced to the takeover module 420. The takeover module 420 thus permits older security systems to be up-fitted without incurring substantial installation costs.

Exemplary embodiments thus describe professionally-monitored security services. The alarm controller 106 may have many standard and optional modules, such as:

3G Cellular Data Module (GPRS, EDGE, UMTS and HSPA+SMS);
24 Hour Battery Backup (Standard)
433/900 MHz Proprietary Wireless Transceiver Module;
DECT Base Station Module;
Takeover Module (Wired Window/Door Contacts, Keypad and Siren Interface); and
Internal/External Hard Drive.

The alarm controller 106 may be wall mounted in a closet, utility room or basement and preferably adjacent to an AC power outlet. An external cabinet may be molded from plastic for rugged, yet durable, use. The cabinet may be equipped with a securely latched main cabinet door and may be equipped with a backup battery compartment that the customer can access to replace the battery without opening the main cabinet door. The cabinet will support the remote installation of the external 3G/LTE/4G Cellular Data Antenna when there is insufficient signal strength at the location of the cabinet. The cabinet will be equipped with a tamper switch that triggers an alarm if someone attempts to remove the cabinet from the wall when the system is armed or when the main door or battery compartment door is opened.

Operation is simple. When the customer puts the system into an "armed" state via a wireless keypad, Wi-Fi Touch Pad, Mobile Device or PC, the client-side security application 152 monitors the status of wired and/or wireless sensors, such as window contacts, door contacts, motion detectors, glass breakage and smoke/CO detector. When the system is "armed" and a sensor 108 is activated, the alarm condition 126 is established and the alarm message 128 communicated to the Central Monitoring Station 102 via IP signaling over a 2G/3G/4G cellular packet data service (GPRS, EDGE, UMTS or HSPA). If cellular packet data service is not available, the alarm message 128 may be sent via the customer's broadband data service or SMS. Wireless sensors 108 are individually monitored. Wired sensors may be individually monitored (star wiring) or may be monitored as a "zone" (daisy chain wiring with multiple sensors in a zone), which includes typically multiple sensors. The alarm message 128 may include information identifying the customer's account, the sensor 108, the zone that contains the sensor, physical address, and any other information. The customer may be automatically notified via SMS, email or a voice call when the alarm condition 126 is determined. When the alarm message 128 is received by the Central Monitoring Station 102, an agent will immediately attempt to contact the customer to verify that it is a real alarm and not a false alarm. If the agent contacts the customer and verifies the alarm, then the agent will contact the fire department, police department or EMS. In general, if the agent is not successful in contacting the customer to verify the alarm condition 126, then the agent will contact the fire department, police department or EMS. During the alarm condition 126, if remote video monitoring is available in the customer's home, and the agent has permission to access the video data 230, then the agent will access the cameras in the customer's home to assist in verifying that it is a real alarm condition. The agent may even have access to streaming video that was automatically captured at the time of the alarm and transmitted to storage in the Central Monitoring Station.

Voice-over Internet Protocol helps verify alarms. VoIP capability, in conjunction with DECT wireless technology, may be used to provide two-way interactive voice communication between the agent in the Central Monitoring Station 102 and the customer in the home or business. The alarm controller 106 may be equipped with the SIP VoIP module 190 and the base station 212. The base station 212 wirelessly communicates with the portable units 210 (such as DECT Intercom Speakerphone Units). During the alarm condition 126, the agent places the VoIP call 140 to a VoIP-derived line associated with the base station 212. The VoIP module 190 instructs the base station 212 to auto-answer the incoming VoIP call 140 from the Central Monitoring Station 102 and commands one, or more, portable units 210 to go off-hook. Then agent begins speaking through the portable unit 210 (e.g., a DECT Intercom Speakerphone Unit) and attempts to speak with an occupant to verify the alarm condition 126.

Figure 37:
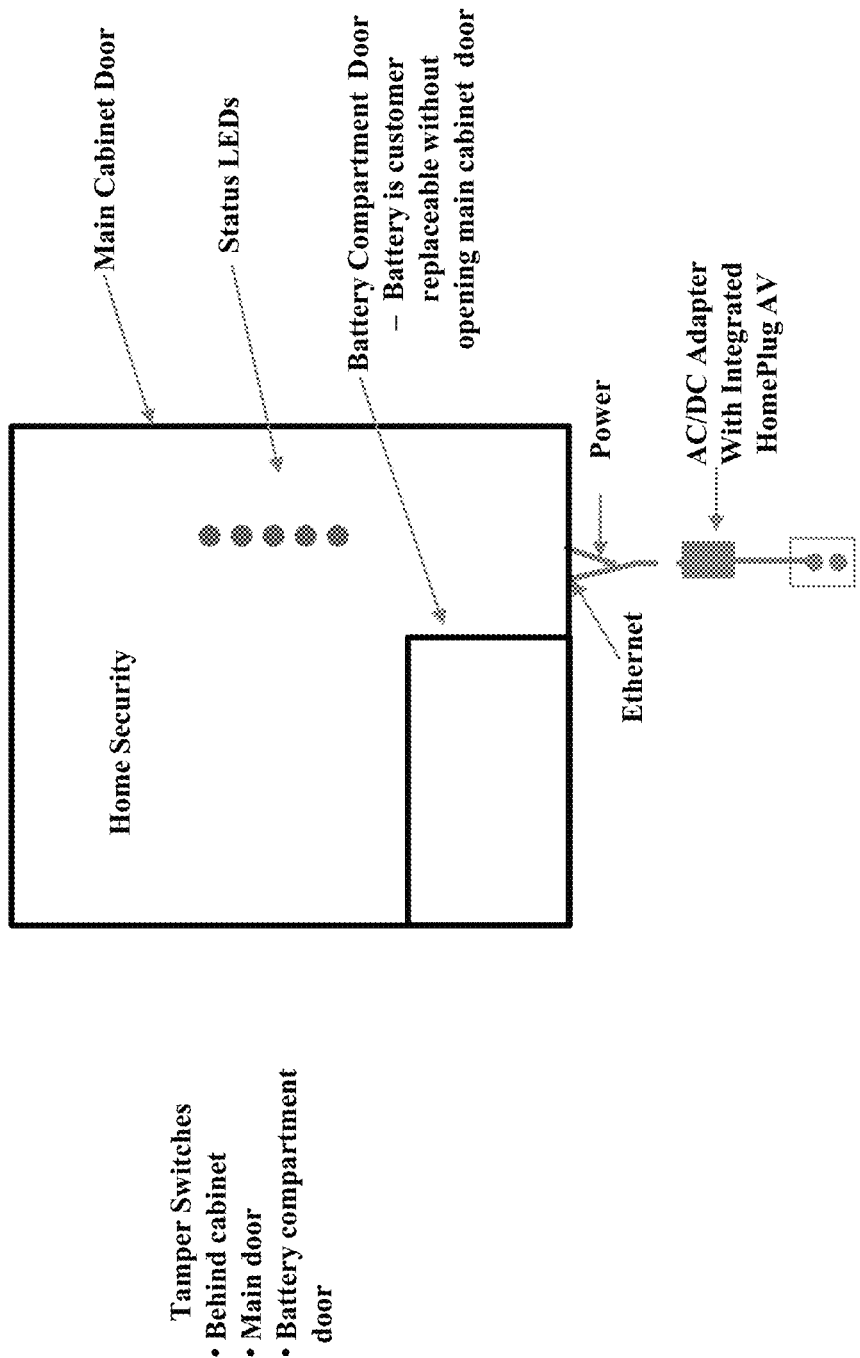
Figure 38:
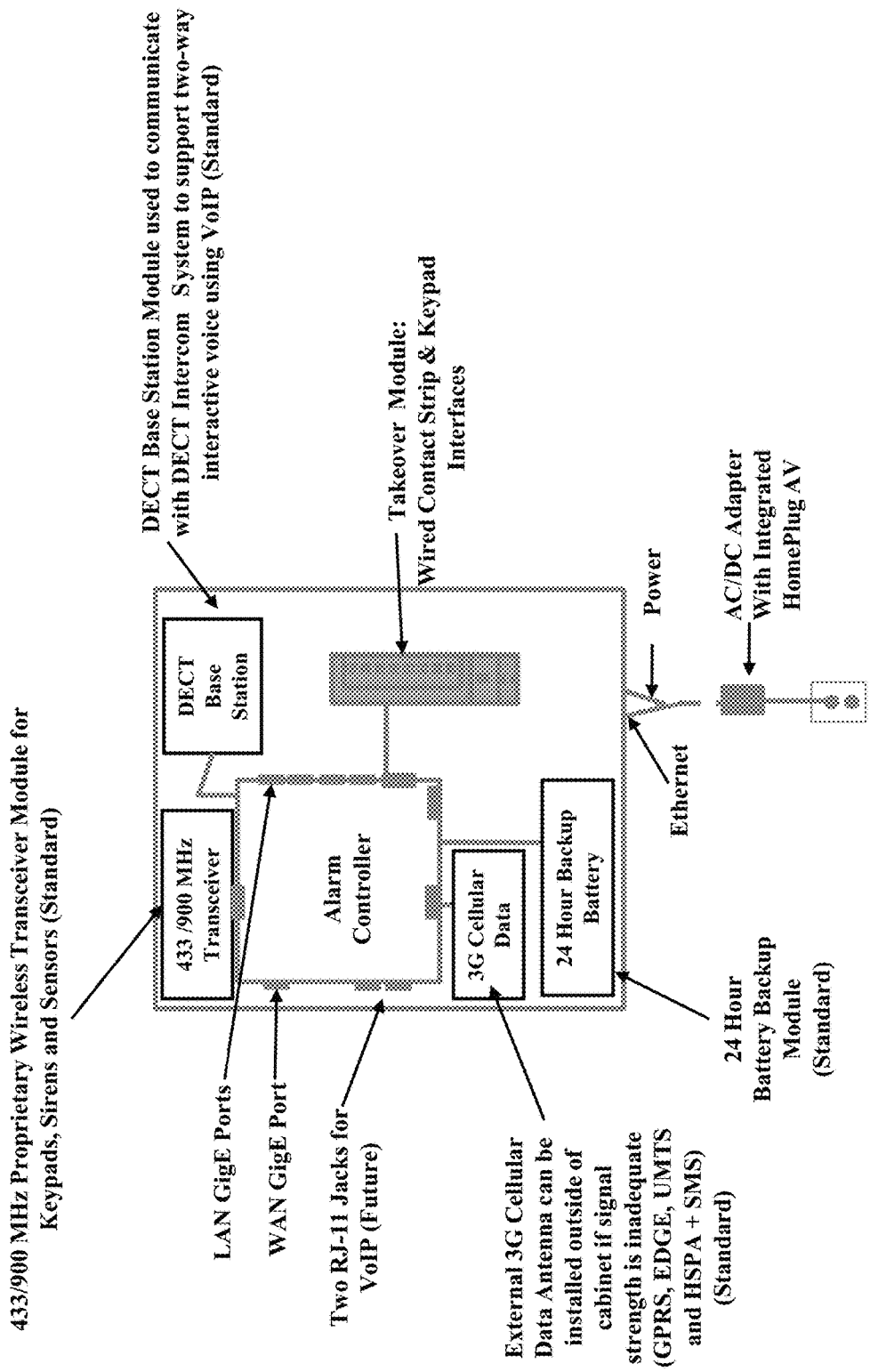

FIGS. 37-40 are schematics further illustrating the alarm controller 106, according to exemplary embodiments. FIG. 37 illustrates exterior features of the alarm controller 106, while FIG. 38 illustrates interior components of the alarm controller 106. FIG. 39 illustrates a logical table of indicators that are visible on a front of the security cabinet, while FIG. 40 lists external sensors, contacts, and other components.

Figure 41:
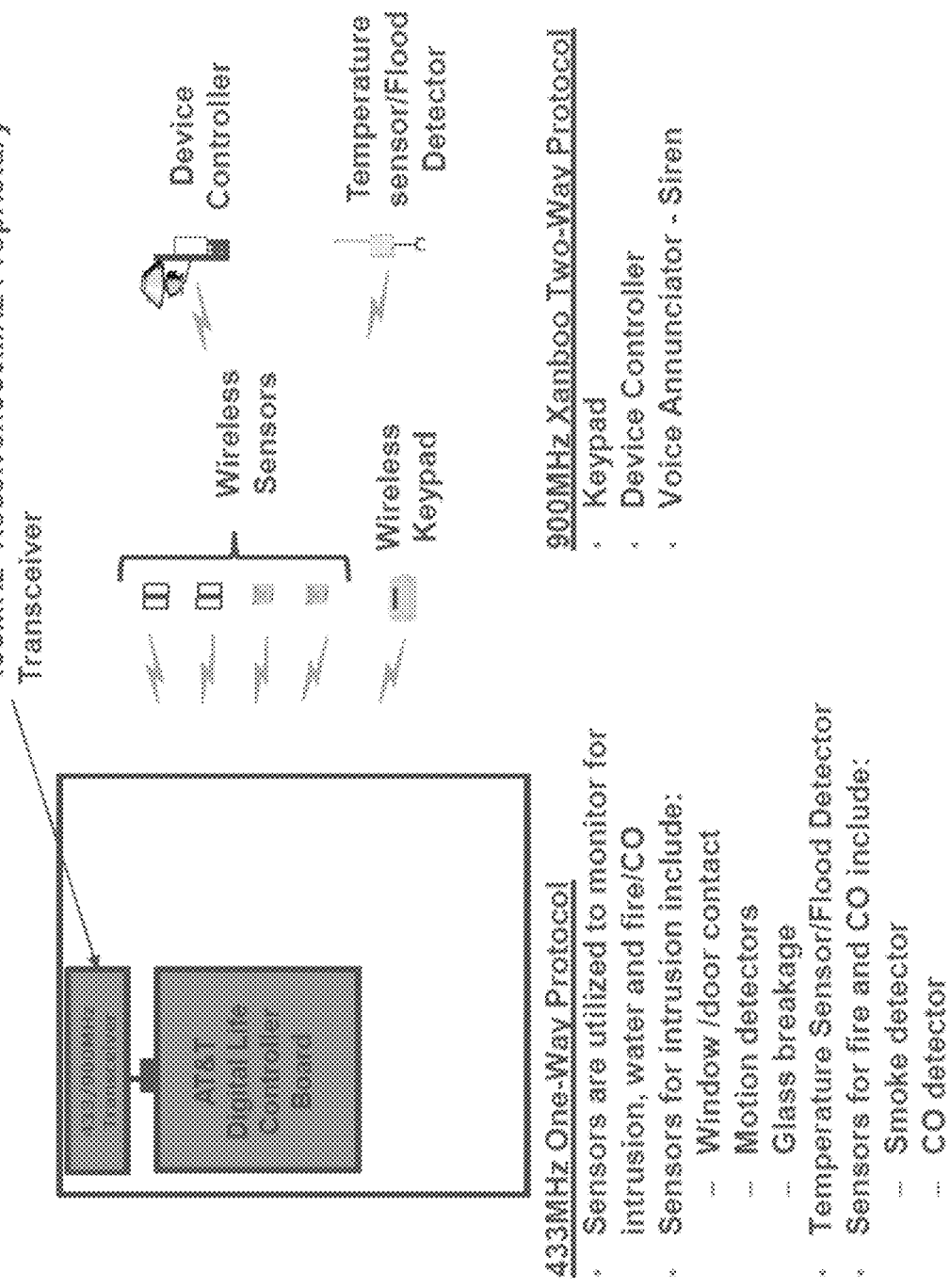

FIGS. 41-43 are schematics further illustrating the alarm controller 106, according to exemplary embodiments. FIG. 41 illustrates the wireless transceiver 122, while FIG. 42 further illustrates battery back-up capability. FIG. 43 illustrates the optional mass storage 114 (such as a memory drive or USB stick). The alarm controller 106 may thus have an optional hard drive for locally archiving the streaming video data 230 from the IP cameras 110. The customer is able to access and view the stored video 230 using a browser equipped device, such as a PC, Wi-Fi touch tablet or mobile device. A search function is provided so that the customer can locate the video data 230 based on date, time of day and/or IP camera.

When the Security System 100 is installed in a customer's home or business, the electronic floor plan 292 may be created by the installation technician. The location of each alarm sensor 108 may be plotted or added to the floor plan 292, along with a serial number or other identifier. When the agent 136 receives the alarm message 128, the agent 136 may request and retrieve electronic floor plan 292 and locate the physical location of the fire and/or intrusion sensors 108. In addition, at the time of the installation the installation technician may also capture the digital photographs 294 of the front, back, and sides of the customer's home or business, interior shots, and the GPS coordinates 296. This information is stored with the customer's account information in the security server 130. If the customer is willing, the installation technician may also take photographs of all of the individuals who may occupy the home or business. Should the agent 136 summons emergency services, the agent 136 may electronically transmit the customer's name(s), street address, GPS coordinates, and photographs of the front, back and sides of the home or business. The agent may even transmit the electronic floor plan 292 with the locations of the alarm sensors 108. Photographs of the occupants may be sent, if permitted.

Installation of the security system 100 is simple. Conventional security systems require the use of a numeric keypad/display unit in conjunction with a complex set of procedures and numeric codes to install and configure the security system. Information, such as sensor zone numbering/labeling, must be loaded via the keypad/display unit. Exemplary embodiments, however, are much simpler, for installation is accomplished by using a web browser equipped, PC, laptop PC or Wi-Fi tablet, to access the client-side security application 132. The application 132 provides simple step-by-step instructions with graphical depictions of the equipment and procedures. Traditional keypads are not used for installation and configuration. When the installation is complete, a complete installation record is automatically created and stored on the alarm controller 106. In addition a copy of the electronic record is automatically sent to the Central Monitoring Station 102 and stored with the customer's account information.

The alarm controller 106 is installed and placed in a "wireless/wired device discovery" mode. The wired and wireless sensors 108 to be discovered, such as window contacts, door contacts, motion detectors, keypads, sirens, smoke/CO detectors and IP cameras, are each placed in the "discoverable" mode. The alarm controller 106 causes the wireless transceiver 122 to broadcast a device discovery request. Each sensor 108 receives the device discovery request and responds. As each sensor 108 is discovered, the sensor 108 is registered with the alarm controller 106. After all of the wireless and wired sensors 108 have been discovered, the alarm controller 106 is taken out of the "wireless/wired device discovery" mode. After device discovery has been completed, a complete record of all of the registered devices is stored in the memory of the alarm controller 106, and a copy of the record is automatically sent to a central repository (such as the security server 130) and stored with the customer's account.

Upgrades are also simple. After the initial professional installation, if the customer wants to have additional wireless devices installed in their home (such as wireless sensors, wireless keypads or IP cameras), the equipment can be shipped directly to the customer along with simple instructions for installation and wireless discovery through an easy to use web interface. This can avoid having to roll trucks to install addition wireless equipment. When the installation of additional equipment is complete, a new complete installation record is automatically created and stored, and an electronic copy is automatically sent to the Central Monitoring Station 102.

Figure 44:
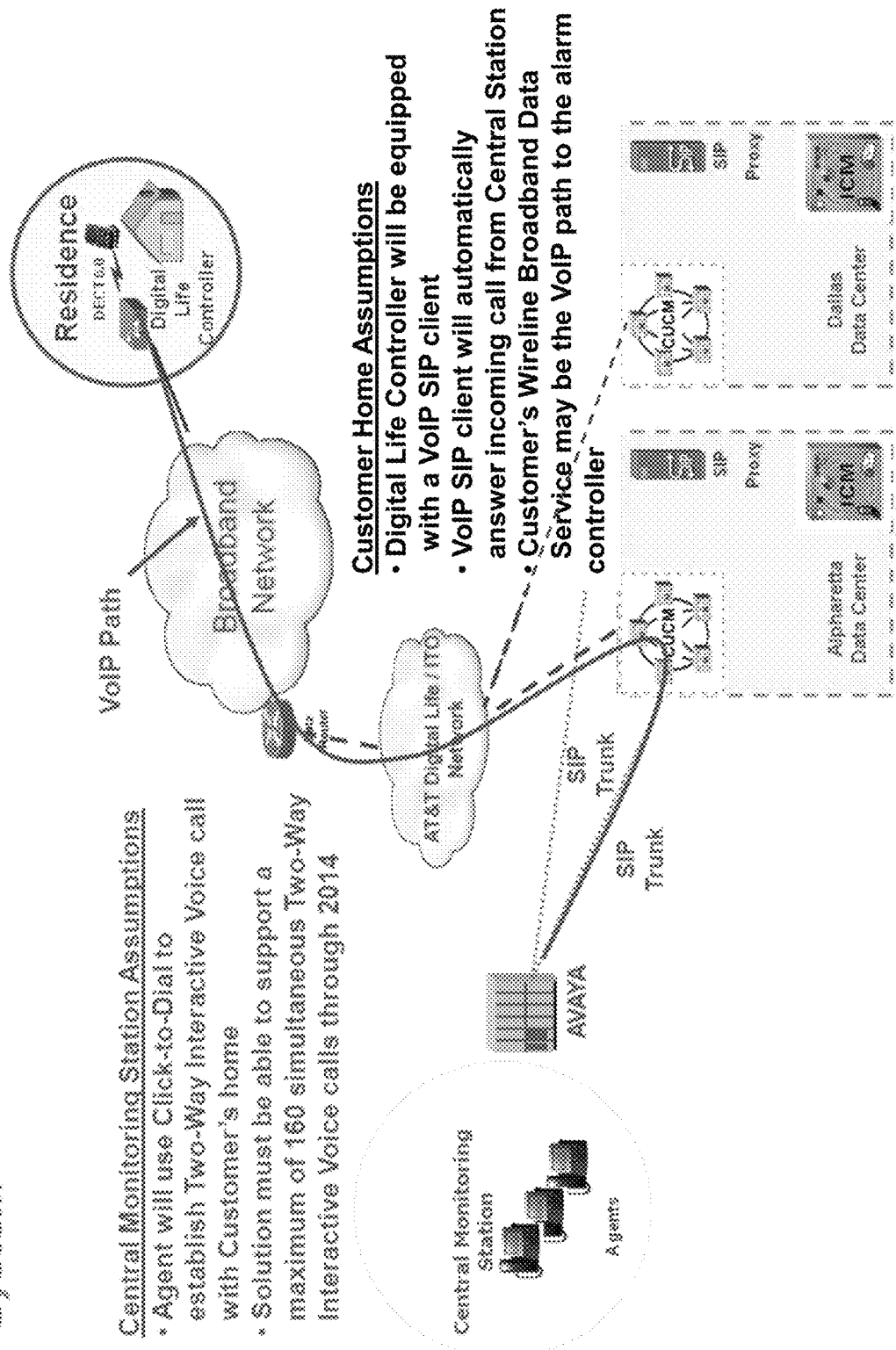
Figure 45:
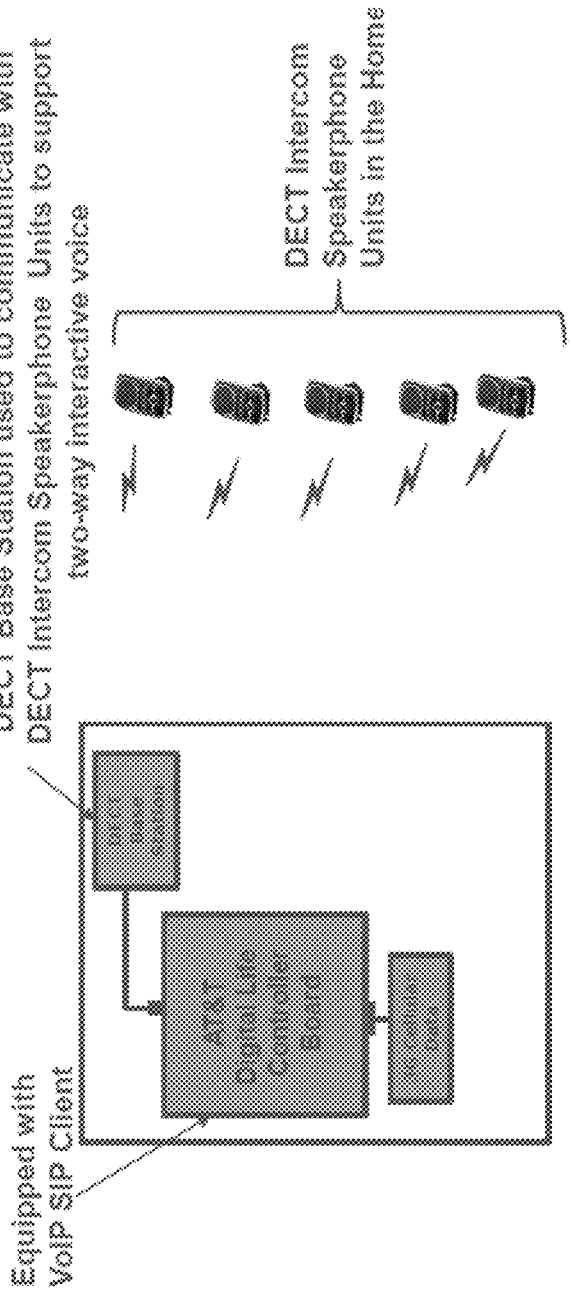
Figure 46:
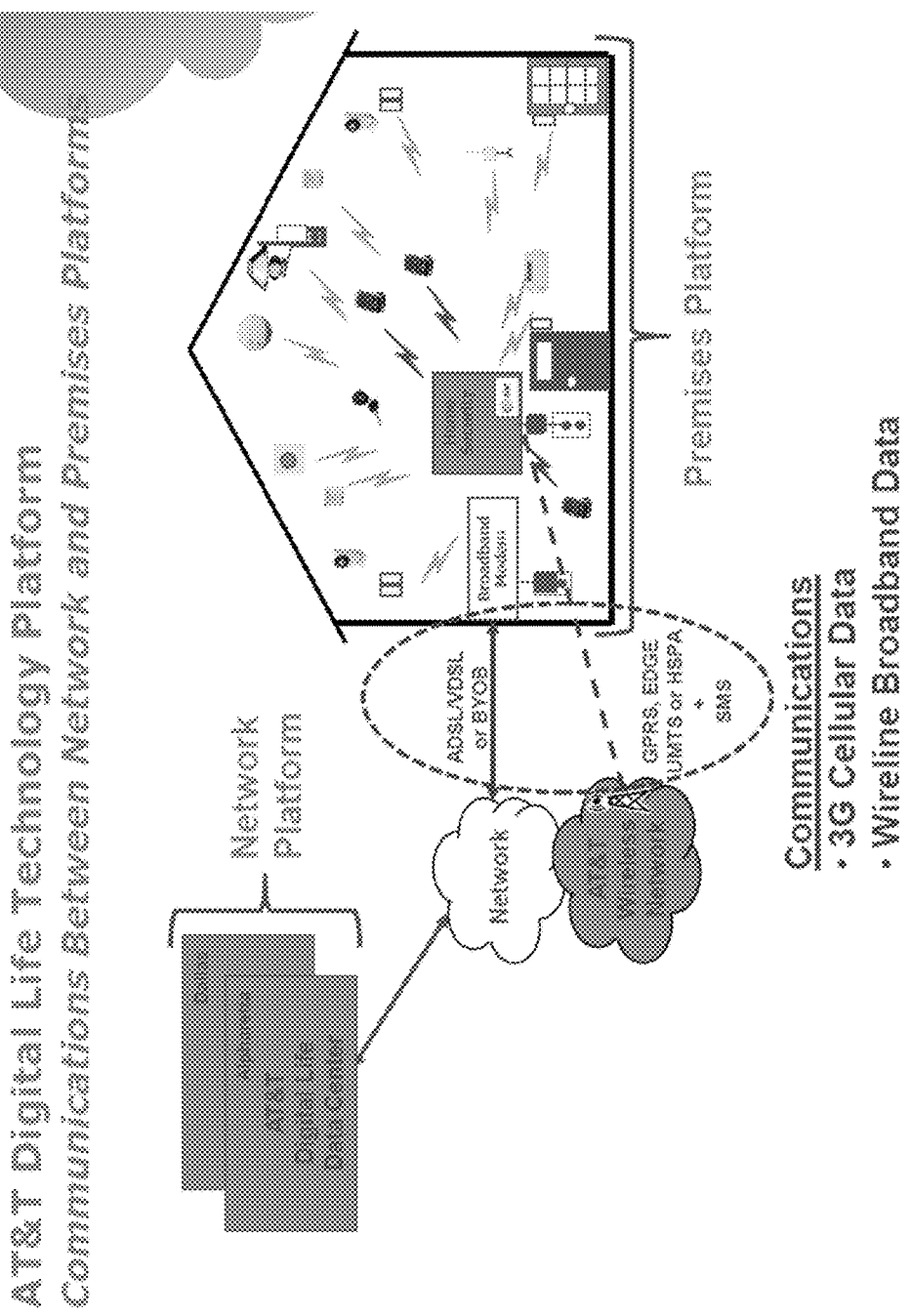
Figure 48:
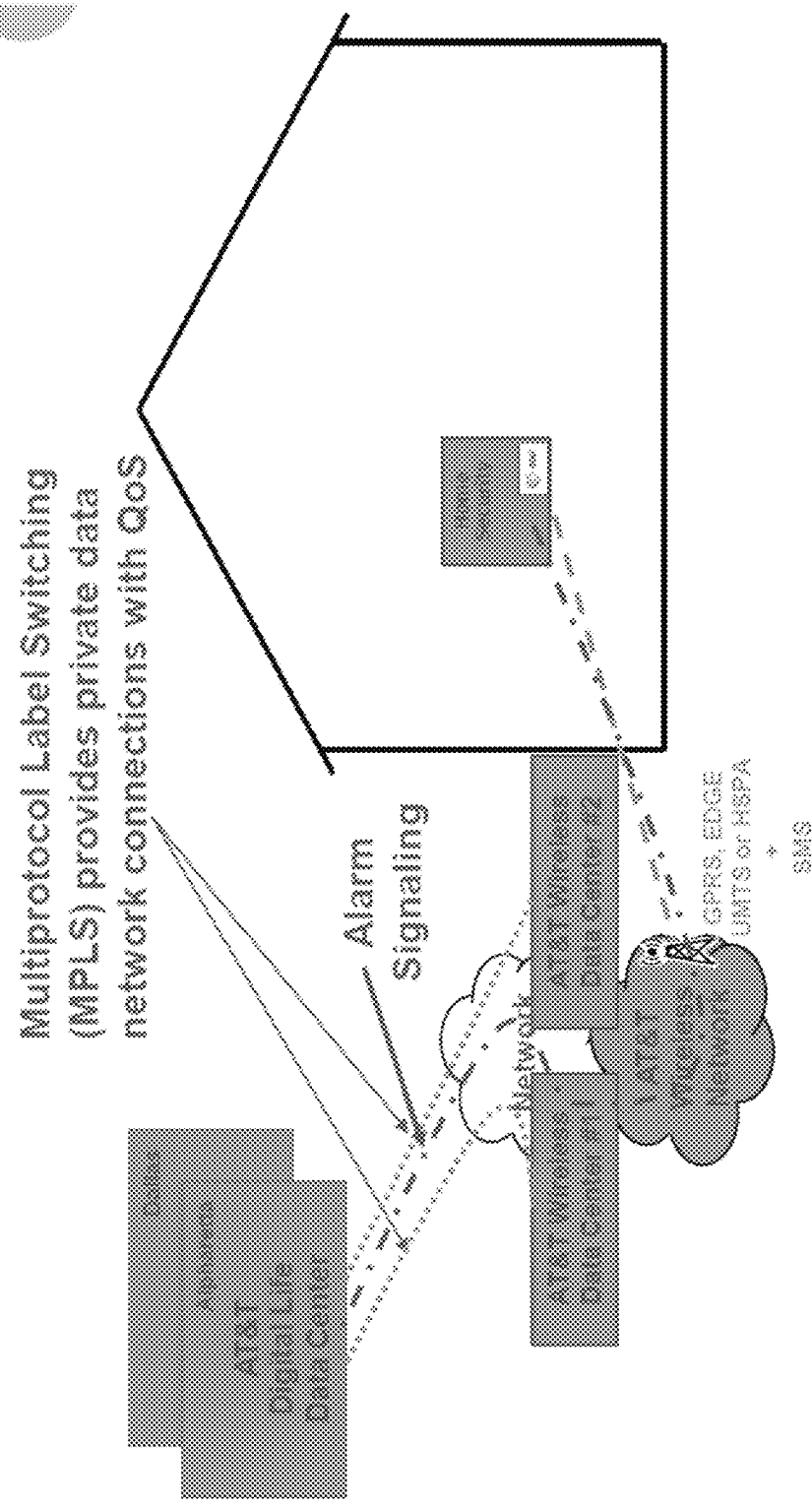
Figure 49:
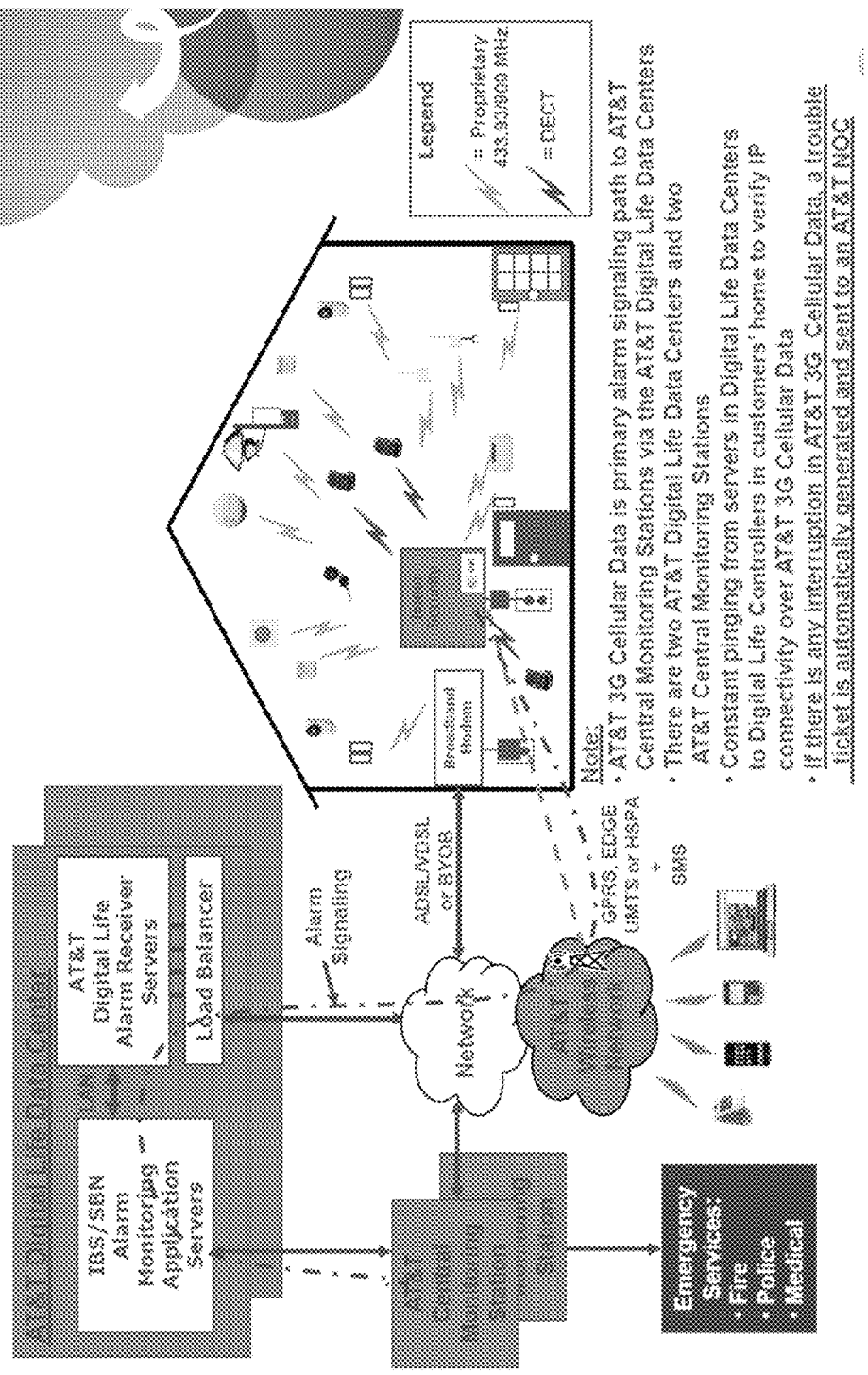

FIGS. 44-49 are schematics further illustrating verification of alarms, according to exemplary embodiments. FIG. 44 illustrates a routing scheme for the Voice-over Internet Protocol call 140 to the alarm controller 106. FIG. 45 illustrates the base station 212 and the portable units 210. FIG. 46 illustrates communications paths available to the alarm controller 106, while FIG. 47 illustrates a table of operating modes and communications paths. FIG. 48 is a detailed schematic of the wireless cellular network connection 124, while FIG. 49 illustrates alarm handling and reporting.

Figure 50:
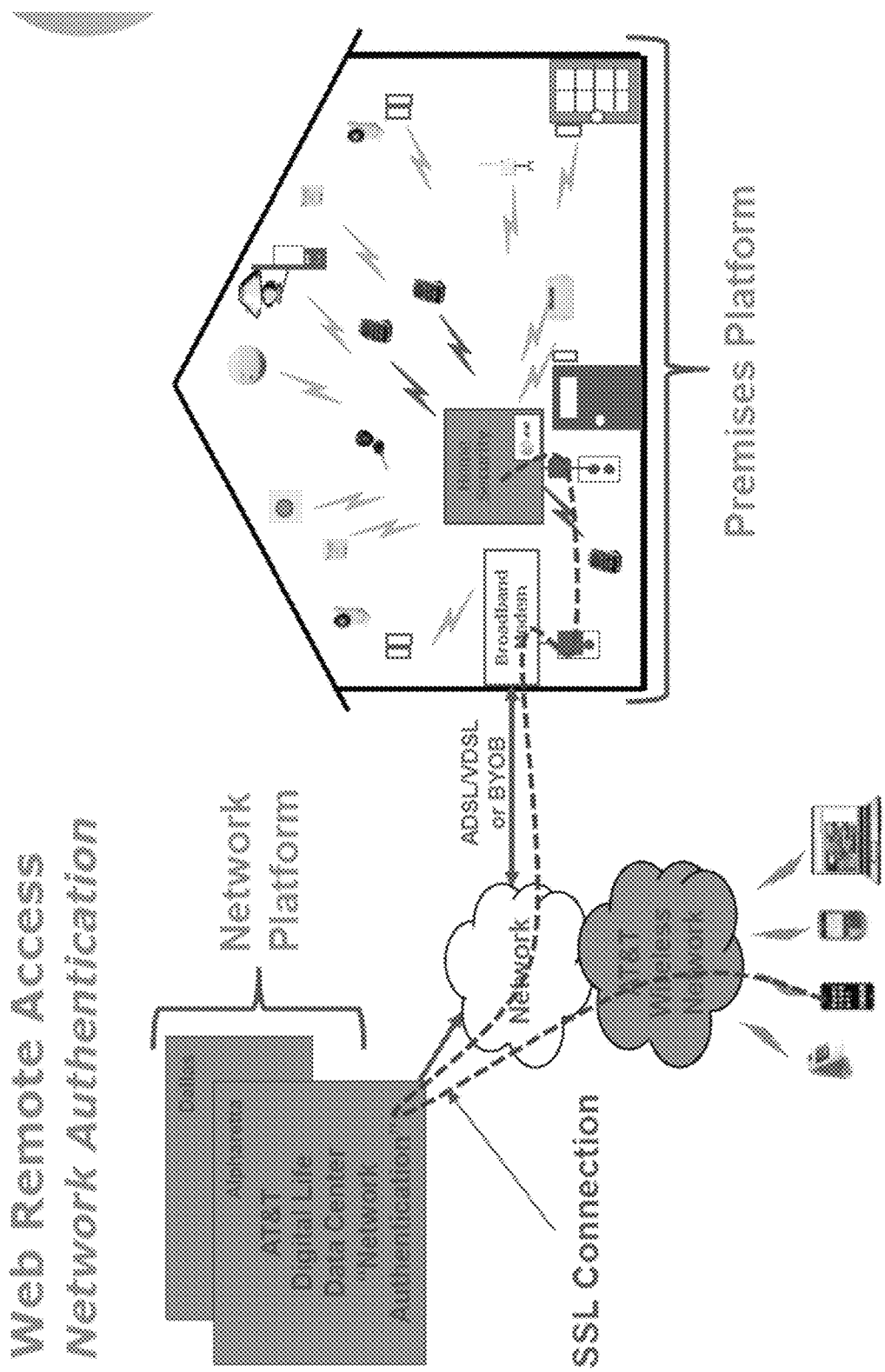
FIGS. 50-51 are more schematics illustrating security services, according to exemplary embodiments.
Figure 51:
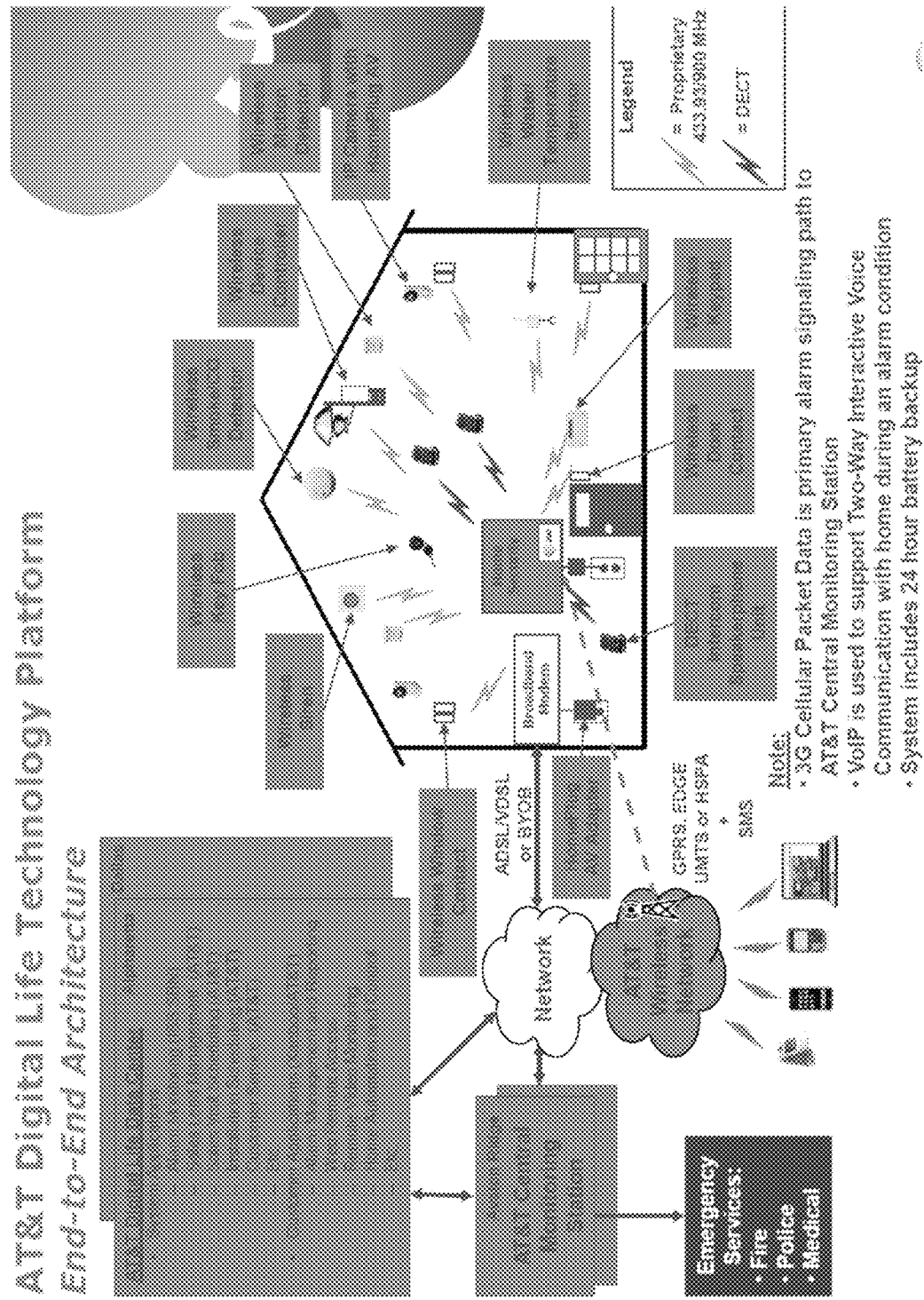

FIGS. 50-51 are more schematics illustrating security services, according to exemplary embodiments. FIG. 50 illustrates remote access, while FIG. 51 illustrates a general network architecture.

Exemplary embodiments may be applied regardless of networking environment. The private data network 104 may be a cable network operating in the radio-frequency domain and/or the Internet Protocol (IP) domain. The data network 104 may include coaxial cables, copper wires, fiber optic lines, and/or hybrid-coaxial lines. The data network 104 may also include wireless portions utilizing any portion of the electromagnetic spectrum and any signaling standard, as previous paragraphs explained. The concepts described herein may be applied to any wireless/wireline communications network, regardless of physical componentry, physical configuration, or communications standard(s).

Figure 52:
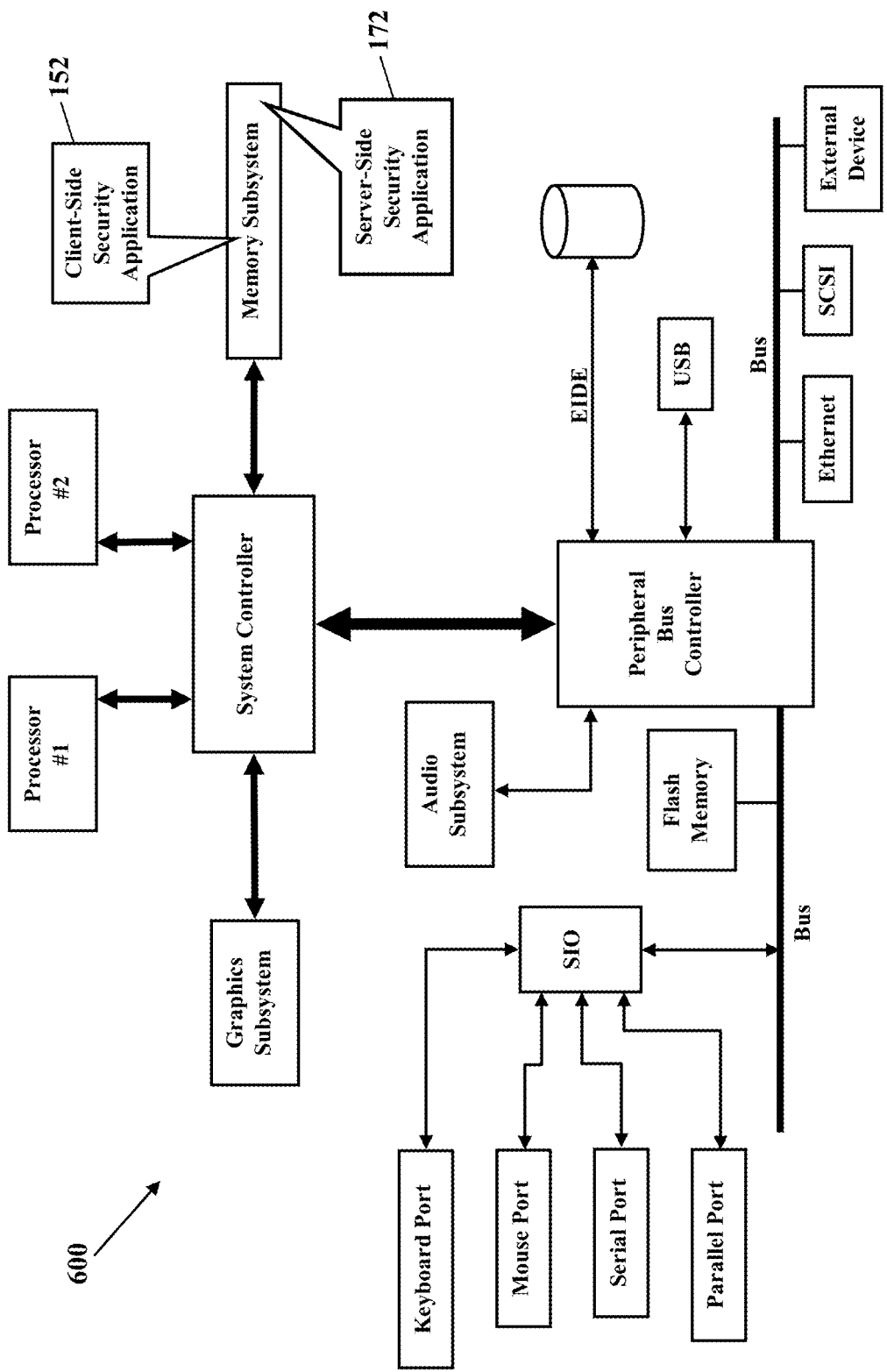
FIGS. 52-53 are schematics illustrating more operating environments, according to still more exemplary embodiments.
Figure 53:
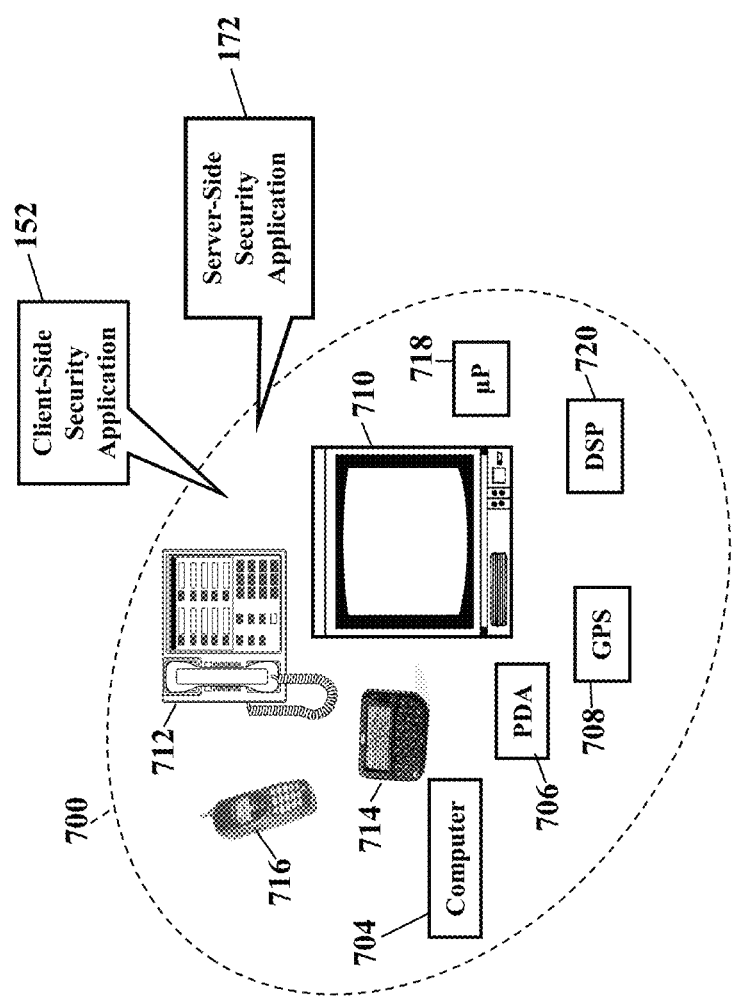

FIGS. 52-53 are schematics illustrating still more exemplary embodiments. FIG. 52 is a generic block diagram illustrating the client-side security application 152 and/or the server-side security application 172 may operate within a processor-controlled device 600. The client-side security application 152 and/or the server-side security application 172 may be stored in a memory subsystem of the processor-controlled device 600. One or more processors communicate with the memory subsystem and execute the client-side security application 152 and/or the server-side security application 172. Because the processor-controlled device 600 illustrated in FIG. 52 is well-known to those of ordinary skill in the art, no detailed explanation is needed. FIG. 53 illustrates the client-side security application 152 and/or the server-side security application 172 may alternatively or additionally operate within other processor-controlled devices 700. FIG. 53, for example, illustrates that the client-side security application 152 and/or the server-side security application 172 may entirely or partially operate within a computer 704, personal digital assistant (PDA) 706, a Global Positioning System (GPS) device 708, television 710, an Internet Protocol (IP) phone 712, a pager 714, a cellular/satellite phone 716, or any system and/or communications device utilizing a digital processor 718 and/or a digital signal processor (DP/DSP) 720. The device 700 may also include watches, radios, vehicle electronics, clocks, printers, gateways, mobile/implantable medical devices, and other apparatuses and systems. Because the architecture and operating principles of the various devices 700 are well known, the hardware and software componentry of the various devices 700 are not further shown and described.

Exemplary embodiments may be physically embodied on or in a computer-readable storage medium. This computer-readable medium may include a hard drive, USB drive, CD-ROM, DVD, tape, cassette, floppy disk, memory card, and large-capacity disks. This computer-readable medium, or media, could be distributed to end-subscribers, licensees, and assignees. A computer program product comprises a computer readable medium storing processor-executable instructions for alerting of alarms from security systems.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
   determining, by an alarm controller associated with a security system, an alarm condition based on data generated by an alarm sensor;
   determining, by the alarm controller, a sensor identifier associated with the alarm sensor generating the data;
   querying, by the alarm controller, a database for the sensor identifier, the database electronically associating camera identifiers to sensor identifiers, the sensor identifiers including the sensor identifier associated with the alarm sensor generating the data;
   identifying, by the alarm controller, a camera identifier of the camera identifiers from the database that is electronically associated with the sensor identifier associated with the alarm sensor generating the data; and
   retrieving, by the alarm controller, video data generated by a camera, the camera associated with the camera identifier.

2. The method of claim 1, further comprising sending the video data to a device.

3. The method of claim 1, further comprising retrieving a notification address.

4. The method of claim 3, further comprising sending the video data to the notification address for remote notification of the alarm condition.

5. The method of claim 1, further comprising generating a message for remote notification of the alarm condition.

6. The method of claim 1, further comprising sending a text message as a notification of the alarm condition.

7. The method of claim 1, further comprising sending a short messaging service text message as a notification of the alarm condition.

8. A system, comprising:
   a hardware processor; and
   a memory device, the memory device storing code, the code when executed causing the hardware processor to perform operations, the operations comprising:
   determining an alarm condition based on data generated by an alarm sensor associated with a security system;
   determining a sensor identifier associated with the alarm sensor;
   querying a table for the sensor identifier, the table electronically associating camera identifiers to sensor identifiers, the sensor identifiers including the sensor identifier associated with the alarm sensor;
   determining a camera identifier of the camera identifiers that is electronically associated with the sensor identifier associated with the alarm sensor; and
   retrieving video data generated by a camera that is associated with the camera identifier.

9. The system of claim 8, wherein the operations further comprise sending the video data to a device.

10. The system of claim 8, wherein the operations further comprise retrieving a notification address.

11. The system of claim 10, wherein the operations further comprise sending the video data to the notification address for remote notification of the alarm condition.

12. The system of claim 8, wherein the operations further comprise generating a message for remote notification of the alarm condition.

13. The system of claim 8, wherein the operations further comprise sending a text message as a notification of the alarm condition.

14. The system of claim 8, wherein the operations further comprise sending a short messaging service text message as a notification of the alarm condition.

15. A memory device storing code which when executed causes a hardware processor to perform operations, the operations comprising:

determining an alarm condition based on data generated by an alarm sensor, the alarm sensor associated with an alarm controller associated with a security system;

determining a sensor identifier associated with the alarm sensor;

querying a table for the sensor identifier, the table electronically associating camera identifiers to sensor identifiers, the sensor identifiers including the sensor identifier associated with the alarm sensor;

identifying a camera identifier of the camera identifiers that is electronically associated with the sensor identifier associated with the alarm sensor; and retrieving video data that is associated with the camera identifier.

16. The memory device of claim 15, wherein the operations further comprise sending the video data to a device.

17. The memory device of claim 15, wherein the operations further comprise retrieving a notification address.

18. The memory device of claim 17, wherein the operations further comprise sending the video data to the notification address for remote notification of the alarm condition.

19. The memory device of claim 15, wherein the operations further comprise generating a message for remote notification of the alarm condition.

20. The memory device of claim 15, wherein the operations further comprise sending a text message as a notification of the alarm condition.

* * * * *